(12) United States Patent
Suzuki

(10) Patent No.: US 12,454,423 B2
(45) Date of Patent: Oct. 28, 2025

(54) ARTICLE CONVEYING DEVICE

(71) Applicant: ANRITSU CORPORATION, Kanagawa (JP)

(72) Inventor: Takashi Suzuki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 323 days.

(21) Appl. No.: 18/455,225

(22) Filed: Aug. 24, 2023

(65) Prior Publication Data

US 2024/0067464 A1   Feb. 29, 2024

(30) Foreign Application Priority Data

Aug. 29, 2022  (JP) .................................. 2022-135738
May 25, 2023  (JP) .................................. 2023-086007

(51) Int. Cl.
*B65G 47/84* (2006.01)
*B65G 47/86* (2006.01)

(52) U.S. Cl.
CPC ......... *B65G 47/846* (2013.01); *B65G 47/847* (2013.01); *B65G 2201/0244* (2013.01); *B65G 2811/09* (2013.01)

(58) Field of Classification Search
CPC ................ B65G 47/846; B65G 47/847; B65G 2201/02; B65G 2811/09; B65G 2201/0244
USPC ............................................ 198/478.1, 473.1
See application file for complete search history.

(56) References Cited

U.S. PATENT DOCUMENTS

| | | | | |
|---|---|---|---|---|
| 2,324,312 A * | 7/1943 | Meyer | ..................... | B67B 3/003 198/463.4 |
| 4,124,112 A * | 11/1978 | Mohney | ............... | B65G 47/847 198/479.1 |
| 5,056,650 A * | 10/1991 | Kronseder | .......... | B65G 47/846 198/723 |
| 5,762,116 A * | 6/1998 | Moore | .................. | B65B 39/145 198/803.11 |
| 7,007,793 B2 * | 3/2006 | Stocchi | ............... | B65G 47/846 198/803.11 |

(Continued)

FOREIGN PATENT DOCUMENTS

| | | | | |
|---|---|---|---|---|
| DE | 102013112434 B3 * | 9/2014 | .......... | B65G 47/846 |
| DE | 102013104082 A1 * | 10/2014 | .......... | B65G 47/846 |

(Continued)

*Primary Examiner* — James R Bidwell
(74) *Attorney, Agent, or Firm* — McDonald Hopkins LLC

(57) ABSTRACT

A container conveying device includes a contact support portion which comes into contact with one side surface of a container, a star wheel, a contact support portion which comes into contact with the other side surface of the container, and a holding wheel provided to be relatively rotatable with respect to the star wheel. When the container is not located at a container inspection position, the container conveying device conveys the container while maintaining a posture of the container by bringing the contact support portion into contact with the container, and when the container is located at the container inspection position, the container conveying device separates the contact support portion which comes into contact with the surface of the container. The container is released from the contact support portion at the container inspection position while the star wheel is paused.

20 Claims, 24 Drawing Sheets

(56) References Cited

U.S. PATENT DOCUMENTS

| | | | |
|---|---|---|---|
| 8,247,711 B2* | 8/2012 | Troisi | B67C 3/202 |
| | | | 198/346.2 |
| 2002/0081189 A1* | 6/2002 | Giometti | B65G 47/846 |
| | | | 414/791.2 |
| 2009/0178860 A1 | 7/2009 | Edrich et al. | |
| 2012/0175224 A1* | 7/2012 | Briggs | B65G 47/846 |
| | | | 198/478.1 |
| 2014/0353114 A1 | 12/2014 | Cavina | |
| 2016/0355354 A1* | 12/2016 | Fahldieck | B65G 29/00 |

FOREIGN PATENT DOCUMENTS

| | | | | |
|---|---|---|---|---|
| JP | 4805360 B2 | 11/2011 | | |
| JP | 6128466 B2 | 5/2017 | | |
| WO | WO-2015000680 A1 * | 1/2015 | | B65G 47/846 |

* cited by examiner

ARTICLE CONVEYING DEVICE

TECHNICAL FIELD

The present invention relates to an article conveying device.

BACKGROUND ART

In the related art, a system for measuring a container disclosed in Patent Document 1 is known as an article conveying device that conveys a container to a measuring device.

The system for measuring the container includes a rotating disc having a recess portion for drawing the container in an outer peripheral portion in a radial direction. The container is drawn into the recess portion, and the rotating disc is rotated to convey the container to a measuring station.

The measuring station is provided with a measuring cell for measuring (weighing) the container, and when the container is conveyed to the measuring station by the rotating disc, the container is caused to stand still on the measuring cell. Thereafter, the container is physically separated from the recess portion to obtain an accurate measurement value. Therefore, the recess portion is formed to have a dimension larger than a dimension of the container.

Incidentally, according to the system for measuring the container in the related art, when the container is conveyed to the measuring station at a low speed by the rotating disc, the container can be stopped at a measuring position due to a frictional force between the measuring cell and the container during measurement of the container.

However, when the container is conveyed to the measuring station at a high speed and stopped at the measurement position, the container violently sways inside the recess portion due to a gap between the container and the recess portion. Therefore, a standstill position of the container cannot be identified. In some cases, there is a possibility that the container may be measured in a state where the recess portion and the container are in contact with each other, and there is a possibility that the container may not be accurately measured.

Therefore, it is difficult to convey the container at a high speed, and there is a possibility that a measuring time of the container may be lengthened.

A measuring system disclosed in Patent Document 2 is known as a system which can avoid this situation.

The measuring system has a measuring table and a clamp device provided in the measuring table to clamp the container. The measuring table and the clamp device are placed on a load receiving portion of the measuring cell for measuring the container, and a conveying track for conveying the container runs over the measuring table.

In the measuring system, the container conveyed onto the measuring table along the conveying track can be measured by the measuring cell in a state where the container is held by the clamp device.

RELATED ART DOCUMENT

Patent Document

[Patent Document 1] Japanese Patent No. 6128466
[Patent Document 2] Japanese Patent No. 4805360

DISCLOSURE OF THE INVENTION

Problem that the Invention is to Solve

However, according to the measuring system disclosed in Patent Document 2, the clamp device that holds the container is installed on the measuring cell that measures the container. Therefore, there is a possibility that a position of the container may not be accurately controlled immediately after the container stands still. Moreover, in some cases, there is a possibility that the container may be held in a state of being in contact with the conveying track (that is, a conveying device), and thus, there is a possibility that the container may not be accurately measured.

Therefore, an object of the present invention is to provide an article conveying device which can accurately inspect an article while conveying the article at a high speed and can shorten an inspection time of the article.

Means for Solving the Problem

According to a first aspect of the present invention, there is provided an article conveying device including a plurality of accommodation units that accommodate an article to be sequentially loaded at a predetermined position. The article conveying device conveys the article accommodated in the accommodation units to an article inspection position. The accommodation unit includes a first contact support portion provided in a first conveying member provided to be movable in a conveying direction of the article, and configured to come into contact with one side surface of the article located on an upstream side in the conveying direction, and a second contact support portion provided in a second conveying member provided to be movable in the conveying direction of the article and to be relatively movable in the conveying direction of the article with respect to the first conveying member, and configured to come into contact with the other side surface of the article located on a downstream side in the conveying direction. When the article is not located at the article inspection position, the article is conveyed while a posture of the article is maintained by bringing at least the first contact support portion into contact with the article, and when the article is located at the article inspection position, the first contact support portion and the second contact support portion are separated from the article.

According to this configuration, the article loaded at a predetermined article loading position is accommodated in the accommodation unit. When the article is not located at the article inspection position, at least the first contact support portion is brought into contact with the article. In this manner, the article is conveyed while a posture of the article is maintained. Therefore, the article can be conveyed to the article inspection position at a high speed.

When the article is conveyed to the article inspection position, the first conveying member and the second conveying member are stopped, and the first contact support portion and the second contact support portion are separated from the article. In this manner, it is possible to prevent the article from interfering with the first contact support portion and the second contact support portion at the article inspection position.

As a result, the article loaded at the article loading position can be conveyed to the article inspection position at a high speed, and the article can be accurately positioned at the article inspection position. The article can be accurately inspected at the article inspection position, and an inspection time of the article can be shortened.

In addition, in the article conveying device according to a second aspect of the present invention, the article conveying device according to the first aspect further includes an elastic member installed in a first opening window formed in the first conveying member and a second opening window formed in the second conveying member, configured to transmit power to the second conveying member from the first conveying member, and elastically deformable when the first conveying member and the second conveying member move relative to each other, a first drive unit that elastically deforms the elastic member to move the second conveying member relative to the first conveying member, and a second drive unit that elastically deforms the elastic member to move the first conveying member relative to the second conveying member.

According to this configuration, for example, when the elastic member stretches to the maximum extent, an interval between the first contact support portion and the second contact support portion is formed to be an interval slightly larger than a maximum dimensional tolerance of the article. The article can be conveyed to the article inspection position while the article is accommodated between the first contact support portion and the second contact support portion.

Therefore, the article can be conveyed from the article loading position to the article inspection position at a high speed, and the inspection time of the article can be more effectively shortened.

In addition, when the first conveying member is moved in the conveying direction of the article, power of the first conveying member can be transmitted to the second conveying member via the elastic member. Therefore, a dedicated actuator for driving the second conveying member is not required.

In addition, the second conveying member is moved relative to the first conveying member by the first drive unit, and the elastic member is elastically deformed. In this manner, the second contact support portion can be separated from the article.

In addition to this configuration, the elastic member is elastically deformed by the second drive unit to move the first conveying member relative to the second conveying member. In this manner, the first contact support portion can be separated from the article.

As a result, the article can be conveyed to the article inspection position at a high speed by the article conveying device having a simple configuration, and the article can be accurately positioned at the article inspection position. Moreover, the article can be accurately inspected by reliably preventing the article from interfering with the first contact support portion and the second contact support portion at the article inspection position.

In addition, in the article conveying device according to a third aspect of the present invention, the article conveying device according to the first aspect further includes an elastic member installed between the first conveying member and the second conveying member, configured to transmit power to the second conveying member from the first conveying member, and elastically deformable when the first conveying member and the second conveying member move relative to each other, an adjustment unit that elastically deforms the elastic member to adjust an interval between the first contact support portion and the second contact support portion, and positions the first contact support portion and the second contact support portion to have a constant interval, a first drive unit that elastically deforms the elastic member to move the second conveying member relative to the first conveying member, and a second drive unit that elastically deforms the elastic member to move the first conveying member relative to the second conveying member.

According to this configuration, the adjustment unit elastically deforms the elastic member to adjust an interval between the first contact support portion and the second contact support portion, and positions the first contact support portion and the second contact support portion to have a constant interval. In this manner, the interval between the first contact support portion and the second contact support portion is formed to be the interval slightly larger than the maximum dimensional tolerance of the article. The article can be conveyed to the article inspection position while the article is accommodated between the first contact support portion and the second contact support portion.

Therefore, the article can be conveyed from the article loading position to the article inspection position at a high speed, and the inspection time of the article can be more effectively shortened.

In addition, the interval between the first contact support portion and the second contact support portion is adjusted by the adjustment unit in accordance with a diameter (size) of the article. In this manner, the articles having different diameters can be conveyed while being accommodated between the first contact support portion and the second contact support portion.

Therefore, it is not required to use a plurality of types of the first conveying members and the second conveying members in which the interval between the first contact support portion and the second contact support portion is fixed in accordance with the diameter of the article. In this manner, manufacturing costs of the article conveying device can be greatly reduced.

In addition, when the first conveying member is moved in the conveying direction of the article, power of the first conveying member can be transmitted to the second conveying member via the elastic member. Therefore, a dedicated actuator for driving the second conveying member is not required.

In addition, the second conveying member is moved relative to the first conveying member by the first drive unit, and the elastic member is elastically deformed. In this manner, the second contact support portion can be separated from the article.

In addition to this configuration, the elastic member is elastically deformed by the second drive unit to move the first conveying member relative to the second conveying member. In this manner, the first contact support portion can be separated from the article.

As a result, the article can be conveyed to the article inspection position at a high speed by the article conveying device having a simple configuration, and the article can be accurately positioned at the article inspection position. Moreover, the article can be accurately inspected by reliably preventing the article from interfering with the first contact support portion and the second contact support portion at the article inspection position.

In addition, in the article conveying device according to a fourth aspect of the present invention, the article conveying device according to the first aspect further includes a third drive unit that moves the first conveying member in the conveying direction of the article, and a fourth drive unit that moves the second conveying member in the conveying direction of the article.

According to this configuration, the first conveying member is moved in the conveying direction of the article by the third drive unit, and the second conveying member is moved in the conveying direction of the article by the fourth drive unit. In this manner, when the article is not located at the article inspection position, the article can be conveyed to the article inspection position by bringing at least the first contact support portion into contact with the article and maintaining a posture of the article, and the first contact support portion and the second contact support portion can be separated from the article at the article inspection position.

As a result, the article loaded from an article loading unit can be conveyed to the article inspection position at a high speed, and the article can be accurately positioned at the article inspection position. The article can be accurately inspected at the article inspection position, and it is possible to obtain the article conveying device which can shorten the inspection time of the article.

In addition, in the article conveying device according to a fifth aspect of the present invention, in the article conveying device according to the fourth aspect, the fourth drive unit has a drive motor, and directly moves the second conveying member by the drive motor, or moves the second conveying member by transmitting power of the drive motor to the second conveying member via a power transmission unit.

According to this configuration, the second conveying member can be moved by the drive motor or by the drive motor and the power transmission unit. Therefore, the second conveying member can be moved with a simple configuration.

In addition, in the article conveying device according to a sixth aspect of the present invention, the article conveying device according to the fifth aspect further includes an elastic member installed in a first opening window formed in the first conveying member and a second opening window formed in the second conveying member, configured to transmit power to the second conveying member from the first conveying member, and elastically deformable when the first conveying member and the second conveying member move relative to each other. The fourth drive unit directly transmits the power of the drive motor to the second conveying member so that the elastic member is elastically deformed to move the second conveying member relative to the first conveying member, or transmits the power of the drive motor to the second conveying member via the power transmission unit so that the elastic member is elastically deformed to move the second conveying member relative to the first conveying member. The third drive unit elastically deforms the elastic member to move the first conveying member relative to the second conveying member.

According to this configuration, for example, when the elastic member stretches to the maximum extent, an interval between the first contact support portion and the second contact support portion is formed to be an interval slightly larger than a maximum dimensional tolerance of the article. The article can be conveyed to the article inspection position while the article is accommodated between the first contact support portion and the second contact support portion.

Therefore, the article can be conveyed from the article loading position to the article inspection position at a high speed, and the inspection time of the article can be more effectively shortened.

In addition, when the first conveying member is moved in the conveying direction of the article, power of the first conveying member can be transmitted to the second conveying member via the elastic member. Therefore, while the interval between the first contact support portion and the second contact support portion can be maintained to be the interval slightly larger than the maximum dimensional tolerance of the article, the first conveying member and the second conveying member can be moved in the conveying direction of the article by the third drive unit.

In addition, the power of the drive motor of the fourth drive unit is directly transmitted to the second conveying member so that the elastic member is elastically deformed to move the second conveying member relative to the first conveying member, or the power of the drive motor is transmitted to the second conveying member via the power transmission unit so that the elastic member is elastically deformed to move the second conveying member relative to the first conveying member. In this manner, the second contact support portion can be separated from the article.

In addition to this configuration, the elastic member is elastically deformed by the third drive unit to move the first conveying member relative to the second conveying member. In this manner, the first contact support portion can be separated from the article.

As a result, the article can be conveyed to the article inspection position at a high speed by the article conveying device having a simple configuration, and the article can be accurately positioned at the article inspection position. Moreover, the article can be accurately inspected by reliably preventing the article from interfering with the first contact support portion and the second contact support portion at the article inspection position.

In addition, in the article conveying device according to a seventh aspect of the present invention, in the article conveying device according to the first aspect, the first conveying member and the second conveying member include rotating members overlapping in an upward-downward direction, of which a rotation direction is the conveying direction of the article. The article conveying device further includes a drive motor and a planetary gear mechanism which rotationally drive the first conveying member and the second conveying member. The planetary gear mechanism includes a sun gear attached to the first conveying member and driven by the drive motor, internal teeth formed in the second conveying member, and a carrier rotatably supporting a planetary gear meshing with the sun gear and the internal teeth and rotationally driven by the drive motor.

According to this configuration, the article loaded from the article loading unit is accommodated in the accommodation unit, and when the article is not located at the article inspection position, the carrier is rotatable, and the sun gear is rotated. In this manner, the sun gear meshing with the pinion gear and the internal teeth are integrally rotated by circumferentially moving the pinion gear.

In this manner, the posture of the article can be maintained by bringing the first contact support portion into contact with the article, and the second conveying member can be moved by forming a gap between the second contact support portion and the article. Therefore, the article can be conveyed to the article inspection position at a high speed.

As a result, the article loaded from the article loading unit can be conveyed to the article inspection position at a high speed, and the article can be accurately positioned at the article inspection position.

In addition, in the article conveying device according to an eighth aspect of the present invention, in the article conveying device of the second aspect, when the article is located at the article inspection position, the first drive unit moves the second conveying member relative to the first conveying member to separate the second contact support portion from the other side surface of the article. The second drive unit moves the first conveying member in a direction opposite to a moving direction of the second conveying member to separate the first contact support portion from one side surface of the article. In addition, in the article conveying device of a ninth aspect of the present invention, in the article conveying device of the third aspect, when the article is located at the article inspection position, the first drive unit moves the second conveying member relative to the first conveying member to separate the second contact support portion from the other side surface of the article. The second drive unit moves the first conveying member in a direction opposite to a moving direction of the second conveying member to separate the first contact support portion from the one side surface of the article.

According to this configuration, the article accommodated in the first contact support portion and the second contact support portion is conveyed to the article inspection position at a high speed, and the first drive unit and the second drive unit are driven at the article inspection position to separate the first contact support portion and the second contact support portion from the article. In this manner, the article can be reliably prevented from interfering with the first contact support portion and the second contact support portion, and the article can be accurately inspected.

In addition, in the article conveying device of a tenth aspect of the present invention, in the article conveying device of the fifth aspect, when the article is located at the article inspection position, the fourth drive unit directly transmits the power of the drive motor to the second conveying member so that the second conveying member is moved relative to the first conveying member to separate the second contact support portion from the other side surface of the article, or transmits the power of the drive motor to the second conveying member via the power transmission unit so that the second conveying member is moved relative to the first conveying member to separate the second contact support portion from the other side surface of the article. The third drive unit moves the first conveying member in a direction opposite to a moving direction of the second conveying member to separate the first contact support portion from the one side surface of the article. In addition, in the article conveying device according to an eleventh aspect of the present invention, in the article conveying device according to the sixth aspect, when the article is located at the article inspection position, the fourth drive unit directly transmits the power of the drive motor to the second conveying member so that the second conveying member is moved relative to the first conveying member to separate the second contact support portion from the other side surface of the article, or transmits the power of the drive motor to the second conveying member via the power transmission unit so that the second conveying member is moved relative to the first conveying member to separate the second contact support portion from the other side surface of the article. The third drive unit moves the first conveying member in a direction opposite to a moving direction of the second conveying member to separate the first contact support portion from the one side surface of the article.

In this manner, the article can be prevented from interfering with the first contact support portion and the second contact support portion at the article inspection position, and the article can be accurately inspected at the article inspection position. As a result, the inspection time of the article can be shortened.

In addition, in the article conveying device according to a twelfth aspect of the present invention, the article conveying device according to the second aspect further includes an inclined groove formed along a moving direction of the second conveying member. The first drive unit includes an actuator having a moving portion moving along the inclined groove while coming into contact with the inclined groove, and moving the second conveying member relative to the first conveying member. The inclined groove is inclined with respect to a moving direction of the moving portion.

According to this configuration, when the article is conveyed to the article inspection position, the moving portion is moved along the inclined groove by the first drive unit. In this manner, the second conveying member can be moved relative to the first conveying member. Therefore, the second contact support portion can be reliably prevented from interfering with the article at the article inspection position.

In addition to this configuration, the movement of the second conveying member is restricted in a state where the moving portion is brought into contact with the inclined groove. In this state, the elastic member is elastically deformed by the second drive unit so that the first conveying member moves relative to the second conveying member. In this manner, the first contact support portion can be separated from the article. Therefore, the first contact support portion can be reliably prevented from interfering with the article at the article inspection position.

As a result, the article can be reliably prevented from interfering with the first contact support portion and the second contact support portion at the article inspection position, and the article can be accurately inspected.

In addition, in the article conveying device according to a thirteenth aspect of the present invention, in the article conveying device according to the first aspect, the first contact support portion has a first contact surface which comes into contact with the one side surface of the article. The second contact support portion has a second contact surface which comes into contact with the other side surface of the article. At least the first contact surface extends from a lower portion to an upper portion of the article. In addition, in the article conveying device according to a fourteenth aspect of the present invention, in the article conveying device according to the second aspect, the first contact support portion has a first contact surface which comes into contact with the one side surface of the article. The second contact support portion has a second contact surface which comes into contact with the other side surface of the article. At least the first contact surface extends from a lower portion to an upper portion of the article. In addition, in the article conveying device according to a fifteenth aspect of the present invention, in the article conveying device according to the fifth aspect, the first contact support portion has a first contact surface which comes into contact with the one side surface of the article. The second contact support portion has a second contact surface which comes into contact with the other side surface of the article. At least the first contact surface extends from a lower portion to an upper portion of the article. In addition, in the article conveying device according to a sixteenth aspect of the present invention, in the article conveying device according to the tenth aspect, the first contact support portion has a first contact surface which comes into contact with the one side surface of the article. The second contact support portion has a second contact surface which comes into contact with the other side surface of the article. At least the first contact surface extends from a lower portion to an upper portion of the article.

According to this configuration, the article can be conveyed by pressing the whole first contact surface of the first contact support portion against the article, and the article can be conveyed from the article loading position to the article inspection position at a high speed while the posture of the article is stably maintained.

In addition, the article conveying device according to a seventeenth aspect of the present invention, in the article conveying device according to the first aspect, the first conveying member is a first rotating member in which the conveying direction of the article is a rotation direction. The second conveying member is a second rotating member rotatable in a normal/reverse direction of the rotation direction of the first rotating member. In addition, in the article conveying device according to an eighteenth aspect of the present invention, in the article conveying device according to the second aspect, the first conveying member is a first rotating member in which the conveying direction of the article is a rotation direction. The second conveying member is a second rotating member rotatable in a normal/reverse direction of the rotation direction of the first rotating member. In the article conveying device according to a nineteenth aspect of the present invention, in the article conveying device according to the fifth aspect, the first conveying member is a first rotating member in which the conveying direction of the article is a rotation direction. The second conveying member is a second rotating member rotatable in a normal/reverse direction of the rotation direction of the first rotating member. In the article conveying device according to a twentieth aspect of the present invention, in the article conveying device according to the sixth aspect, the first conveying member is a first rotating member in which the conveying direction of the article is a rotation direction. The second conveying member is a second rotating member rotatable in a normal/reverse direction of the rotation direction of the first rotating member.

According to this configuration, an installation area of the article conveying device can be reduced, compared to a case where the article is linearly conveyed.

Advantage of the Invention

The present invention can provide an article conveying device which can accurately inspect an article while conveying the article at a high speed, and can shorten an inspection time of the article.

BEST MODE FOR CARRYING OUT THE INVENTION

Figure 1:
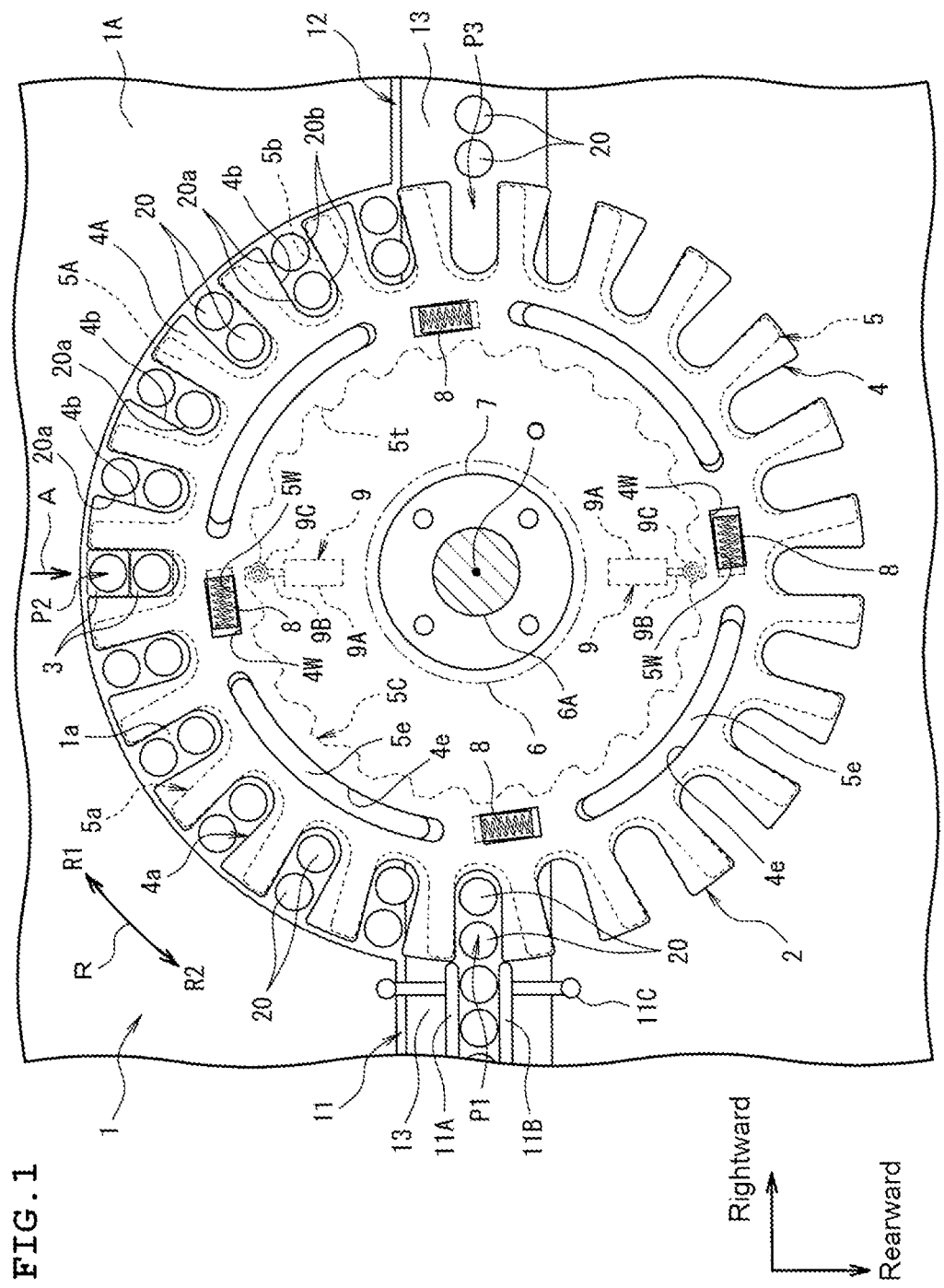
FIG. 1 is a plan view of an article weighing device including an article conveying device according to a first embodiment of the present invention, and illustrates a state where a contact support portion is separated from an article.

Hereinafter, referring to the drawings, a configuration of an article conveying device according to a first embodiment of the present invention will be described based on FIGS. 1 to 6.

In FIG. 1, a container conveying device 2 is provided in a container weighing device 1, aligns a weighing target article, and continuously conveys the article to a container weighing unit 3.

The weighing target article includes an article having a predetermined shape or a molded article manufactured by an existing manufacturing facility.

For example, the article includes a container such as an aerosol can and a bottle which accommodate contents.

Figure 2:
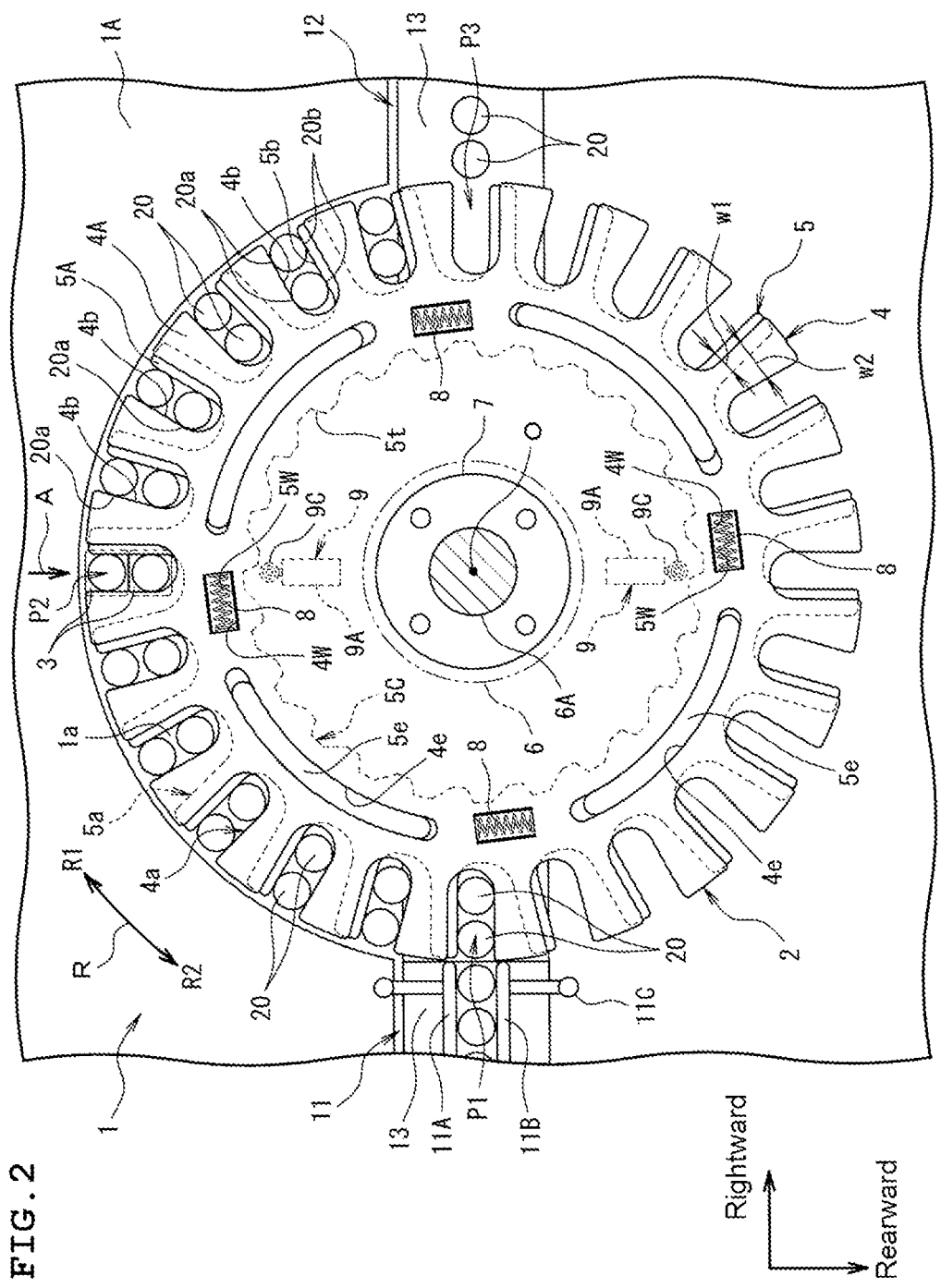
FIG. 2 is a plan view of the article weighing device including the article conveying device according to the first embodiment of the present invention, and illustrates a state where the article is held by the contact support portion.

As illustrated in FIGS. 1 and 2, the container weighing device 1 includes a container conveying device 2 serving as an article conveying device that conveys a container 20 along a circumferential conveying course, a container weighing unit 3 that weighs the container 20 at a container inspection position P2 in an intermediate portion of the conveying course, a container loading unit 11 that loads the container in the container conveying device 2 at a container loading position P1 serving as a predetermined position, and a container unloading unit 12 that unloads the container from the container conveying device 2 at a container unloading position P3. The container loading unit 11 of the present embodiment forms the article loading unit, and the container inspection position P2 forms the article inspection position.

The container conveying device 2 includes a star wheel 4 and a holding wheel 5. The holding wheel 5 is provided to be rotatable relative to the star wheel 4 and coaxial with the star wheel 4. The star wheel 4 and the holding wheel 5 are rotatable in a conveying direction of the container 20.

Recess portions 4a are formed in an outer peripheral portion (end portion) of the star wheel 4, and the recess portions 4a are provided at an equal interval in a rotation direction R of the star wheel 4. Contact support portions 4A are provided in the outer peripheral portion of the star wheel 4, and the contact support portions 4A are provided at an equal interval in the rotation direction R of the star wheel 4.

The rotation directions of the star wheel 4 and the holding wheel 5 are a clockwise rotation direction R1 and a counterclockwise rotation direction R2. The rotation directions of the star wheel 4 and the holding wheel 5 will be described as the rotation direction R when an orientation of the rotation direction is not limited.

The recess portion 4a is formed between the contact support portions 4A in the rotation direction R of the star wheel 4. That is, the outer peripheral portion of the star wheel 4 is formed in an uneven shape which is continuous in the rotation direction R.

The star wheel 4 and the holding wheel 5 are installed in a main body 1A (a portion of the main body 1A is illustrated in FIGS. 5A to 5D) of the container weighing device 1. The main body 1A of the container weighing device 1 is provided with a drive motor 6 having a stepping motor.

A fixed member 7 fixed to a drive shaft 6A of the drive motor 6 is provided in an upper portion of the star wheel 4, and the fixed member 7 is fixed to an upper surface of the star wheel 4. When the drive motor 6 is rotationally driven, the star wheel 4 is rotated integrally with the fixed member 7. The drive motor 6 of the present embodiment forms a second drive unit.

Two containers 20 are accommodated in each of the recess portions 4a. A length of the contact support portion 4A in a radial direction is formed to be twice or larger than a diameter of the container 20.

A cutout 4k is formed in the star wheel 4, and a portion of the holding wheel 5 is accommodated in the cutout 4k (refer to FIGS. 5A to 5D). The holding wheel 5 is installed in the main body 1A of the container weighing device 1 to rotate relative to the drive shaft 6A of the drive motor 6 and to rotate relative to the star wheel 4.

Recess portions 5a are provided in an outer peripheral portion of the holding wheel 5, and the recess portions 5a are provided at an equal interval in the rotation direction R of the holding wheel 5. Contact support portions 5A are provided in the outer peripheral portion of the holding wheel 5, and the contact support portions 5A are provided at an equal interval in the rotation direction R of the holding wheel 5.

The recess portion 5a is formed between the contact support portions 5A in the rotation direction R of the holding wheel 5. That is, the outer peripheral portion of the holding wheel 5 is formed in an uneven shape which is continuous in the rotation direction R. The recess portions 4a and 5a and the contact support portion 4A and the contact support portion 5A may not be provided at an equal interval in the rotation direction R of the star wheel 4 and the holding wheel 5.

Compared to an outer end of the contact support portion 4A in the radial direction, an outer end of the contact support portion 5A in the radial direction is located inward, and the contact support portion 4A and the contact support portion 5A are aligned in an upward-downward direction.

The two containers 20 are respectively accommodated in the contact support portion 4A and the contact support portion 5A to be located between the contact support portion 4A and the contact support portion 5A. That is, the two containers 20 are accommodated in the recess portions 4a and 5a.

Specifically, as illustrated in FIGS. 5A to 5D, a contact surface 4b of the contact support portion 4A in the rotation direction R can come into contact with one side surface (side surface on an upstream side) 20a of the container 20 in the conveying direction, and extends from a lower portion 20m of 20 to an upper portion 20n of the container 20.

That is, the contact surface 4b of the contact support portion 4A extends in the upward-downward direction to come into contact with the entire one side surface 20a of the container 20 in the upward-downward direction.

The star wheel 4 of the present embodiment has a portion facing the holding wheel 5 in the upward-downward direction and a portion facing the holding wheel 5 in a horizontal direction.

The contact surface 5b of the contact support portion 5A in the rotation direction R can come into contact with the other side surface (side surface on a downstream side) 20b of the container 20 in the conveying direction. The lower portion 20m of the container 20 forms a lower portion of the article, and the upper portion 20n of the container 20 forms an upper portion of the article.

Here, upstream and downstream refer to upstream and downstream with respect to the conveying direction of the container 20 (rotation direction of the star wheel 4 and the holding wheel 5). For example, the container loading position P1 is located on the upstream side with respect to the container inspection position P2, and the container inspection position P2 is located on the downstream side with respect to the container loading position P1.

When the container 20 is conveyed, for example, an interval between the contact surface 4b of the contact support portion 4A and the contact surface 5b of the contact support portion 5A in the rotation direction of the star wheel 4 is formed to be an interval slightly larger than a maximum dimensional tolerance of a diameter of the container 20.

Figure 3:
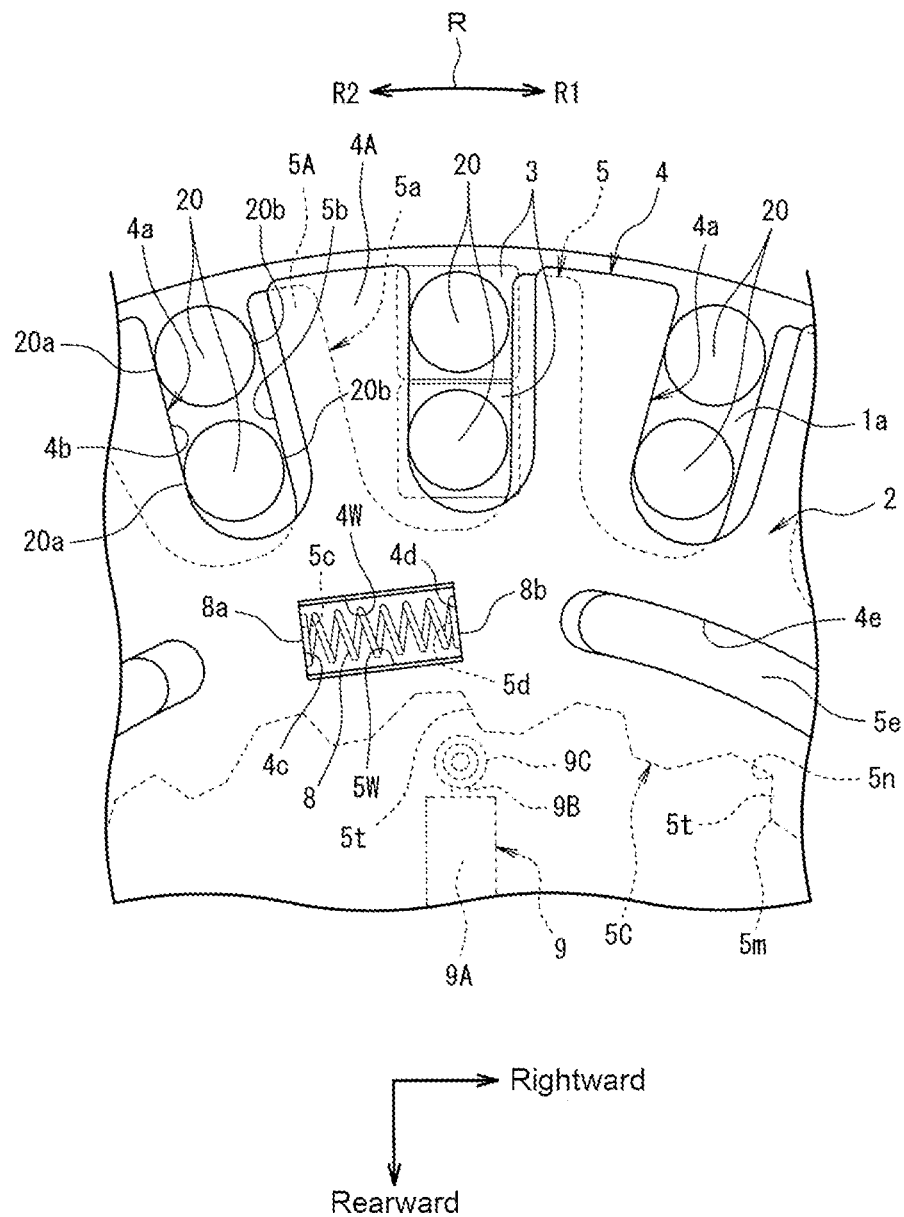
FIG. 3 is an enlarged plan view of the contact support portion of the article conveying device according to the first embodiment of the present invention, and illustrates a state where the article is held by the contact support portion.

That is, during the conveyance, the contact surface 4b of the contact support portion 4A comes into contact with one side surface 20a of the container 20, and the container 20 is accommodated in the contact support portion 4A and the contact support portion 5A to form a slight gap between the contact surface 5b of the contact support portion 5A and the other side surface 20b of the container 20 (refer to FIG. 3).

This gap is formed to serve as a gap in which the container 20 does not excessively move to the downstream side from the container inspection position P2 when the container 20 is located at the container inspection position P2, and a gap which can prevent the container 20 from being inclined and leaned against the contact support portion 5A when the container 20 is conveyed.

In this manner, during the conveyance, the container 20 accommodated in the contact support portion 4A and the contact support portion 5A is conveyed while being maintained in a posture in which a central axis of the container 20 is parallel to a vertical axis.

As illustrated in FIG. 2, a width w1 of the contact support portion 5A in the rotation direction R of the star wheel 4 is formed to be shorter than a width w2 of the contact support portion 4A in the rotation direction R of the star wheel 4. That is, the contact support portion 4A and the contact support portion 5A are formed by holding pieces which can hold the container 20 on a side surface of the star wheel 4 in the rotation direction R.

The star wheel 4 of the present embodiment forms a conveying member, a first conveying member, and a first rotating member (first star wheel), and the holding wheel 5 forms a conveying member, a second conveying member, and a second rotating member (second star wheel). The contact support portion 4A forms an accommodation unit and a first contact support portion, and the contact support portion 5A forms an accommodation unit and a second contact support portion.

The conveying direction of the container 20 is the clockwise rotation direction R1, and the rotation direction R of the star wheel 4 and the holding wheel 5 is a moving direction of the first conveying member and the second conveying member. In this manner, the container 20 is conveyed in an annular shape.

The contact surface 4b of the contact support portion 4A forms a first contact surface which comes into contact with one side surface of the article, and the contact surface 5b of the contact support portion 5A forms a second contact surface which comes into contact with the other side surface of the article.

Four rectangular opening windows 4W are formed in the star wheel 4, and a longitudinal direction of the opening windows 4 W extends in the rotation direction R of the star wheel 4. Four rectangular opening windows 5W are formed in the holding wheel 5, and a longitudinal direction of the opening windows 5W extends in the rotation direction R of the star wheel 4.

The opening window 4W and the opening window 5W are formed to have the same size, and when the opening window 4W and the opening window 5W face each other in the upward-downward direction, both of these coincide with each other in the upward-downward direction. The opening window 4W of the present embodiment forms a first opening window, and the opening window 5W forms a second opening window.

Figure 4:
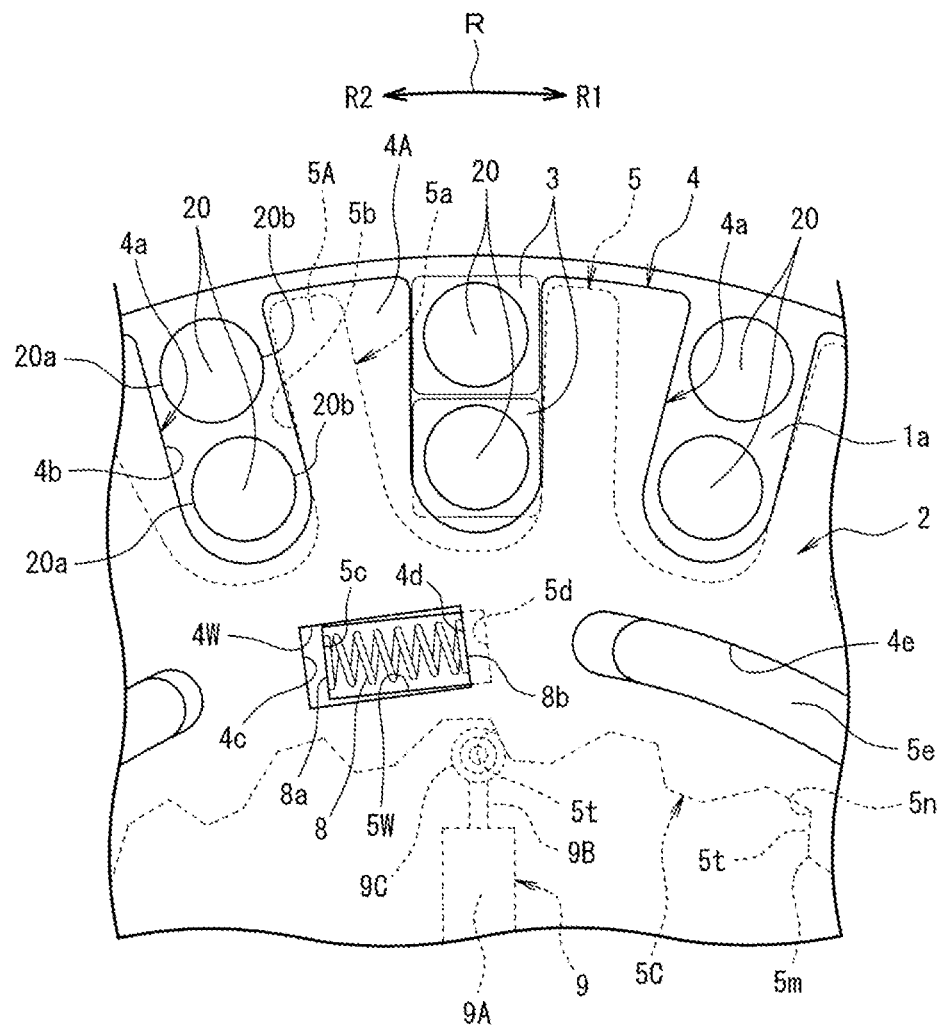
FIG. 4 is an enlarged plan view of the contact support portion of the article conveying device according to the first embodiment of the present invention, and illustrates a state where the contact support portion is separated from the article.

As illustrated in FIGS. 3 and 4, a coil spring 8 is installed in the opening window 4W and the opening window 5W. In a state where the opening window 4W and the opening window 5W coincide with each other in the upward-downward direction, one end portion 8a of the coil spring 8 is in contact with both one end portion 4c of the opening window 4W and one end portion 5c of the opening window 5W. The other end portion 8b of the coil spring 8 is in contact with both the other end portion 4d of the opening window 4W and the other end portion 5d of the opening window 5W.

That is, in a state where the coil spring 8 stretches to the maximum, one end portion 4c of the opening window 4W and one end portion 5c of the opening window 5W face each other in the upward-downward direction due to a biasing force of the coil spring 8, and the other end portion 4d of the opening window 4W and the other end portion 5d of the opening window 5W face each other in the upward-downward direction.

In a state where the coil spring 8 stretches to the maximum, the interval between the contact surface 4b of the contact support portion 4A and the contact surface 5b of the contact support portion 5A in the rotation direction of the star wheel 4 is the interval slightly larger than the maximum dimensional tolerance of the diameter of the container 20. In this state, the container 20 can be accommodated between the contact support portion 4A and the contact support portion 5A.

When the star wheel 4 is rotationally driven by the drive motor 6, the holding wheel 5 is rotationally driven integrally with the star wheel 4 by the biasing force of the coil spring 8. That is, the holding wheel 5 rotates along with the star wheel 4. The coil spring 8 of the present embodiment forms an elastic member.

As illustrated in FIGS. 1 and 2, two actuators 9 are installed in the main body 1A of the container weighing device 1. The actuators 9 are installed at an interval of 180° in the rotation direction R of the star wheel 4 to face a rotation center axis O of the star wheel 4.

The actuator 9 has a cylinder portion 9A, a shaft portion 9B which is retractable with respect to the cylinder portion 9A, and a roller portion 9C attached to a tip of the shaft portion 9B and movable in a direction closer to and a direction separated from the cylinder portion 9A by a retractable movement of the shaft portion 9B with respect to the cylinder portion 9A.

An opening portion 5C is formed inward in the radial direction of the holding wheel 5 with respect to the contact support portion 4A and the contact support portion 5A, and an inclined groove 5t is formed in the opening portion 5C. The inclined groove 5t is inclined with respect to the moving direction (retractable direction) of the roller portion 9C. The moving direction of the roller portion 9C is the radial direction of the star wheel 4 and the holding wheel 5.

The actuator 9 moves along the inclined groove 5t while the roller portion 9C is in contact with the inclined groove 5t as the roller portion 9C protrudes from the cylinder portion 9A. As illustrated in FIGS. 3 and 4, the inclined groove 5t is inclined obliquely in a leftward direction from an inner end 5m toward an outer end 5n of the opening portion 5C in the radial direction.

In this manner, when the roller portion 9C moves along the inclined groove 5t while coming into contact with the inclined groove 5t as the roller portion 9C protrudes from the cylinder portion 9A, the holding wheel 5 rotates relative to the star wheel 4 so that the contact support portion 5A is separated from the contact support portion 4A. The actuator 9 of the present embodiment forms a first drive unit, and the roller portion 9C forms a moving portion.

As illustrated in FIGS. 1 and 2, the container loading unit 11 is provided at the container loading position P1. The container loading unit 11 loads the container 20 in the container conveying device 2, and has a container conveying unit 13 such as a rectilinear feeder and a conveyor, for example.

A pair of guide rails 11A and 11B are provided in an upper portion of the container conveying unit 13, and a gap between the guide rail 11A and the guide rail 11B is formed to be slightly larger than the diameter of the container 20. The guide rails 11A and 11B are supported by the main body 1A by a support portion 11C.

The containers 20 conveyed by the container conveying unit 13 are conveyed in one row to the container conveying device 2 while being pinched between the guide rails 11A and 11B.

A rotation speed of the star wheel 4 is controlled by the drive motor 6, and is paused at the container loading position P1 at a timing at which the container 20 is loaded in the recess portions 4a and 5a. When the star wheel 4 is paused at this timing, two containers 20 are loaded in the recess portions 4a and 5a from the container loading unit 11, and the container 20 is accommodated between the contact support portion 4A and the contact support portion 5A.

When two containers 20 are accommodated in the recess portions 4a and 5a, the container 20 subsequent to the container 20 accommodated in the recess portions 4a and 5a comes into contact with the container 20 accommodated in the recess portions 4a and 5a, and is not accommodated between the contact support portion 4A and the contact support portion 5A. In this manner, the subsequent container 20 is put on standby in the container loading unit 11.

Therefore, a frictional force of the container conveying unit 13 is set so that the container 20 can be conveyed and the container 20 slides on the container 20 in a state where the container 20 is put on standby in the container loading unit 11.

The container unloading unit 12 is provided at the container unloading position P3. The container unloading unit 12 unloads the container 20 from the container conveying device 2, and has a container conveying unit 13 which is continuous with the container loading unit 11.

That is, the container conveying unit 13 extends from the container loading unit 11 to the container unloading unit 12 by passing under the star wheel 4.

In a state where the star wheel 4 is paused at the container unloading position P3, the container 20 is unloaded from the recess portions 4a and 5a by the container unloading unit 12, and the container 20 unloaded by the container unloading unit 12 is conveyed to a subsequent process by the container conveying unit 13. The guide rails 11B and 11C may be installed in the container unloading unit 12.

A pair of container weighing units 3 are installed at the container inspection position P2, and are aligned in the radial direction of the star wheel 4. The container inspection position P2 is located between the container loading position P1 and the container unloading position P3 in the rotation direction R of the star wheel 4.

That is, the container weighing unit 3 is installed between the container loading unit 11 and the container conveying device 2 in the rotation direction R of the star wheel 4, and the container loading unit 11, the container weighing unit 3, and the container unloading unit 12 are respectively installed at an interval of 90° in the rotation direction R of the star wheel 4. The installation at an interval of 90° is an example, and the present invention is not limited thereto.

As illustrated in FIGS. 5A to 5D, the container weighing unit 3 is installed in a recess portion 1b recessed downward with respect to a conveying surface 1a of the main body 1A. The container 20 is conveyed from the container loading position P1 to the container unloading position P3 via the container inspection position P2 while sliding on the conveying surface 1a of the main body 1A.

That is, the container 20 accommodated in the contact support portion 4A and the contact support portion 5A is pushed by coming into contact with the contact support portion 4A due to the rotation of the star wheel 4, and a slight gap is formed between the contact support portion 5A and the contact support portion 4A.

In this manner, the container 20 is not completely gripped by the contact support portion 4A and the contact support portion 5A, and is conveyed from the container loading position P1 to the container unloading position P3 via the container inspection position P2 while sliding on the conveying surface 1a of the main body 1A.

Here, accommodating the container 20 in the recess portions 4a and 5a and accommodating the container 20 in the contact support portion 4A and the contact support portion 5A have the same meaning.

The container 20 is placed on the container weighing unit 3, and the container weighing unit 3 weighs the container 20 when the contact support portion 4A and the contact support portion 5A are separated from the container 20 at the container inspection position P2.

The container conveying device 2 of the present embodiment conveys the container 20 while maintaining a posture of the container 20 by bringing the contact support portion 4A into contact with the container 20 when the container 20 is not located at the container inspection position P2. When the container 20 is located at the container inspection position P2, the container conveying device 2 separates the contact support portion 4A and the contact support portion 5A from the container 20. After weighing of the container 20 is completed, the container conveying device 2 conveys the container 20 to the container unloading position P3 by bringing the contact support portion 4A into contact with the container 20.

In addition, a timing at which the container weighing unit 3 weighs the container 20 at the container inspection position P2, a timing at which the container 20 is loaded (accommodated) from the container loading unit 11 in the recess portions 4a and 5a at the container loading position P1, and a timing at which the container 20 is unloaded to the container unloading unit 12 from the recess portions 4a and 5a at the container unloading position P3 are the same, and the contact support portion 4A and the contact support portion 5A are separated from the container 20 at this timing.

As illustrated in FIGS. 1 and 2, four cutouts 4e are formed in the star wheel 4, and the cutout 4e extends along the rotation direction R of the star wheel 4.

The holding wheel 5 is provided with four protruding portions 5e. The protruding portion 5e extends in the rotation direction R of the holding wheel 5, and is fitted into the cutout 4e.

In this manner, when the star wheel 4 and the holding wheel 5 rotate relative to each other, the protruding portion 5e moves along the cutout 4e. In this manner, it is possible to prevent the star wheel 4 and the holding wheel 5 from being displaced in the radial direction, and thus, the star wheel 4 and the holding wheel 5 can smoothly rotate relative to each other.

The length of the protruding portion 5e in the rotation direction R of the star wheel 4 is formed to be shorter than the length of the cutout 4e in the rotation direction R of the star wheel 4. When the holding wheel 5 excessively rotates relative to the star wheel 4 for some reasons, an end portion of the protruding portion 5e in the rotation direction R of the star wheel 4 comes into contact with an end portion of the cutout 4e in the rotation direction R of the star wheel 4.

In this manner, the coil spring 8 can be prevented from being excessively compressed, and the coil spring 8 can be protected. Therefore, durability of the coil spring 8 can be improved.

Next, an operation of the container conveying device 2 of the present embodiment will be described.

When the container 20 is loaded in the recess portions 4a and 5a at the container loading position P1, the drive motor 6 is stopped at a timing at which the container 20 is loaded in the contact support portion 4A and the contact support portion 5A, and the star wheel 4 and the holding wheel 5 are paused.

Next, the actuator 9 is driven so that the roller portion 9C protrudes from the cylinder portion 9A, and the roller portion 9C is moved along the inclined groove 5t while coming into contact with the inclined groove 5t.

In this manner, the holding wheel 5 rotates relative to the star wheel 4 in the rotation direction R1 so that the contact support portion 5A is separated from the contact support portion 4A. An interval between the contact support portion 4A and the contact support portion 5A in the rotation direction of the star wheel 4 is widened, and a sufficient space for accommodating the container 20 is formed between the contact support portion 4A and the contact support portion 5A.

At this time, the container 20 is loaded between the contact support portion 4A and the contact support portion 5A at the container loading position P1 (refer to FIG. 1). When the container 20 is loaded, the sufficient space for accommodating the container 20 is formed between the contact support portion 34A and the contact support portion 35A. Therefore, loading performance of the container 20 can be improved.

When the container 20 is loaded between the contact support portion 4A and the contact support portion 5A at the container loading position P1, the actuator 9 is driven to move the roller portion 9C to the cylinder portion 9A to separate the roller portion 9C from the inclined groove 5t.

At this time, the star wheel 4 and the holding wheel 5 are biased by the coil spring 8, and the coil spring 8 stretches to the maximum so that one end portion 4c of the opening window 4W and one end portion 5c of the opening window 5W overlap in the upward-downward direction, and so that the other end portion 4d of the opening window 4W and the other end portion 5d of the opening window 5W overlap in the upward-downward direction (refer to FIGS. 2 and 4).

When the coil spring 8 stretches to the maximum, an interval between the contact surface 4b of the contact support portion 4A and the contact surface 5b of the contact support portion 5A in the rotation direction of the star wheel 4 is formed to be an interval slightly larger than the maximum dimensional tolerance of the diameter of the container 20.

When the star wheel 4 is rotated by driving the drive motor 6 in this state, power of the star wheel 4 is transmitted to the holding wheel 5 via the coil spring 8.

At this time, when the star wheel 4 and the holding wheel 5 rotate, the container 20 is pushed by the contact support portion 4A, and the container 20 is conveyed from the container loading position P1 toward the container inspection position P2.

That is, one side surface 20a of the container 20 comes into contact with the contact surface 4b of the contact support portion 4A of the star wheel 4, and the container 20 is pushed by the contact support portion 4A. In this manner, the container 20 is conveyed to the container inspection position P2. At this time, a slight gap is formed between the other side surface 20b of the container 20 and the contact surface 5b of the contact support portion 5A, and the container 20 is conveyed from the container loading position P1 to the container inspection position P2 while sliding on the conveying surface 1a of the main body 1A (refer to FIG. 5A). The slight gap is omitted in the illustration. The same applies to FIGS. 5B and 6 which will be described later.

The slight gap is formed between the other side surface 20b of the container 20 and the contact surface 5b of the contact support portion 5A. However, as the container 20 is conveyed, the other side surface 20b of the container 20 may come into contact with the contact surface 5b of the contact support portion 5A. When the container 20 tries to excessively swing, the container 20 comes into contact with the contact support portion 5A, thereby preventing the container 20 from being conveyed in an inclined state.

In addition, a slight gap is formed between the other side surface 20b of the container 20 and the contact surface 5b of the contact support portion 5A. Therefore, the container 20 is not completely held between the contact support portion 4A and the contact support portion 5A.

Therefore, a bottom surface of the container 20 can be slid on the conveying surface 1a of the main body 1A, it is possible to prevent a possibility that the bottom surface of the container 20 may strongly collide with the conveying surface 1a, and the container 20 may receive a strong impact during the conveyance.

When the container 20 accommodated in the recess portions 4a and 5a is conveyed to the container inspection position P2 (refer to FIG. 5B), the drive motor 6 is stopped to pause the star wheel 4 and the holding wheel 5.

The slight gap is formed between the other side surface 20b of the container 20 and the contact surface 5b of the contact support portion 5A when the container 20 is conveyed. Therefore, when the container 20 is located at the container inspection position P2, and the star wheel 4 and the holding wheel 5 are paused, the other side surface 20b of the container 20 comes into contact with the contact support portion 5A due to the inertia of the container 20.

In this manner, the container 20 can be prevented from being excessively located on the downstream side from the container inspection position P2, and the container 20 can be accurately positioned at the container inspection position P2.

When the star wheel 4 and the holding wheel 5 are paused, due to the inertia of the container 20, the other side surface 20b of the container 20 often comes into contact with the contact support portion 5A. However, the container 20 swings to the upstream side or to the downstream side in the conveying direction. Therefore, one side surface 20a of the container 20 may come into contact with the contact support portion 4A, and may not come into contact with the contact support portion 4A and the contact support portion 5A.

Next, as illustrated in FIG. 4, the actuator 9 is driven so that the roller portion 9C protrudes from the cylinder portion 9A, and the roller portion 9C is moved along the inclined groove 5t while coming into contact with the inclined groove 5t.

Figure 5A:
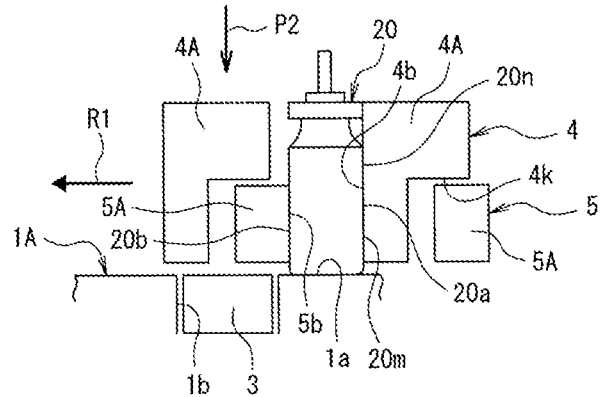
FIGS. 5A to 5D are views illustrating a procedure for conveying the article to an article inspection position and weighing the article by the article conveying device according to the first embodiment of the present invention, and are views observed in a direction of an arrow A in FIGS. 1 and 2.
Figure 5B:
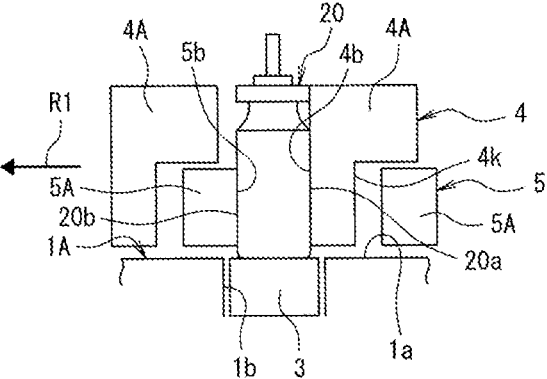
Figure 5C:
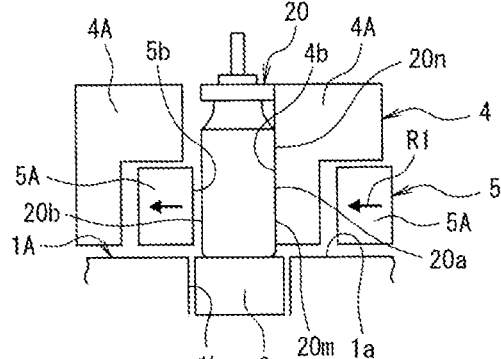
Figure 5D:
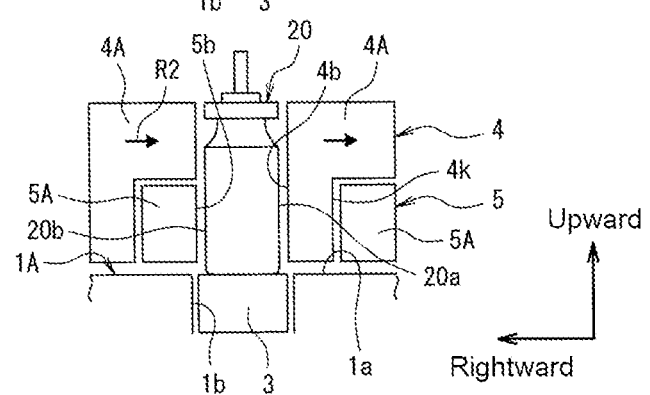

In this manner, the holding wheel 5 rotates relative to the star wheel 4 in the rotation direction R1 to separate the contact support portion 5A from the contact support portion 4A, and the contact surface 5b of the contact support portion 5A is separated from the other side surface 20b of the container 20 (refer to FIG. 5C).

At this time, the coil spring 8 is elastically deformed to contract, and the distance between one end portion Sc of the opening window 5W and the other end portion 4d of the opening window 4W is shortened, compared to when the container 20 is held by the contact support portions 4A and the contact support portions 5A.

Next, the drive motor 6 rotates the star wheel 4 in the rotation direction R2 opposite to the rotation direction R1 of the holding wheel 5, the coil spring 8 is further compressed, a distance between one end portion Sc of the opening window 5W and the other end portion 4d of the opening window 4W is shortened, and the contact support portion 4A is separated from the contact support portion 5A. In this manner, the contact surface 4b of the contact support portion 4A is separated from one side surface 20a of the container 20 (refer to FIGS. 4 and 5D).

In this manner, the container 20 is released from the contact support portion 4A and the contact support portion 5A, and loads of the star wheel 4 and the holding wheel 5 are not applied to the container 20. In this state, the container weighing unit 3 weighs the container 20.

In addition, during the conveyance, a slight gap is formed between the other side surface 20b of the container 20 and the contact surface 5b of the contact support portion 5A. The container is conveyed to the container inspection position P2 while sliding on the conveying surface 1a in a state where a bottom surface of the container 20 is in contact with the conveying surface 1a.

Therefore, when the contact support portion 4A and the contact support portion 5A are separated from the container 20 during weighing of the container 20, the container 20 can be prevented from swaying due to collision with the conveying surface 1a, and the behavior of the container 20 can be stabilized. Therefore, the container 20 can be accurately positioned at the container inspection position P2 and accurately weighed.

The drive motor 6 and the actuator 9 may be simultaneously driven to simultaneously separate the contact support portion 4A and the contact support portion 5A from the container 20, or to simultaneously bring the contact support portion 4A and the contact support portion 5A closer to each other.

On the other hand, at a timing at which the container 20 is released from the contact support portion 4A and the contact support portion 5A, the container 20 is loaded in the recess portions 4a and 5a from the container loading unit 11 at the container loading position P1, and the container 20 is unloaded to the container unloading unit 12 from the recess portions 4a and 5a at the container unloading position P3.

When the container 20 is conveyed, a slight gap is formed between the other side surface 20b of the container 20 and the contact surface 5b of the contact support portion 5A.

Therefore, the container 20 may be loaded and unloaded in advance without waiting for a timing at which the container 20 is released.

When the weighing of the container 20 is completed at the container inspection position P2 by the container weighing unit 3, the actuator 9 is driven and the roller portion 9C moves toward the cylinder portion 9A. In this manner, the roller portion 9C is separated from the inclined groove 5t.

At this time, the coil spring 8 is elastically deformed to stretch to the maximum. In this manner, the holding wheel 5 rotates relative to the star wheel 4 so that the contact support portion 5A is closer to the contact support portion 4A. The contact surface 4b of the contact support portion 4A comes into contact with one side surface 20a of the container 20, and a slight gap is formed between the other side surface 20b of the container 20 and the contact surface 5b of the contact support portion 5A.

In this manner, the completely weighed container 20 is conveyed from the container inspection position P2 to the container unloading position P3 in a state where the posture is maintained by the contact support portion 4A and the contact support portion 5A, and is unloaded to the container unloading unit 12 at the container unloading position P3.

In order to shorten a weighing time of the container 20 at the container inspection position P2, it is preferable to shorten a time during which the container 20 is released from the contact support portion 4A and the contact support portion 5A.

In the container conveying device 2 of the present embodiment, two containers 20 are loaded in the recess portions 4a and 5a from the container loading unit 11 at a timing at which the containers 20 are released from the contact support portion 4A and the contact support portion 5A at the container inspection position P2. The two containers 20 are unloaded to the container unloading unit 12 from the recess portions 4a and 5a.

Therefore, at a timing the same as a timing at which the container 20 is released from the contact support portion 4A and the contact support portion 5A at the container inspection position P2, a conveying speed of the container conveying unit 13 is increased to quickly load the two containers 20 in the recess portions 4a and 5a at the container loading position P1.

As a result, the two containers 20 are quickly unloaded from the recess portions 4a and 5a at the container unloading position P3 at the timing the same as the timing at which the container 20 is released from the contact support portion 4A and the contact support portion 5A at the container inspection position P2.

Next, an advantageous effect of the container conveying device 2 of the present embodiment will be described.

The container conveying device 2 of the present embodiment has the contact support portion 4A and the contact support portion 5A which accommodates the containers 20 to be sequentially loaded from the container loading unit 11, and has the star wheel 4 and the holding wheel 5 which convey the containers 20 accommodated in the contact support portion 4A and the contact support portion 5A to the container inspection position P2.

The star wheel 4 is provided to be rotatable in the conveying direction of the container 20. The holding wheel 5 is provided to be rotatable in the conveying direction of the container 20, and to be rotatable relative to the star wheel 4.

The contact support portions 4A are provided at an equal interval in the outer peripheral portion of the star wheel 4, and can come into contact with one side surface 20a of the container 20. The contact support portions 5A are provided at an equal interval in the outer peripheral portion of the holding wheel 5, and can come into contact with the other side surface 20*b* of the container 20.

In addition to this configuration, the container 20 is conveyed while the posture of the container 20 is maintained by bringing the contact support portion 4A into contact with the container 20 when the container 20 is not located at the container inspection position P2. Therefore, the container 20 can be conveyed from the container loading position P1 to the container inspection position P2 at a high speed.

In addition, the contact support portion 4A and the contact support portion 5A are separated from the container 20 when the container 20 is located at the container inspection position P2. Therefore, the container 20 can be prevented from interfering with the contact support portion 4A and the contact support portion 5A at the container inspection position P2.

As a result, the container 20 loaded from the container loading unit 11 can be conveyed to the container inspection position P2 at a high speed, and the container 20 can be accurately positioned at the container inspection position P2. The container 20 can be accurately weighed at the container inspection position P2, and the weighing time of the container 20 can be shortened.

In addition, the container conveying device 2 of the present embodiment has the coil spring 8 which is installed in the opening window 4W formed in the star wheel 4 and the opening window 5W formed in the holding wheel 5, which can transmit power from the star wheel 4 to the holding wheel 5, and which is elastically deformable when the star wheel 4 and the holding wheel 5 rotate relative to each other, and the actuator 9 that elastically deforms the coil spring 8 so that the holding wheel 5 rotates relative to the star wheel 4.

In addition, the container conveying device 2 has the drive motor 6 that elastically deforms the coil spring 8 to move the star wheel 4 relative to the holding wheel 5 when the container 20 is conveyed to the container inspection position P2.

In this manner, for example, when the coil spring 8 stretches to the maximum, the container 20 can be conveyed to the container inspection position P2 by forming the interval between the star wheel 4 and the holding wheel 5 to be the interval slightly larger than the maximum dimensional tolerance of the container 20, and by accommodating the container 20 between the star wheel 4 and the holding wheel 5.

Therefore, the container 20 can be conveyed from the container loading position P1 to the container inspection position P2 at a high speed, and the weighing time of the container can be more effectively shortened.

In addition, when the star wheel 4 is rotated in the conveying direction of the container 20, the power of the star wheel 4 can be transmitted to the holding wheel 5 via the coil spring 8. Therefore, in a state where the container 20 is held by the contact support portion 4A and the contact support portion 5A, the container 20 can be conveyed to the container inspection position P2. Therefore, a dedicated actuator for driving the holding wheel 5 is not required.

In addition, the holding wheel 5 is rotated relative to the star wheel 4 by the actuator 9 to elastically deform the coil spring 8. In this manner, the contact support portion 5A can be separated from the container 20.

In addition, the power is transmitted from the drive motor 6 to the star wheel 4. In this manner, the coil spring 8 is elastically deformed to move the star wheel 4 relative to the holding wheel 5. In this manner, the contact support portion 4A can be separated from the container 20.

Therefore, the container 20 can be conveyed to the container inspection position P2 at a high speed by the container conveying device 2 having a simple configuration, and the container 20 can be accurately positioned at the container inspection position P2. Moreover, the container 20 can be reliably prevented from interfering with the contact support portion 4A and the contact support portion 5A at the container inspection position P2, and the container 20 can be accurately weighed.

In addition, according to the container conveying device 2 of the present embodiment, when the container 20 is located at the container inspection position P2, the actuator 9 rotates the holding wheel 5 relative to the star wheel 4. In this manner, the contact support portion 5A is separated from the other side surface 20*b* of the container 20, and the drive motor 6 moves the star wheel 4 in the rotation direction R2 opposite to the rotation direction R1 of the holding wheel 5. In this manner, the contact support portion 4A is separated from one side surface 20*a* of the container 20.

In this manner, the containers 20 accommodated in the contact support portion 4A and the contact support portion 5A are conveyed to the container inspection position P2 at a high speed, and the actuator 9 and the drive motor 6 are driven so that the contact support portion 4A and the contact support portion 5A are separated from the container 20 at the container inspection position P2. In this manner, the container 20 can be reliably prevented from interfering with the contact support portion 4A and the contact support portion 5A, and the container 20 can be accurately weighed.

In addition, according to the container conveying device 2 of the present embodiment, the inclined groove 5*t* is formed along the rotation direction R of the holding wheel 5.

The actuator 9 has the rotatable roller portion 9C moving along the inclined groove 5*t* while coming into contact with the inclined groove 5*t*, and is configured to rotate the holding wheel 5 relative to the star wheel 4. The inclined groove 5*t* is inclined with respect to the moving direction of the roller portion 9C.

In this manner, when the container 20 is conveyed to the container inspection position P2, the actuator 9 moves the roller portion 9C along the inclined groove 5*t*. In this manner, the holding wheel 5 can be rotated relative to the star wheel 4. Therefore, the contact support portion 5A can be reliably prevented from interfering with the container 20 at the container inspection position P2.

In addition to this configuration, the rotation of the holding wheel 5 is restricted in a state where the roller portion 9C is brought into contact with the inclined groove 5*t*. In this state, the coil spring 8 is elastically deformed by the drive motor 6 to move the star wheel 4 relative to the holding wheel 5. In this manner, the contact support portion 4A can be separated from the container 20. Therefore, the contact support portion 4A can be reliably prevented from interfering with the container 20 at the container inspection position P2.

As a result, the container 20 can be reliably prevented from interfering with the contact support portion 4A and the contact support portion 5A at the container inspection position P2, and the container 20 can be accurately weighed.

In addition, according to the container conveying device 2 of the present embodiment, the contact support portion 4A has the contact surface 4*b* which comes into contact with one side surface 20*a* of the container 20, and the contact support portion 5A has the contact surface 5*b* which comes into contact with the other side surface 20b of the container 20. The contact surface 5b extends from the lower portion 20m to the upper portion 20n of the container 20.

In this manner, the container 20 can be conveyed by pressing the whole contact surface 4b of the contact support portion 4A against the container 20, and can be conveyed from the container loading position P1 to the container inspection position P2 at a high speed by stably maintaining the posture of the container 20.

In the container conveying device 2 of the present embodiment, the contact surface 4b extends from the lower portion 20m to the upper portion 20n of the container 20, but the present invention is not limited thereto.

Figure 6:
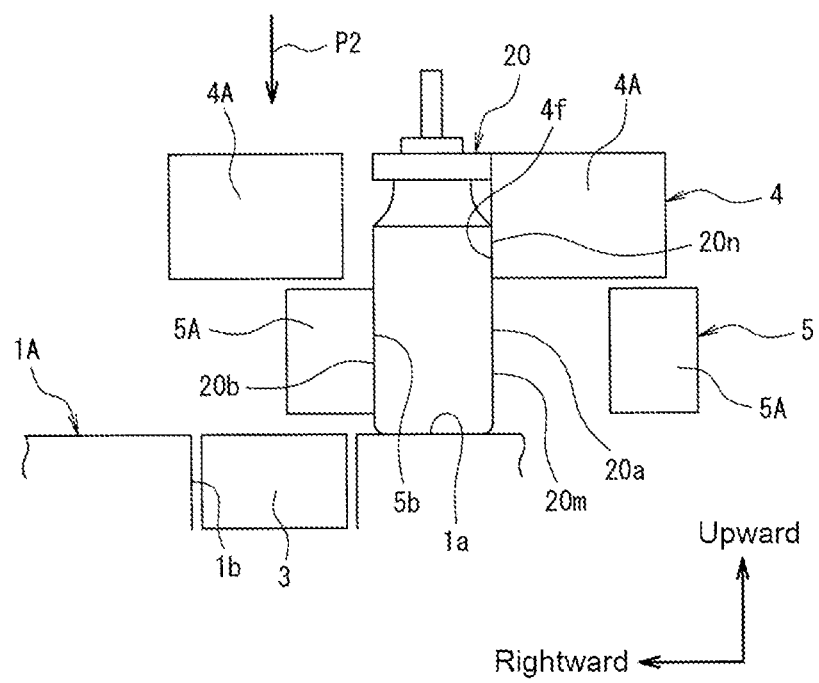
FIG. 6 is a view illustrating another shape of the contact support portion of the article conveying device according to the first embodiment of the present invention.

For example, as illustrated in FIG. 6, the star wheel 4 and the holding wheel 5 may face each other in the upward-downward direction, and the contact surface 4f of the contact support portion 4A of the star wheel 4 may be brought into contact with the upper portion 20n of the container 20. In addition, the contact surface 4b may extend from the lower portion 20m to the upper portion 20n of the container 20.

In addition, according to the container conveying device 2 of the present embodiment, the star wheel 4 is a rotating member in which the conveying direction of the container 20 is the rotation direction, and the holding wheel 5 is a rotating member which is rotatable in a normal/reverse direction of the rotation direction of the star wheel 4.

In this manner, an installation area of the container conveying device 2 can be reduced, compared to a case where the containers 20 are linearly conveyed.

In addition, two actuators 9 are installed at an interval of 180° in the present embodiment, but the present invention is not limited thereto. For example, only one actuator 9 may be installed, or three or more actuators 9 may be installed apart in a circumferential direction (rotation direction) of the star wheel 4.

In addition, in the container conveying device 2 of the present embodiment, the rotatable star wheel 4 and the holding wheel 5 form the conveying member, but the present invention is not limited thereto.

For example, the conveying member may be formed by a first conveying member that is movable in a straight moving direction, and a second conveying member that is movable integrally with the second conveying member in the straight moving direction and relatively movable in the straight moving direction with respect to the first conveying member. The contact support portion may be provided along the moving direction of the first conveying member and the second conveying members in end portions of the first conveying member and the second conveying member.

In addition, in the container conveying device 2 of the present embodiment, the contact support portion 4A is brought into contact with the container 20 when the container 20 is conveyed. However, both the contact support portion 4A and the contact support portion 5A may be brought into contact with the container 20. That is, the container 20 may be held by the contact support portion 4A and the contact support portion 5A.

In addition, in the container conveying device 2 of the present embodiment, an example in which the container 20 is weighed at the container inspection position P2 has been described, but the present invention is not limited thereto. For example, the container conveying device 2 of the present embodiment is applicable to other inspections such as a metal detection and an X-ray transmission inspection.

When the contact support portion is close to an inspection target object during the inspection, in some cases, a measurement result may be affected. For example, when the contact support portion 4A and the contact support portion 5A are made of metal, in some cases, a measurement result may be affected during the metal detection. In addition, in the X-ray inspection, X-rays are radially emitted from an X-ray source. Therefore, a radially spreading end may cover the contact support portion 4A and the contact support portion 5A. Therefore, in some cases, the measurement result may be affected.

Next, a configuration of an article conveying device according to a second embodiment of the present invention will be described with reference to FIGS. 7 and 8. The same reference numerals will be assigned to the same configurations as those of the first embodiment, and description thereof will be omitted.

Figure 7:
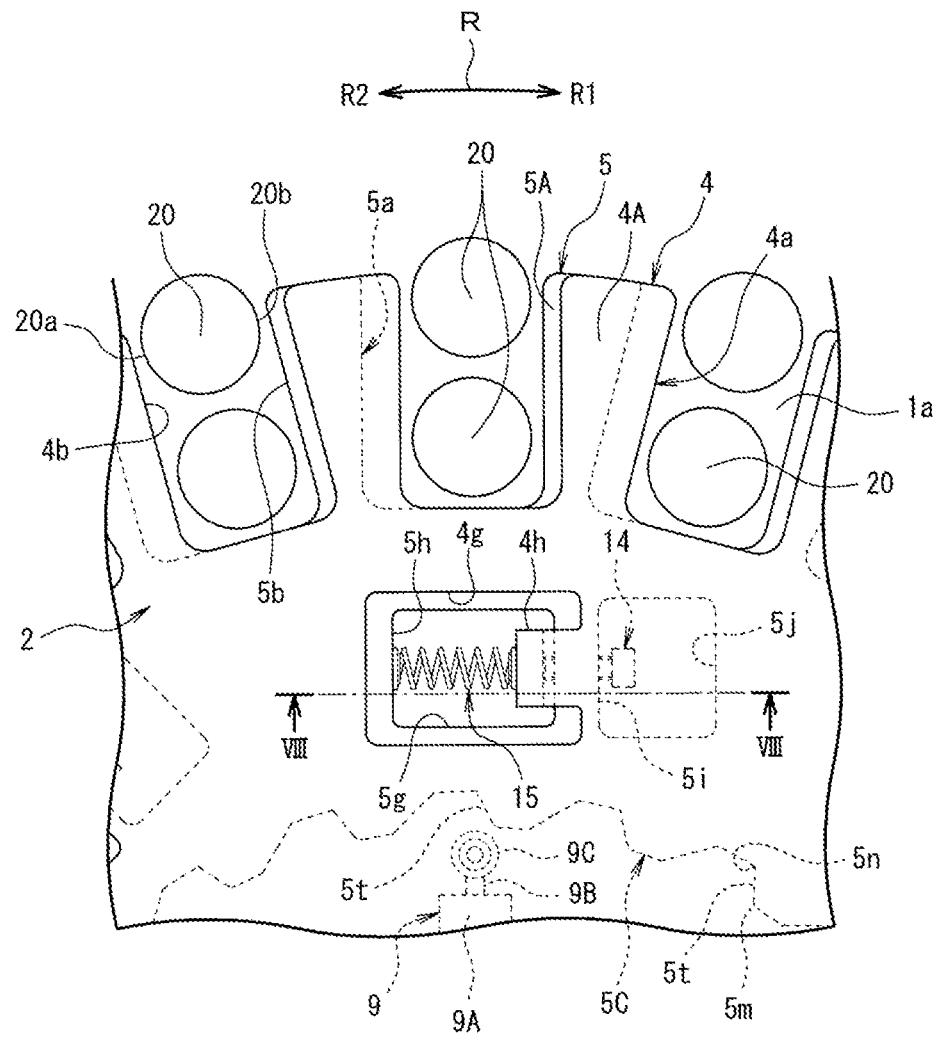
FIG. 7 is a view illustrating a portion of an article conveying device according to a second embodiment of the present invention.
Figure 8:
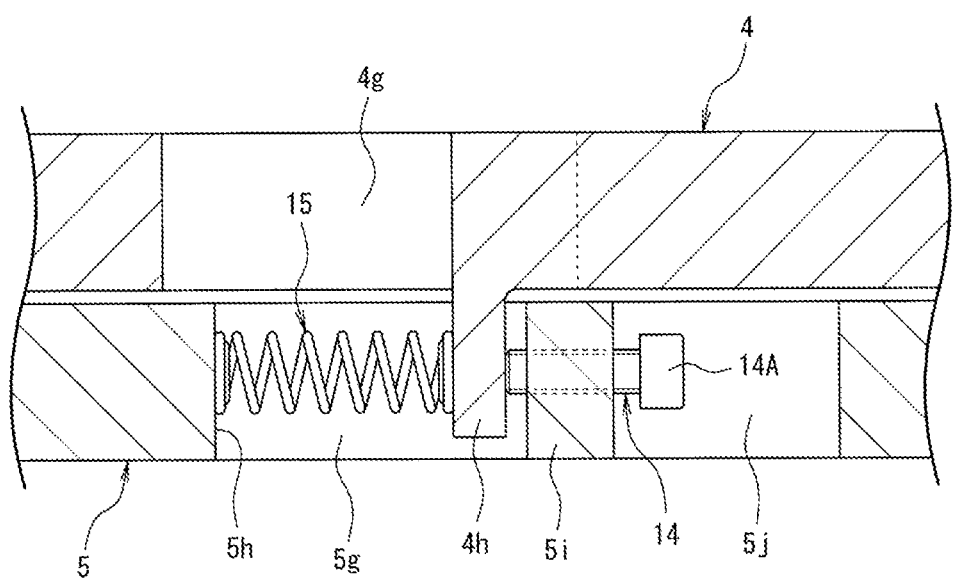
FIG. 8 is a sectional view taken along line VIII-VIII in FIG. 7.

In FIGS. 7 and 8, six rectangular opening windows 4g (one illustrated) are formed in the star wheel 4, and six rectangular opening windows 5g (one illustrated) are formed in the holding wheel 5. The opening windows 4g and 5g are installed apart in the rotation direction of the star wheel 4. The number of the opening windows 4g and 5g is not limited to six.

An opening area of the opening window 4g is formed to be larger than an opening area of the opening window 5g. When the star wheel 4 is viewed from above, the opening window 5g is located inward of the opening window 4g.

A bent portion 4h is formed in the star wheel 4, and the bent portion 4h is bent downward to be inserted into the opening window 5g from the star wheel 4. That is, the bent portion 4h is provided at a height position the same as that of the holding wheel 5.

A coil spring 15 is accommodated in the opening window 5g. One end portion of the coil spring 15 is in contact with an inner wall surface 5h of the opening window 5g, and the other end portion of the coil spring 15 is in contact with the bent portion 4h.

The coil spring 15 biases the star wheel 4 and the holding wheel 5 in the rotation direction of the star wheel 4 so that the contact support portion 4A and the contact support portion 5A are separated from each other.

A bolt support portion Si is provided in the holding wheel 5, and a bolt 14 is screwed to the bolt support portion Si. A through-hole 5j is formed in the holding wheel 5, and a head portion 14A of the bolt 14 is accommodated in the through-hole 5j. In this manner, an operator can operate the bolt 14 by inserting a tool into the through-hole 5j.

A tip portion (end portion opposite to the head portion 14A) of the bolt 14 is in contact with the bent portion 4h. When the bolt 14 is rotated in one direction and elastically deformed to compress the coil spring 15, the star wheel 4 and the holding wheel 5 rotate relative to each other in the rotation direction of the star wheel 4 so that the contact support portion 4A and the contact support portion 5A are closer to each other.

On the other hand, when the bolt 14 is rotated in the other direction and elastically deformed to stretch the coil spring 15, the star wheel 4 and the holding wheel 5 rotate relative to each other in the rotation direction of the star wheel 4 so that the contact support portion 4A and the contact support portion 5A are separated from each other.

The container conveying device 2 of the present embodiment can position the contact support portion 4A and the contact support portion 5A at a constant interval by adjusting an interval between the contact support portion 4A and the contact support portion 5A in accordance with the diameter of the container 20 by operating the bolt 14.

Therefore, the container 20 can be conveyed to the container inspection position P2 by accommodating the containers 20 having different diameters in the contact support portion 4A and the contact support portion 5A in accordance with the interval between the contact support portion 4A and the contact support portion 5A, by bringing the contact surface 4b of the contact support portions 4A into contact with one side surface 20a of the container 20, and by forming a slight gap between the contact surface 5b of the contact support portion 5A and the other side surface 20b of the container 20.

The bent portion 4h, the bolt support portion Si, and the bolt 14 of the present embodiment form an adjustment unit, and the coil spring 15 forms an elastic member.

When the container 20 is conveyed to the container inspection position P2, the drive motor 6 is stopped to pause the star wheel 4 and the holding wheel 5.

The slight gap is formed between the other side surface 20b of the container 20 and the contact surface 5b of the contact support portion 5A when the container 20 is conveyed. Therefore, when the container 20 is located at the container inspection position P2, and the star wheel 4 and the holding wheel 5 are paused, the other side surface 20b of the container 20 comes into contact with the contact support portion 5A due to the inertia of the container 20.

In this manner, the container 20 can be prevented from being excessively located on the downstream side from the container inspection position P2, and the container 20 can be accurately positioned at the container inspection position P2.

Next, as in FIG. 4, the actuator 9 is driven so that the roller portion 9C protrudes from the cylinder portion 9A, and the roller portion 9C is moved along the inclined groove 5t while coming into contact with the inclined groove 5t.

In this manner, the holding wheel 5 rotates relative to the star wheel 4 in the rotation direction R1 so that the coil spring 15 is compressed and the contact support portion 5A is separated from the contact support portion 4A, and the contact surface 5b of the contact support portion 5A is separated from the other side surface 20b of the container 20.

Next, the drive motor 6 rotates the star wheel 4 in the rotation direction R2 opposite to the rotation direction R1 of the holding wheel 5, the coil spring 15 is further compressed, and the contact support portion 4A is separated from the contact support portion 5A. In this manner, the contact surface 4b of the contact support portion 4A is separated from one side surface 20a of the container 20.

In this manner, the container 20 is released from the contact support portion 4A and the contact support portion 5A, and loads of the star wheel 4 and the holding wheel 5 are not applied to the container 20. In this state, the container weighing unit 3 weighs the container 20.

The drive motor 6 and the actuator 9 may be simultaneously driven to simultaneously separate the contact support portion 4A and the contact support portion 5A from the container 20, or to simultaneously bring the contact support portion 4A and the contact support portion 5A closer to each other.

In this way, the container conveying device 2 of the present embodiment has the coil spring 15 which is installed between the star wheel 4 and the holding wheel 5, which can transmit the power from the star wheel 4 to the holding wheel 5, and which is elastically deformable when the star wheel 4 and the holding wheel 5 move relative to each other.

In addition, the container conveying device 2 has the bent portion 4h, the bolt support portion Si, and the bolt 14 which elastically deform the coil spring 15 to adjust the interval between the contact support portion 4A and the contact support portion 5A and position the contact support portion 4A and the contact support portion 5A at a constant interval, the actuator 9 that elastically deforms the coil spring 15 to move the holding wheel 5 relative to the star wheel 4, and the drive motor 6 that elastically deforms the coil spring 15 to move the star wheel 4 relative to the holding wheel 5.

In this manner, the coil spring 15 is elastically deformed by the bolt 14 to adjust the interval between the contact support portion 4A and the contact support portion 5A, and to position the contact support portion 4A and the contact support portion 5A at a constant interval. In this manner, the container 20 can be conveyed to the container inspection position P2 by forming the interval between the contact support portion 4A and the contact support portion 5A to be the interval slightly larger than the maximum dimensional tolerance of the container 20, and by accommodating the container 20 between the contact support portion 4A and the contact support portion 5A.

Therefore, the container 20 can be conveyed from the container loading position P1 to the container inspection position P2 at a high speed, and the weighing time of the container 20 can be more effectively shortened.

In addition, the bolt 14 is operated to adjust the interval between the contact support portion 4A and the contact support portion 5A in accordance with the diameter (size) of the container 20. In this manner, the containers 20 having different diameters can be conveyed by being accommodated between the contact support portion 4A and the contact support portion 5A.

Therefore, it is not required to use a plurality of types of the star wheels 4 and the holding wheels 5 in which the interval between the contact support portion 4A and the contact support portion 5A is fixed in accordance with the diameter of the container 20, and manufacturing costs of the container conveying device 2 can be greatly reduced.

In addition, when the star wheel 4 is moved in the conveying direction of the container 20, the power of the star wheel 4 can be transmitted to the holding wheel 5 via the coil spring 15. Therefore, a dedicated actuator for driving the star wheel 4 is not required.

In addition, the holding wheel 5 is moved relative to the star wheel 4 by the actuator 9 to elastically deform the coil spring 15. In this manner, the contact support portion 5A can be separated from the container 20.

In addition, the coil spring 15 is elastically deformed by the drive motor 6 to move the star wheel 4 relative to the holding wheel 5. In this manner, the contact support portion 4A can be separated from the container 20.

As a result, the container 20 can be conveyed to the container inspection position P2 at a high speed by the container conveying device 2 having a simple configuration, and the container 20 can be accurately positioned at the container inspection position P2. Moreover, the container 20 can be reliably prevented from interfering with the contact support portion 4A and the contact support portion 5A at the container inspection position P2, and the container 20 can be accurately weighed.

Next, a configuration of an article conveying device according to a third embodiment of the present invention will be described with reference to FIGS. 9 to 12. The same reference numerals will be assigned to the same configurations as those of the first embodiment, and description thereof will be omitted.

Figure 9:
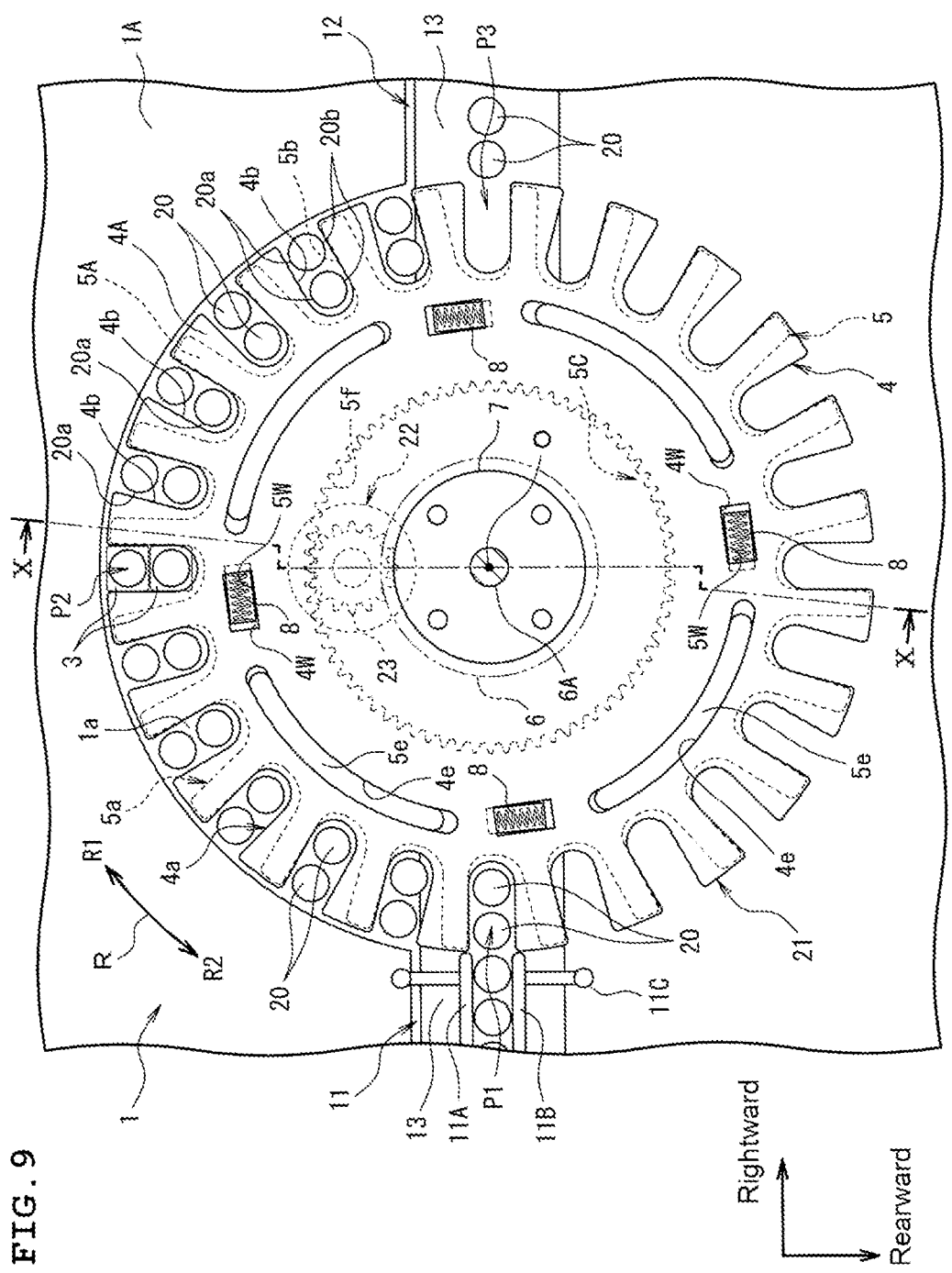
FIG. 9 is a plan view of an article weighing device including an article conveying device according to a third embodiment of the present invention, and illustrates a state where a contact support portion is separated from an article.

As illustrated in FIG. 9, the container weighing device 1 includes a container conveying device 21 serving as an article conveying device that conveys the container 20 along a circumferential conveying course, a container weighing unit 3 that weighs the container 20 at the container inspection position P2 in an intermediate portion of the conveying course, the container loading unit 11 that loads the container in the container conveying device 21 at the container loading position P1, and the container unloading unit 12 that unloads the container 20 from the container conveying device 21 at the container unloading position P3.

The container conveying device 21 includes the star wheel 4 and the holding wheel 5. Internal teeth 5f are formed in an opening portion 5C located inward of the holding wheel 5 in the radial direction with respect to the contact support portions 4A and 5A, and the internal tooth 5f are formed in the circumferential direction (rotation direction) of the holding wheel 5. The internal teeth 5f of the present embodiment form a tooth portion.

Figure 10:
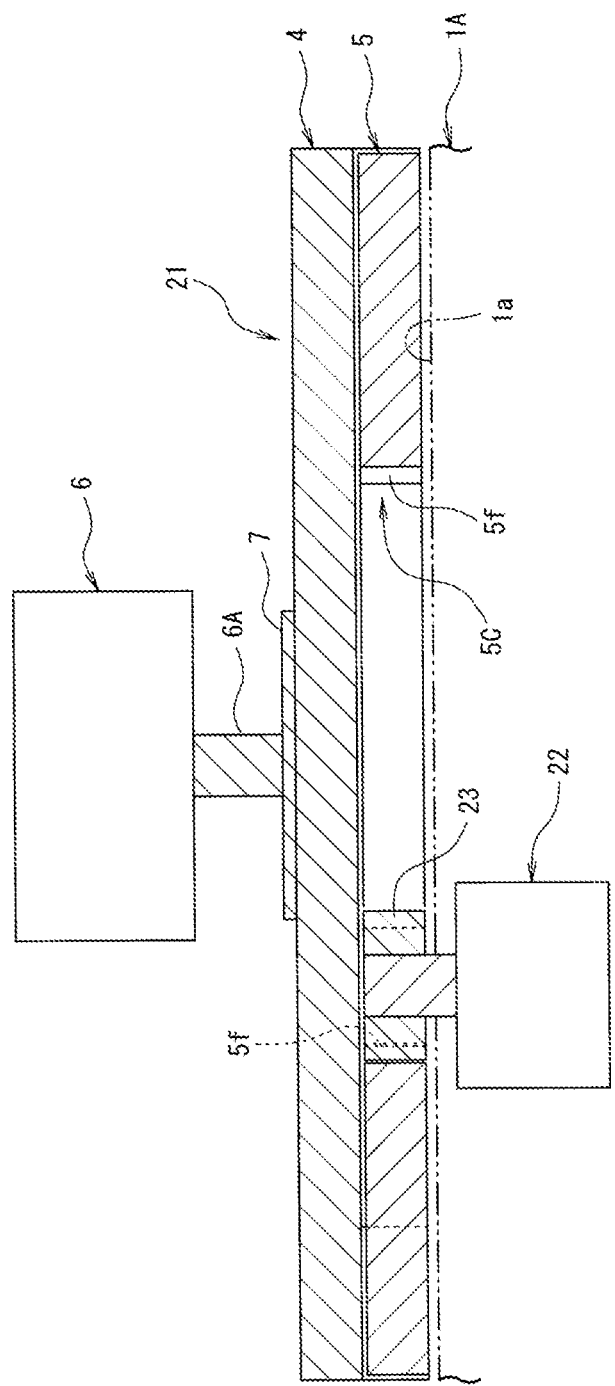
FIG. 10 is a sectional view taken along line X-X in FIG. 9.

As illustrated in FIGS. 9 and 10, the fixed member 7 fixed to the drive shaft 6A of the drive motor 6 is provided in an upper portion of the star wheel 4, and the fixed member 7 is fixed to an upper surface of the star wheel 4. When the drive motor 6 is rotationally driven, the star wheel 4 rotates integrally with the fixed member 7.

The container conveying device 21 includes a drive motor 22 having a stepping motor and a gear 23. The drive motor 22 is installed below the gear 23, and is attached to the main body 1A. The drive motor 22 is connected to the gear 23, and the gear 23 is rotationally driven by the drive motor 22. When the drive motor 22 rotates the gear 23, the holding wheel 5 rotates.

The drive motor 6 of the present embodiment forms a third drive unit, and the drive motor 22 and gear 23 form a fourth drive unit. In addition, the gear 23 and the internal teeth 5f form a power transmission unit.

Next, an operation of the container conveying device 21 of the present embodiment will be described.

When the container 20 is loaded in the recess portions 4a and 5a at the container loading position P1, the drive motor 6 is stopped at a timing at which the container 20 is loaded in the contact support portion 4A and the contact support portion 5A, and the star wheel 4 and the holding wheel 5 are paused.

Next, the drive motor 22 is driven (excited) to rotate the gear 23 in the clockwise rotation direction R1.

In this manner, the holding wheel 5 rotates in the clockwise rotation direction R1 relative to the star wheel 4 so that the contact support portion 5A is separated from the contact support portion 4A, and an interval between the contact support portion 4A and the contact support portion 5A in the rotation direction of the star wheel 4 is widened. Therefore, a sufficient space for accommodating the container 20 is formed between the contact support portion 4A and the contact support portion 5A.

At this time, the container 20 is loaded between the contact support portion 4A and the contact support portion 5A at the container loading position P1 (refer to FIG. 9). When the container 20 is loaded, the sufficient space for accommodating the container 20 is formed between the contact support portion 4A and the contact support portion 5A. Therefore, loading performance of the container 20 can be improved.

When the container 20 is loaded between the contact support portion 4A and the contact support portion 5A at the container loading position P1, the drive motor 22 is brought into a non-excited state so that the gear 23 is rotatable.

Figure 11:
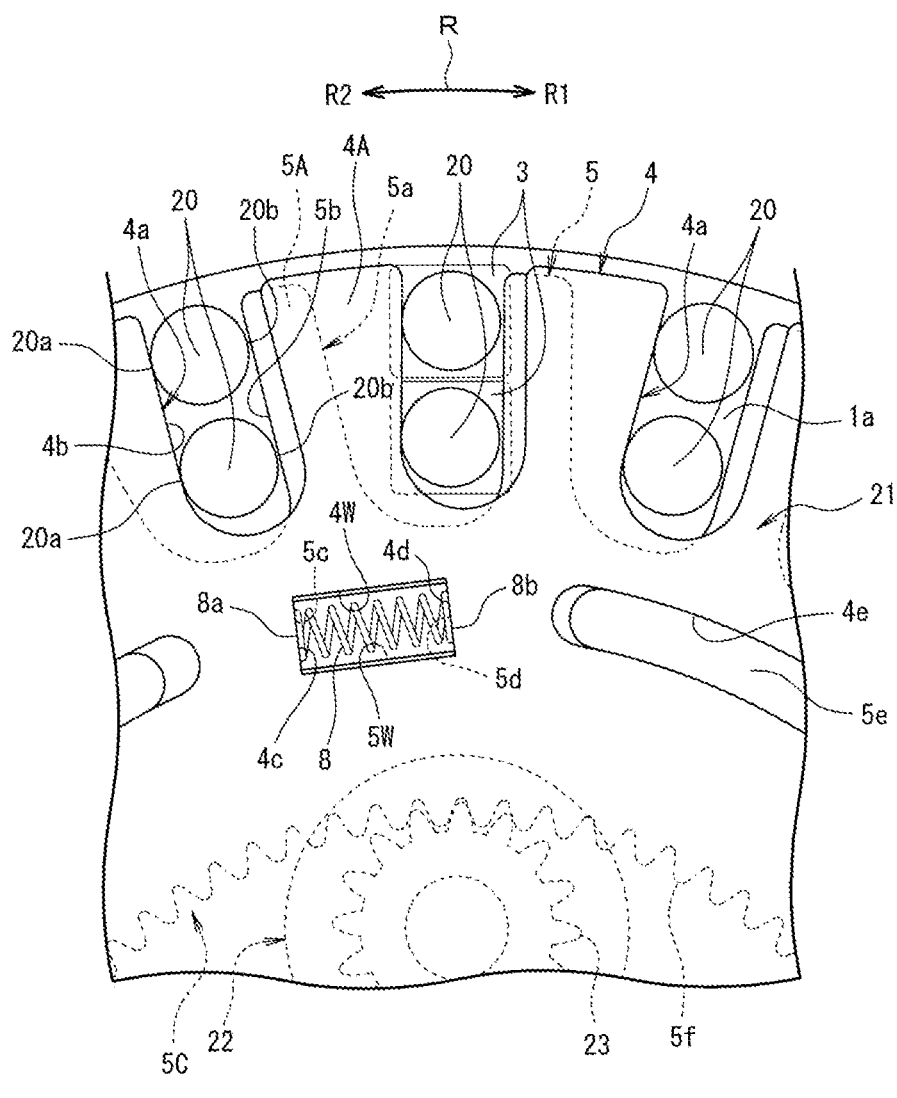
FIG. 11 is an enlarged plan view of the contact support portion of the article conveying device according to the third embodiment of the present invention, and illustrates a state where the article is held by the contact support portion.
Figure 12:
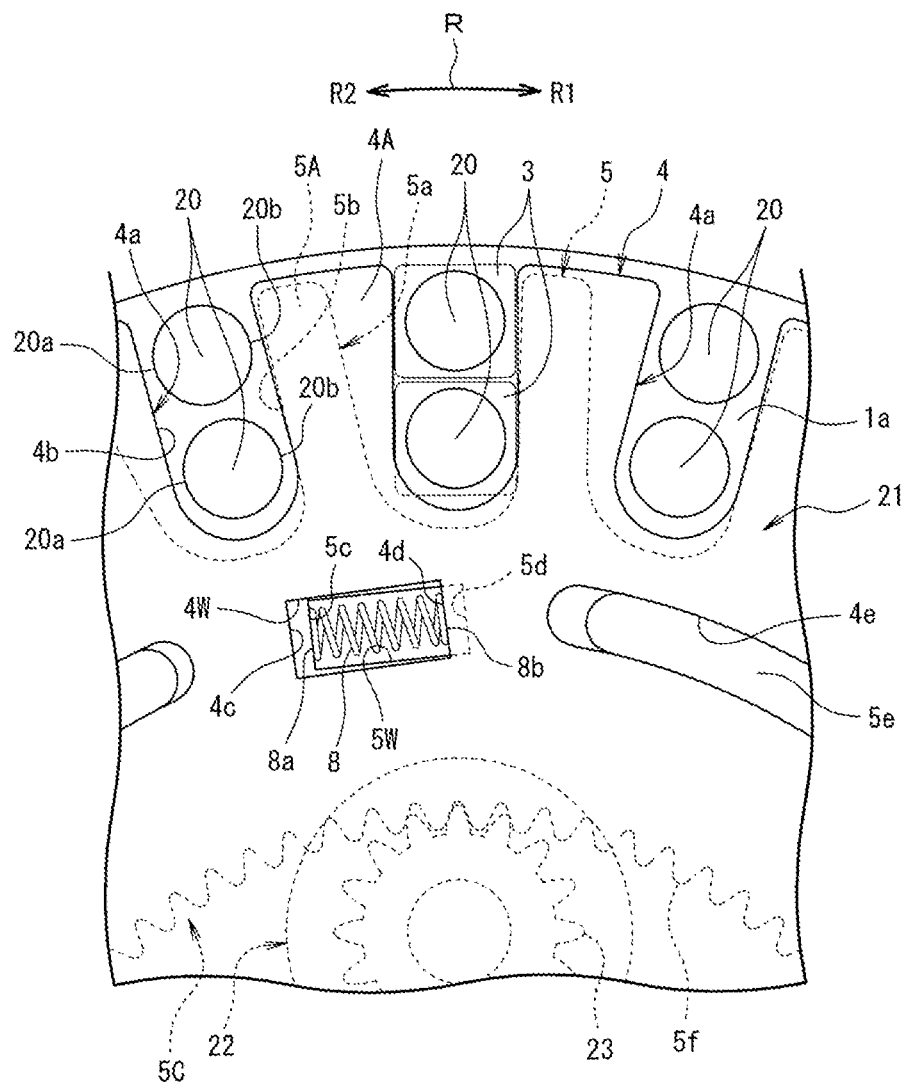
FIG. 12 is an enlarged plan view of the contact support portion of the article conveying device according to the third embodiment of the present invention, and illustrates a state where the contact support portion is separated from the article.

At this time, the star wheel 4 and the holding wheel 5 are biased by the coil spring 8, and the coil spring 8 stretches to the maximum so that one end portion 4c of the opening window 4W and one end portion 5c of the opening window 5W overlap in the upward-downward direction, and so that the other end portion 4d of the opening window 4W and the other end portion 5d of the opening window 5W overlap in the upward-downward direction (refer to FIG. 11). In a stretching process of the coil spring 8, the gear 23 rotates in the counterclockwise rotation direction R2, and the holding wheel 5 rotates relative to the star wheel 4 in the counterclockwise rotation direction R2.

When the coil spring 8 stretches to the maximum, an interval between the contact surface 4b of the contact support portion 4A and the contact surface 5b of the contact support portion 5A in the rotation direction of the star wheel 4 is formed to be an interval slightly larger than the maximum dimensional tolerance of the diameter of the container 20.

When the drive motor 6 is driven in this state to rotate the star wheel 4 in the clockwise rotation direction R1, the power of the star wheel 4 is transmitted to the holding wheel 5 via the coil spring 8.

When the star wheel 4 and the holding wheel 5 rotate, the container 20 is pushed by the contact support portion 4A, and the container 20 is conveyed from the container loading position P1 toward the container inspection position P2.

That is, one side surface 20a of the container 20 comes into contact with the contact surface 4b of the contact support portion 4A of the star wheel 4, and the container 20 is pushed by the contact support portion 4A. In this manner, the container 20 is conveyed to the container inspection position P2. At this time, a slight gap is formed between the other side surface 20b of the container 20 and the contact surface 5b of the contact support portion 5A, and the container 20 is conveyed from the container loading position P1 to the container inspection position P2 while sliding on the conveying surface 1a of the main body 1A (refer to FIG. 5A).

The slight gap is formed between the other side surface 20b of the container 20 and the contact surface 5b of the contact support portion 5A. However, as the container 20 is conveyed, the other side surface 20b of the container 20 may come into contact with the contact surface 5b of the contact support portion 5A. When the container 20 tries to excessively swing, the container 20 comes into contact with the contact support portion 5A, thereby preventing the container 20 from being conveyed in an inclined state.

In addition, a slight gap is formed between the other side surface 20b of the container 20 and the contact surface 5b of the contact support portion 5A. Therefore, the container 20 is not completely held between the contact support portion 4A and the contact support portion 5A.

Therefore, a bottom surface of the container 20 can be slid on the conveying surface 1a of the main body 1A, it is possible to prevent a possibility that the bottom surface of the container 20 may strongly collide with the conveying surface 1a, and the container 20 may receive a strong impact during the conveyance.

When the container 20 accommodated in the recess portions 4a and 5a is conveyed to the container inspection position P2 (refer to FIG. 5B), the drive motor 6 is stopped to pause the star wheel 4 and the holding wheel 5.

The slight gap is formed between the other side surface 20b of the container 20 and the contact surface 5b of the contact support portion 5A when the container 20 is conveyed. Therefore, when the container 20 is located at the container inspection position P2, and the star wheel 4 and the holding wheel 5 are paused, the other side surface 20b of the container 20 comes into contact with the contact support portion 5A due to the inertia of the container 20.

In this manner, the container 20 can be prevented from being excessively located on the downstream side from the container inspection position P2, and the container 20 can be accurately positioned at the container inspection position P2.

When the star wheel 4 and the holding wheel 5 are paused, due to the inertia of the container 20, the other side surface 20b of the container 20 often comes into contact with the contact support portion 5A. However, the container 20 swings to the upstream side or to the downstream side in the conveying direction. Therefore, one side surface 20a of the container 20 may come into contact with the contact support portion 4A, and may not come into contact with the contact support portion 4A and the contact support portion 5A.

Next, the drive motor 22 is driven (excited) to rotate the gear 23 in the clockwise rotation direction R1. In this manner, the holding wheel 5 rotates in the clockwise rotation direction R1 relative to the star wheel 4 so that the contact support portion 5A is separated from the contact support portion 4A, and the contact surface 5b of the contact support portion 5A is separated from the other side surface 20b of the container 20 (refer to FIG. 5C).

At this time, the coil spring 8 is elastically deformed to contract, and the distance between one end portion Sc of the opening window 5W and the other end portion 4d of the opening window 4W is shortened, compared to when the container 20 is held by the contact support portions 4A and the contact support portions 5A.

Next, the drive motor 6 rotates the star wheel 4 in the counterclockwise rotation direction R2, the coil spring 8 is further compressed, and the contact support portion 4A is separated from the contact support portion 5A. In this manner, the contact surface 4b of the contact support portion 4A is separated from one side surface 20a of the container 20 (refer to FIGS. 5D and 12).

In this manner, the container 20 is released from the contact support portion 4A and the contact support portion 5A, and loads of the star wheel 4 and the holding wheel 5 are not applied to the container 20. In this state, the container weighing unit 3 weighs the container 20. At this time, the drive motor 22 is brought into an excited state so that the gear 23 is not rotated. Therefore, the holding wheel 5 does not rotate.

In addition, when the container 20 is conveyed, the slight gap is formed between the other side surface 20b of the container 20 and the contact surface 5b of the contact support portion 5A. Therefore, the container 20 is conveyed to the container inspection position P2 while sliding on the conveying surface 1a in a state where a bottom surface of the container 20 is in contact with the conveying surface 1a.

Therefore, when the contact support portion 4A and the contact support portion 5A are separated from the container 20 during weighing of the container 20, the container 20 can be prevented from swaying due to collision with the conveying surface 1a, and the behavior of the container 20 can be stabilized. Therefore, the container 20 can be accurately positioned at the container inspection position P2 and accurately weighed.

On the other hand, at a timing at which the container 20 is released from the contact support portion 4A and the contact support portion 5A, the container 20 is loaded in the recess portions 4a and 5a from the container loading unit 11 at the container loading position P1, and the container 20 is unloaded to the container unloading unit 12 from the recess portions 4a and 5a at the container unloading position P3.

When the container 20 is conveyed, a slight gap is formed between the other side surface 20b of the container 20 and the contact surface 5b of the contact support portion 5A.

Therefore, the container 20 may be loaded and unloaded in advance without waiting for a timing at which the container 20 is released.

When the weighing of the container 20 is completed at the container inspection position P2 by the container weighing unit 3, the drive motor 22 is brought into a non-excited state so that the gear 23 is rotatable.

At this time, the coil spring 8 is elastically deformed to stretch to the maximum. In this manner, the holding wheel 5 and the star wheel 4 rotate relative to each other so that the contact support portion 5A and the contact support portion 4A are closer to each other. The contact surface 4b of the contact support portion 4A comes into contact with one side surface 20a of the container 20, and a slight gap is formed between the other side surface 20b of the container 20 and the contact surface 5b of the contact support portion 5A.

In this manner, when the star wheel 4 is driven to rotate in the clockwise rotation direction R1 by the drive motor 6, the completely weighed container 20 is conveyed from the container inspection position P2 to the container unloading position P3 in a state where the posture is maintained by the contact support portion 4A and the contact support portion 5A, and is unloaded at the container unloading position P3 in the container unloading unit 12.

Next, an advantageous effect of the container conveying device 21 of the present embodiment will be described.

The container conveying device 21 of the present embodiment has the contact support portions 4A and 5A which accommodate the containers 20 to be sequentially loaded from the container loading unit 11, and has the star wheel 4 and the holding wheel 5 which convey the containers 20 accommodated in the contact support portions 4A and 5A to the container inspection position to P2.

The star wheel 4 is provided to be rotatable in the conveying direction of the container 20. The holding wheel 5 is provided to be rotatable in the conveying direction of the container 20, and to be rotatable relative to the star wheel 4.

The contact support portions 4A are provided at an equal interval in the outer peripheral portion of the star wheel 4, and can come into contact with one side surface 20a of the container 20. The contact support portions 5A are provided at an equal interval in the outer peripheral portion of the holding wheel 5, and can come into contact with the other side surface 20b of the container 20.

In addition to this configuration, the container 20 is conveyed while the posture of the container 20 is maintained by bringing the contact support portion 4A into contact with the container 20 when the container 20 is not located at the container inspection position P2. Therefore, the container 20 can be conveyed from the container loading position P1 to the container inspection position P2 at a high speed.

In addition, the contact support portion 4A and the contact support portion 5A are separated from the container 20 when the container 20 is located at the container inspection position P2. Therefore, the container 20 can be prevented from interfering with the contact support portion 4A and the contact support portion 5A at the container inspection position P2.

As a result, the container 20 loaded from the container loading unit 11 can be conveyed to the container inspection position P2 at a high speed, and the container 20 can be accurately positioned at the container inspection position P2. The container 20 can be accurately weighed at the container inspection position P2, and the weighing time of the container 20 can be shortened.

In addition, the container conveying device 21 of the present embodiment has the drive motor 22 which rotates the star wheel 4 in the conveying direction of the container 20, and the drive motor 22 and the gear 23 which rotate the holding wheel 5 in the conveying direction of the container 20.

The holding wheel 5 has the internal teeth 5f formed along the rotation direction of the holding wheel 5. The gear 23 is rotatable by meshing with the internal teeth 5f, and the drive motor 22 rotationally drives the gear 23.

In this manner, the drive motor 6 can move the star wheel 4 in the conveying direction of the container 20, and the drive motor 22 can rotate the gear 23 to move the holding wheel 5. Therefore, the star wheel 4 and the holding wheel 5 can be moved in the conveying direction, and can be moved relative to each other at the container inspection position P2.

In addition, the container conveying device 21 has the coil spring 8 which is installed in the opening window 4W formed in the star wheel 4 and the opening window 5W formed in the holding wheel 5, which can transmit the power from the star wheel 4 to the holding wheel 5, and which is elastically deformable when the star wheel 4 and the holding wheel 5 rotate relative to each other.

The container conveying device 21 rotates the gear 23 by the drive motor 22 so that the coil spring 8 is elastically deformed to move the holding wheel 5 relative to the star wheel 4 and the power is transmitted from the drive motor 6 to star wheel 4. In this manner, the coil spring 8 is elastically deformed to rotate the star wheel 4 relative to the holding wheel 5.

In this manner, when the coil spring 8 stretches to the maximum, the container 20 can be conveyed to the container inspection position P2 by forming the interval between the contact support portion 4A and the contact support portion 5A to be the interval slightly larger than the maximum dimensional tolerance of the container 20, and by accommodating the container 20 between the contact support portion 4A and the contact support portion 5A.

Therefore, the container 20 can be conveyed from the container loading position P1 to the container inspection position P2 at a high speed, and the inspection time of the container 20 can be more effectively shortened.

In addition, when the star wheel 4 is rotated in the conveying direction of the container 20, the power of the star wheel 4 can be transmitted to the holding wheel 5 via the coil spring 8. Therefore, while the interval between the contact support portion 4A and the contact support portion 5A is maintained to be the interval slightly larger than the maximum dimensional tolerance of the container, the star wheel 4 and the holding wheel 5 can be moved in the conveying direction of the container 20 by the drive motor 6.

In addition, the gear 23 is rotated by the drive motor 22 so that the coil spring 8 is elastically deformed to rotate the holding wheel 5 relative to the star wheel 4. In this manner, the contact support portion 5A can be separated from the container 20.

In addition to this configuration, the power is transmitted from the drive motor 6 to the star wheel 4. In this manner, the coil spring 8 is elastically deformed to rotate the star wheel 4 relative to the holding wheel 5. In this manner, the contact support portion 4A can be separated from the container 20.

As a result, the container 20 can be conveyed to the container inspection position P2 at a high speed by the container conveying device 21 having a simple configuration, and the container 20 can be accurately positioned at the container inspection position P2. Moreover, the container 20 can be reliably prevented from interfering with the contact support portion 4A and the contact support portion 5A at the container inspection position P2, and the container 20 can be accurately inspected.

In the container conveying device 21 of the present embodiment, the opening windows 4W and 5W are formed in the star wheel 4 and the holding wheel 5, and the coil springs 8 are installed in the opening windows 4W and 5W. However, the opening windows 4W and 5W and the coil spring 8 may not be used.

In this case, when the container 20 is conveyed to the container inspection position P2 by the star wheel 4 and the holding wheel 5, the rotation of the star wheel 4 by the drive motor 6 and the rotation of the holding wheel 5 by the drive motor 22 and the gear 23 are synchronized with each other.

Next, when the container 20 is positioned at the container inspection position P2, the drive motor 22 is driven to rotate the gear 23 in the clockwise rotation direction R1, and thereafter, the drive motor 6 rotates the star wheel 4 in the counterclockwise rotation direction R2. In this manner, the container 20 is released from the contact support portion 4A and the contact support portion 5A at the container inspection position P2.

Next, when the container 20 is unloaded from the container inspection position P2, the drive motor 22 is driven to rotate the gear 23 in the counterclockwise rotation direction R2, and thereafter, the drive motor 6 rotates the star wheel 4 in the clockwise rotation direction R1.

In this manner, the contact support portion 4A and the contact support portion 5A are brought closer to the container 20 at the container inspection position P2, and can bring the container 20 into a conveyable state.

The drive motor 6 and the drive motor 22 may be simultaneously driven to simultaneously separate the contact support portion 4A and the contact support portion 5A from the container 20, or to simultaneously bring the contact support portion 4A and the contact support portion 5A closer to each other.

In this way, the star wheel 4 is moved in the conveying direction of the container 20 by the drive motor 6, and the gear 23 is rotated by the drive motor 22 to move the holding wheel 5 in the conveying direction of the container 20. In this manner, when the contact support portion 4A is not located at the container inspection position P2, the container 20 can be conveyed to the container inspection position P2 by bringing the contact support portion 4A into contact with the container 20 and by maintaining the posture of the container 20, and the contact support portion 4A and the contact support portion 5A can be separated from the container 20 at the container inspection position P2.

Even in this way, the container 20 loaded from the container loading position P1 can be conveyed to the container inspection position P2 at a high speed, and the container 20 can be accurately positioned at the container inspection position P2. The container 20 can be accurately inspected at the container inspection position P2, and the inspection time of the container 20 can be shortened.

In addition, according to the container conveying device 21 of the present embodiment, the contact support portion 4A has the contact surface 4b which comes into contact with one side surface 20a of the container 20, and the contact support portion 5A has the contact surface 5b which comes into contact with the other side surface 20b of the container 20. In addition to this configuration, the contact surface 5b extends from the lower portion 20m to the upper portion 20n of the container 20 (refer to FIGS. 5A to 5D).

In this manner, the container 20 can be conveyed by pressing the whole contact surface 4b of the contact support portion 4A against the container 20, and can be conveyed from the container loading position P1 to the container inspection position P2 at a high speed by stably maintaining the posture of the container 20.

Next, a configuration of an article conveying device according to a fourth embodiment of the present invention will be described with reference to FIGS. 13 to 16. The same reference numerals will be assigned to the same configurations as those of the first embodiment, and description thereof will be omitted.

Figure 13:
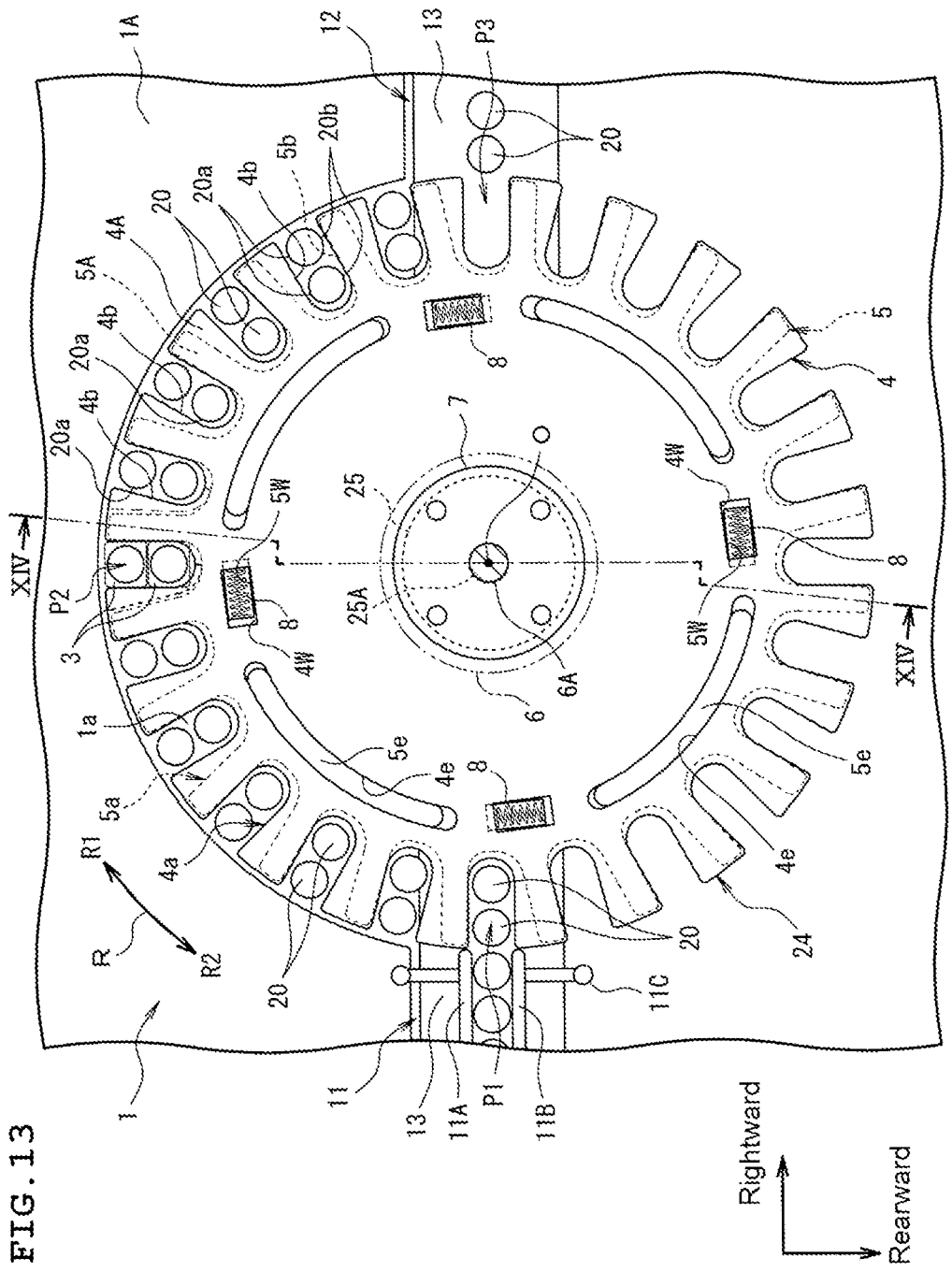
FIG. 13 is a plan view of an article weighing device including an article conveying device according to a fourth embodiment of the present invention, and illustrates a state where a contact support portion is separated from an article.

As illustrated in FIG. 13, the container weighing device 1 includes a container conveying device 24 serving as an article conveying device that conveys the container 20 along a circumferential conveying course, the container weighing unit 3 that weighs the container 20 at the container inspection position P2 in an intermediate portion of the conveying course, the container loading unit 11 that loads the container in the container conveying device 24 at the container loading position P1, and the container unloading unit 12 that unloads the container 20 from the container conveying device 24 at the container unloading position P3.

The container conveying device 24 has the star wheel 4 and the holding wheel 5. The opening portion 5C in the first embodiment is not formed in the holding wheel 5, and the holding wheel 5 has a disc.

Figure 14:
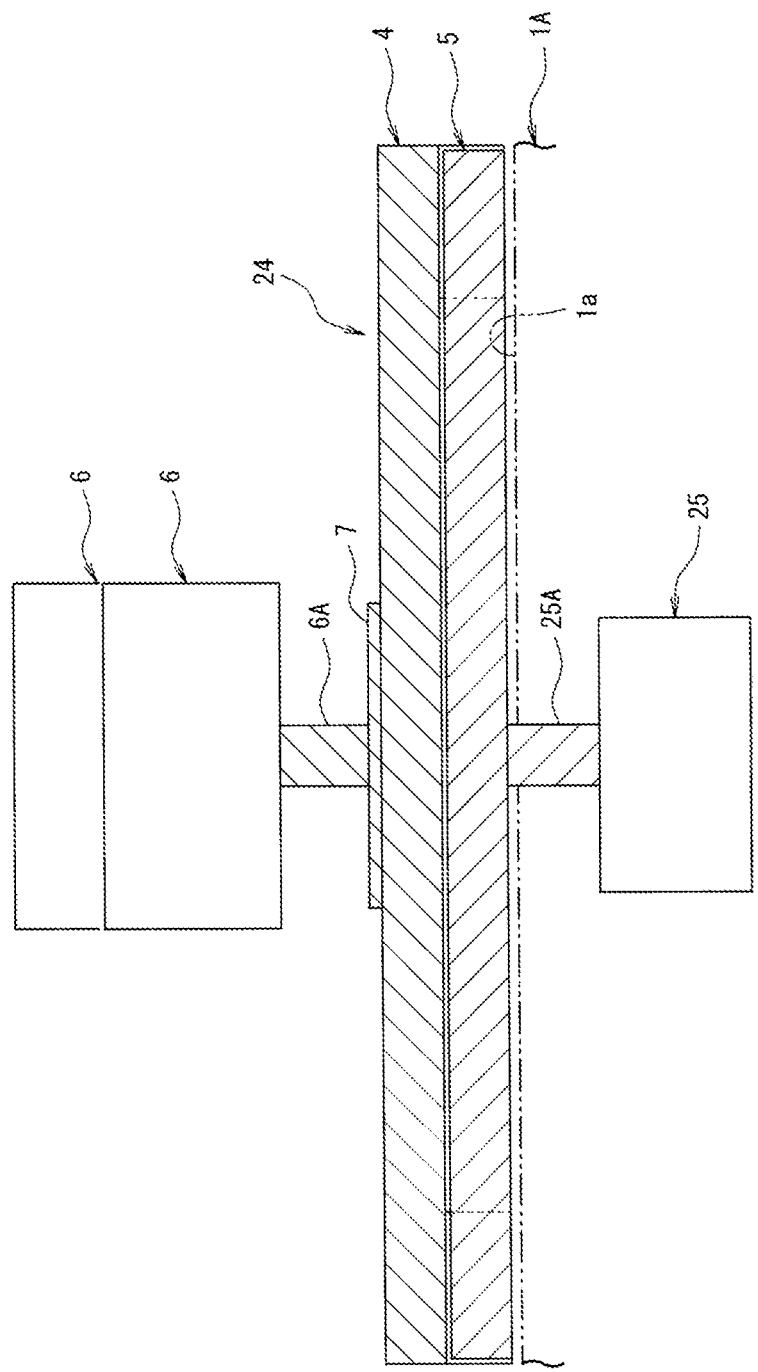
FIG. 14 is a sectional view taken along line XIV-XIV in FIG. 13.

As illustrated in FIGS. 13 and 14, the fixed member 7 fixed to the drive shaft 6A of the drive motor 6 is provided in the upper portion of the star wheel 4, and the fixed member 7 is fixed to the upper surface of the star wheel 4. When the drive motor 6 is rotationally driven, the star wheel 4 rotates integrally with the fixed member 7.

The container conveying device 24 includes the drive motor 25 having a stepping motor. The drive motor 25 is installed below the holding wheel 5, and is attached to the main body 1A. The drive shaft 25A of the drive motor 25 is attached to the holding wheel 5, and the drive motor 25 rotationally drives the holding wheel 5. That is, the drive motor 25 directly drives the holding wheel 5 by directly transmitting the power to the holding wheel 5.

The drive motor 6 of the present embodiment forms a third drive unit, and the drive motor 25 forms a fourth drive unit.

Next, an operation of the container conveying device 24 of the present embodiment will be described.

When the container 20 is loaded in the recess portions 4a and 5a at the container loading position P1, the drive motor 6 is stopped at a timing at which the container 20 is loaded in the contact support portion 4A and the contact support portion 5A, and the star wheel 4 and the holding wheel 5 are paused.

Next, the drive motor 25 is driven (excited) to rotate the holding wheel 5 in the clockwise rotation direction R1. In this manner, the holding wheel 5 rotates in the clockwise rotation direction R1 relative to the star wheel 4 so that the contact support portion 5A is separated from the contact support portion 4A, and an interval between the contact support portion 4A and the contact support portion 5A in the rotation direction of the star wheel 4 is widened. Therefore, a sufficient space for accommodating the container 20 is formed between the contact support portion 4A and the contact support portion 5A.

At this time, the container 20 is loaded between the contact support portion 4A and the contact support portion 5A at the container loading position P1 (refer to FIG. 13). When the container 20 is loaded, the sufficient space for accommodating the container 20 is formed between the contact support portion 4A and the contact support portion 5A. Therefore, loading performance of the container 20 can be improved.

When the container 20 is loaded between the contact support portion 4A and the contact support portion 5A at the container loading position P1, the drive motor 25 is brought into a non-excited state so that the holding wheel 5 is in a free state.

Figure 15:
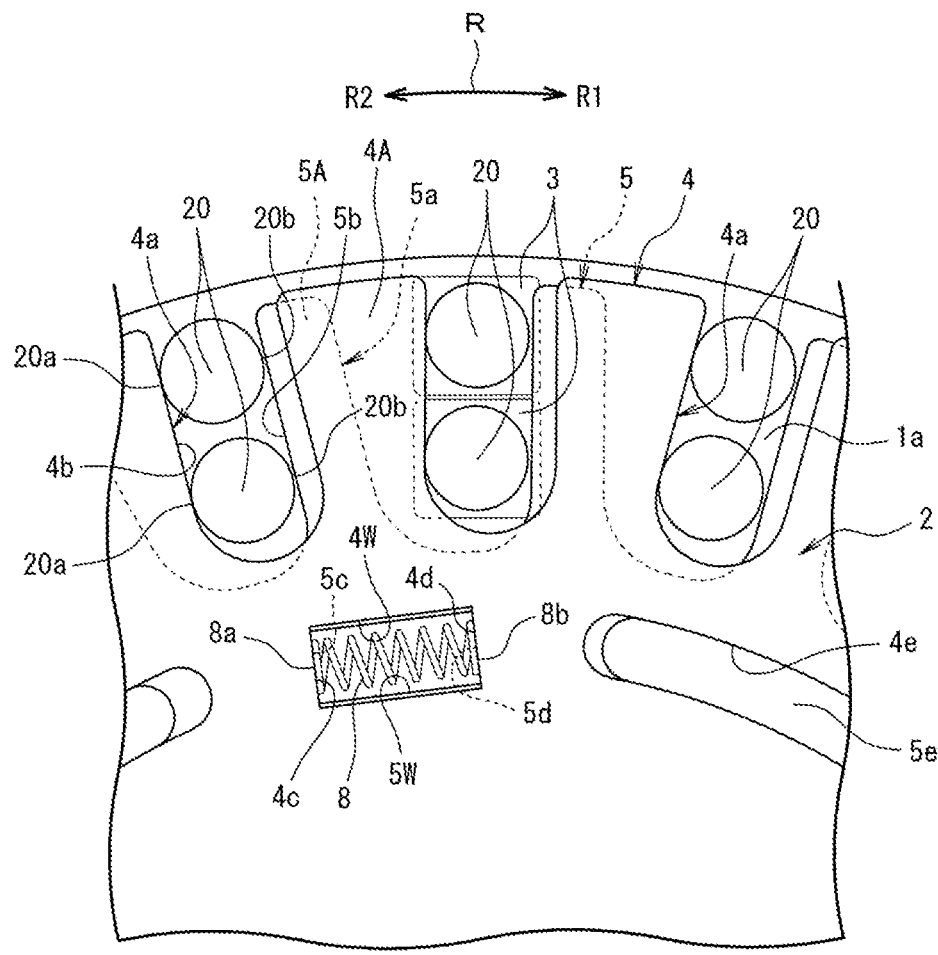
FIG. 15 is an enlarged plan view of the contact support portion of the article conveying device according to the fourth embodiment of the present invention, and illustrates a state where the article is held by the contact support portion.
Figure 16:
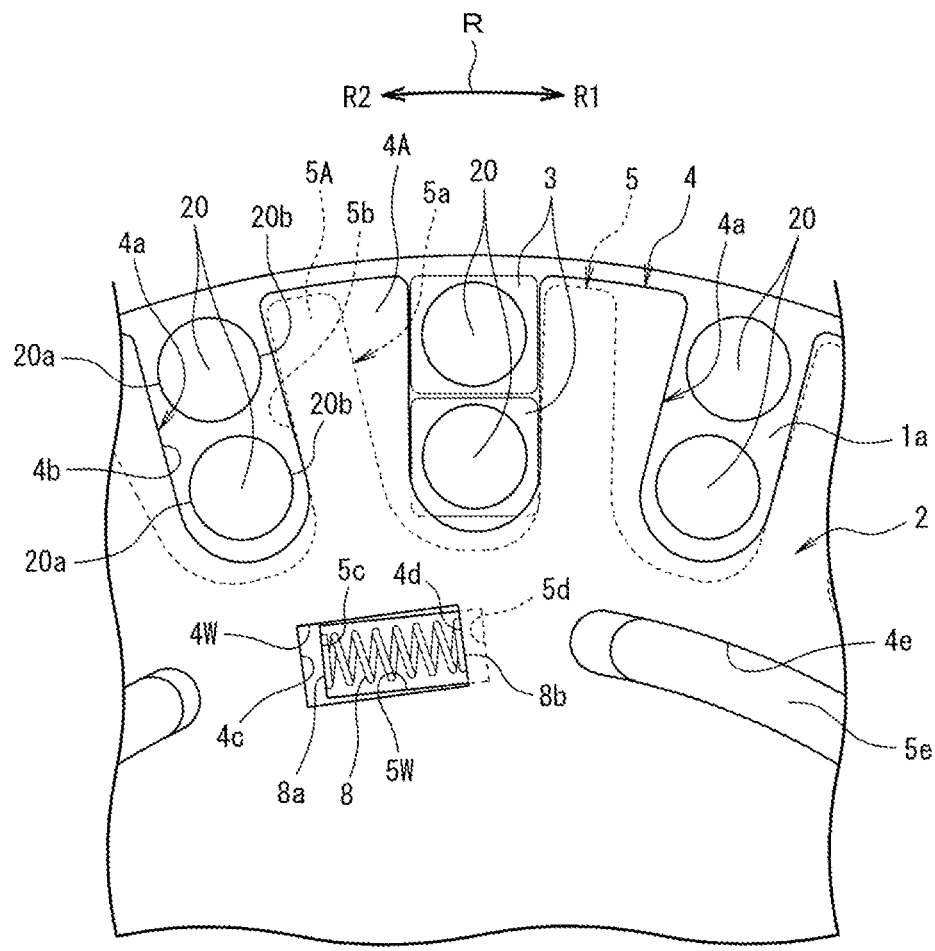
FIG. 16 is an enlarged plan view of the contact support portion of the article conveying device according to the fourth embodiment of the present invention, and illustrates a state where the contact support portion is separated from an article.

At this time, the star wheel 4 and the holding wheel 5 are biased by the coil spring 8, and the coil spring 8 stretches to the maximum so that one end portion 4c of the opening window 4W and one end portion 5c of the opening window 5W overlap in the upward-downward direction, and so that the other end portion 4d of the opening window 4W and the other end portion 5d of the opening window 5W overlap in the upward-downward direction (refer to FIG. 15). In a stretching process of the coil spring 8, the holding wheel rotates relative to the star wheel 4 in the counterclockwise rotation direction R2.

When the coil spring 8 stretches to the maximum, an interval between the contact surface 4b of the contact support portion 4A and the contact surface 5b of the contact support portion 5A in the rotation direction of the star wheel 4 is formed to be an interval slightly larger than the maximum dimensional tolerance of the diameter of the container 20.

When the drive motor 6 is driven in this state to rotate the star wheel 4 in the clockwise rotation direction R1, the power of the star wheel 4 is transmitted to the holding wheel 5 via the coil spring 8.

When the star wheel 4 and the holding wheel 5 rotate, the container 20 is pushed by the contact support portion 4A, and the container 20 is conveyed from the container loading position P1 toward the container inspection position P2.

That is, one side surface 20a of the container 20 comes into contact with the contact surface 4b of the contact support portion 4A of the star wheel 4, and the container 20 is pushed by the contact support portion 4A. In this manner, the container 20 is conveyed to the container inspection position P2. At this time, a slight gap is formed between the other side surface 20b of the container 20 and the contact surface 5b of the contact support portion 5A, and the container 20 is conveyed from the container loading position P1 to the container inspection position P2 while sliding on the conveying surface 1a of the main body 1A (refer to FIG. 5A).

The slight gap is formed between the other side surface 20b of the container 20 and the contact surface 5b of the contact support portion 5A. However, as the container 20 is conveyed, the other side surface 20b of the container 20 may come into contact with the contact surface 5b of the contact support portion 5A. When the container 20 tries to excessively swing, the container 20 comes into contact with the contact support portion 5A, thereby preventing the container 20 from being conveyed in an inclined state.

In addition, a slight gap is formed between the other side surface 20b of the container 20 and the contact surface 5b of the contact support portion 5A. Therefore, the container 20 is not completely held between the contact support portion 4A and the contact support portion 5A.

Therefore, a bottom surface of the container 20 can be slid on the conveying surface 1a of the main body 1A, it is possible to prevent a possibility that the bottom surface of the container 20 may strongly collide with the conveying surface 1a, and the container 20 may receive a strong impact during the conveyance.

When the container 20 accommodated in the recess portions 4a and 5a is conveyed to the container inspection position P2 (refer to FIG. 5B), the drive motor 6 is stopped to pause the star wheel 4 and the holding wheel 5.

The slight gap is formed between the other side surface 20b of the container 20 and the contact surface 5b of the contact support portion 5A when the container 20 is conveyed. Therefore, when the container 20 is located at the container inspection position P2, and the star wheel 4 and the holding wheel 5 are paused, the other side surface 20b of the container 20 comes into contact with the contact support portion 5A due to the inertia of the container 20.

In this manner, the container 20 can be prevented from being excessively located on the downstream side from the container inspection position P2, and the container 20 can be accurately positioned at the container inspection position P2.

When the star wheel 4 and the holding wheel 5 are paused, due to the inertia of the container 20, the other side surface 20b of the container 20 often comes into contact with the contact support portion 5A. However, the container 20 swings to the upstream side or to the downstream side in the conveying direction. Therefore, one side surface 20a of the container 20 may come into contact with the contact support portion 4A, and may not come into contact with the contact support portion 4A and the contact support portion 5A.

Next, the drive motor 25 is driven (excited) to rotate the holding wheel 5 in the clockwise rotation direction R1. In this manner, the holding wheel 5 rotates in the clockwise rotation direction R1 relative to the star wheel 4 so that the contact support portion 5A is separated from the contact support portion 4A, and the contact surface 5b of the contact support portion 5A is separated from the other side surface 20b of the container 20 (refer to FIG. 5C).

At this time, the coil spring 8 is elastically deformed to contract, and the distance between one end portion 5c of the opening window 5W and the other end portion 4d of the opening window 4W is shortened, compared to when the container 20 is held by the contact support portions 4A and the contact support portions 5A.

Next, the drive motor 6 rotates the star wheel 4 in the counterclockwise rotation direction R2, the coil spring 8 is further compressed, and the contact support portion 4A is separated from the contact support portion 5A. In this manner, the contact surface 4b of the contact support portion 4A is separated from one side surface 20a of the container 20 (refer to FIGS. 5D and 16).

In this manner, the container 20 is released from the contact support portion 4A and the contact support portion 5A, and loads of the star wheel 4 and the holding wheel 5 are not applied to the container 20. In this state, the container weighing unit 3 weighs the container 20. At this time, the holding wheel 5 is not rotated by bringing the drive motor 25 into an excited state.

In addition, when the container 20 is conveyed, the slight gap is formed between the other side surface 20b of the container 20 and the contact surface 5b of the contact support portion 5A. Therefore, the container 20 is conveyed to the container inspection position P2 while sliding on the conveying surface 1a in a state where a bottom surface of the container 20 is in contact with the conveying surface 1a.

Therefore, when the contact support portion 4A and the contact support portion 5A are separated from the container 20 during weighing of the container 20, the container 20 can be prevented from swaying due to collision with the conveying surface 1a, and the behavior of the container 20 can be stabilized. Therefore, the container 20 can be accurately positioned at the container inspection position P2 and accurately weighed.

On the other hand, at a timing at which the container 20 is released from the contact support portion 4A and the contact support portion 5A, the container 20 is loaded in the recess portions 4a and 5a from the container loading unit 11 at the container loading position P1, and the container 20 is unloaded to the container unloading unit 12 from the recess portions 4a and 5a at the container unloading position P3.

When the container 20 is conveyed, a slight gap is formed between the other side surface 20b of the container 20 and the contact surface 5b of the contact support portion 5A. Therefore, the container 20 may be loaded and unloaded in advance without waiting for a timing at which the container 20 is released.

When the weighing of the container 20 is completed at the container inspection position P2 by the container weighing unit 3, the drive motor 25 is brought into a non-excited state so that the holding wheel 5 is in a free state.

At this time, the coil spring 8 is elastically deformed to stretch to the maximum. In this manner, the holding wheel 5 and the star wheel 4 rotate relative to each other so that the contact support portion 5A and the contact support portion 4A are closer to each other. The contact surface 4b of the contact support portion 4A comes into contact with one side surface 20a of the container 20, and a slight gap is formed between the other side surface 20b of the container 20 and the contact surface 5b of the contact support portion 5A.

In this manner, when the star wheel 4 is driven to rotate in the clockwise rotation direction R1 by the drive motor 6, the completely weighed container 20 is conveyed from the container inspection position P2 to the container unloading position P3 in a state where the posture is maintained by the contact support portion 4A and the contact support portion 5A, and is unloaded at the container unloading position P3 in the container unloading unit 12.

Next, an advantageous effect of the container conveying device 24 of the present embodiment will be described.

The container conveying device 24 of the present embodiment has the contact support portions 4A and 5A which accommodate the containers 20 to be sequentially loaded from the container loading unit 11, and has the star wheel 4 and the holding wheel 5 which convey the containers 20 accommodated in the contact support portions 4A and 5A to the container inspection position to P2.

The star wheel 4 is provided to be rotatable in the conveying direction of the container 20. The holding wheel 5 is provided to be rotatable in the conveying direction of the container 20, and to be rotatable relative to the star wheel 4.

The contact support portions 4A are provided at an equal interval in the outer peripheral portion of the star wheel 4, and can come into contact with one side surface 20a of the container 20. The contact support portions 5A are provided at an equal interval in the outer peripheral portion of the holding wheel 5, and can come into contact with the other side surface 20b of the container 20.

In addition to this configuration, the container 20 is conveyed while the posture of the container 20 is maintained by bringing the contact support portion 4A into contact with the container 20 when the container 20 is not located at the container inspection position P2. Therefore, the container 20 can be conveyed from the container loading position P1 to the container inspection position P2 at a high speed.

In addition, the contact support portion 4A and the contact support portion 5A are separated from the container 20 when the container 20 is located at the container inspection position P2. Therefore, the container 20 can be prevented from interfering with the contact support portion 4A and the contact support portion 5A at the container inspection position P2.

As a result, the container 20 loaded from the container loading unit 11 can be conveyed to the container inspection position P2 at a high speed, and the container 20 can be accurately positioned at the container inspection position P2. The container 20 can be accurately weighed at the container inspection position P2, and the weighing time of the container 20 can be shortened.

In addition, the container conveying device 24 of the present embodiment has the drive motor 25 which rotates the star wheel 4 in the conveying direction of the container 20, and a drive motor 25 which rotates the holding wheel 5 in the conveying direction of the container 20.

In this manner, the star wheel 4 is moved in the conveying direction of the container 20 by the drive motor 6, and the holding wheel 5 is moved in the conveying direction of the container 20 by the drive motor 25. In this manner, the star wheel 4 and the holding wheel 5 can be moved in the conveying direction, and can be moved relative to each other at the container inspection position P2.

In addition, the container conveying device 24 has the coil spring 8 which is installed in the opening window 4W formed in the star wheel 4 and the opening window 5W formed in the holding wheel 5, which can transmit the power from the star wheel 4 to the holding wheel 5, and which is elastically deformable when the star wheel 4 and the holding wheel 5 rotate relative to each other.

In the container conveying device 24, the power is transmitted from the drive motor 25 to the holding wheel 5. In this manner, the coil spring 8 is elastically deformed to move the holding wheel 5 relative to the star wheel 4. The power is transmitted to the star wheel 4 from the drive motor 6. In this manner, the coil spring 8 is elastically deformed to rotate the star wheel 4 relative to the holding wheel 5.

In this manner, when the coil spring 8 stretches to the maximum, the container 20 can be conveyed to the container inspection position P2 by forming the interval between the contact support portion 4A and the contact support portion 5A to be the interval slightly larger than the maximum dimensional tolerance of the container 20, and by accommodating the container 20 between the contact support portion 4A and the contact support portion 5A.

Therefore, the container 20 can be conveyed from the container loading position P1 to the container inspection position P2 at a high speed, and the inspection time of the container 20 can be more effectively shortened.

In addition, when the star wheel 4 is rotated in the conveying direction of the container 20, the power of the star wheel 4 can be transmitted to the holding wheel 5 via the coil spring 8. Therefore, while the interval between the contact support portion 4A and the contact support portion 5A is maintained to be the interval slightly larger than the maximum dimensional tolerance of the container, the star wheel 4 and the holding wheel 5 can be moved in the conveying direction of the container 20 by the drive motor 6.

In addition, the power is transmitted from the drive motor 25 to the holding wheel 5 so that the coil spring 8 is elastically deformed to rotate the holding wheel 5 relative to the star wheel 4. In this manner, the contact support portion 5A can be separated from the container 20.

In addition to this configuration, the power is transmitted from the drive motor 6 to the star wheel 4. In this manner, the coil spring 8 is elastically deformed to rotate the star wheel 4 relative to the holding wheel 5. In this manner, the contact support portion 4A can be separated from the container 20.

As a result, the container 20 can be conveyed to the container inspection position P2 at a high speed by the container conveying device 24 having a simple configuration, and the container 20 can be accurately positioned at the container inspection position P2. Moreover, the container 20 can be reliably prevented from interfering with the contact support portion 4A and the contact support portion 5A at the container inspection position P2, and the container 20 can be accurately inspected.

In the container conveying device 24 of the present embodiment, the opening windows 4W and 5W are formed in the star wheel 4 and the holding wheel 5, and the coil springs 8 are installed in the opening windows 4W and 5W. However, the opening windows 4W and 5W and the coil spring 8 may not be used.

In this case, when the container 20 is conveyed to the container inspection position P2 by the star wheel 4 and the holding wheel 5, the rotation of the star wheel 4 by the drive motor 6 and the rotation of the holding wheel 5 by the drive motor 25 are synchronized with each other.

Next, when the container 20 is positioned at the container inspection position P2, the drive motor 25 is driven to rotate the holding wheel 5 in the clockwise rotation direction R1, and thereafter, the star wheel 4 is rotated in the counterclockwise rotation direction R2 by the drive motor 6. In this manner, the container 20 is released from the contact support portion 4A and the contact support portion 5A at the container inspection position P2.

Next, when the container 20 is unloaded from the container inspection position P2, the drive motor 25 is driven to rotate the holding wheel 5 in the counterclockwise rotation direction R2, and thereafter, the star wheel 4 is rotated in the clockwise rotation direction R1 by the drive motor 6.

In this manner, the contact support portion 4A and the contact support portion 5A are brought closer to the container 20 at the container inspection position P2, and can bring the container 20 into a conveyable state.

The drive motor 6 and the drive motor 25 may be simultaneously driven to simultaneously separate the contact support portion 4A and the contact support portion 5A from the container 20, or to simultaneously bring the contact support portion 4A and the contact support portion 5A closer to each other.

In this way, the star wheel 4 is moved in the conveying direction of the container 20 by the drive motor 6, and the holding wheel 5 is moved in the conveying direction of the container 20 by the drive motor 25. In this manner, when the container 20 is not located at the container inspection position P2, the container 20 can be conveyed to the container inspection position P2 by bringing the contact support portion 4A into contact with the container 20 and by maintaining the posture of the container 20, and the contact support portion 4A and the contact support portion 5A can be separated from the container 20 at the container inspection position P2.

Even in this way, the container 20 loaded from the container loading position P1 can be conveyed to the container inspection position P2 at a high speed, and the container 20 can be accurately positioned at the container inspection position P2. The container 20 can be accurately inspected at the container inspection position P2, and the inspection time of the container 20 can be shortened.

In addition, according to the container conveying device 24 of the present embodiment, the contact support portion 4A has the contact surface 4b which comes into contact with one side surface 20a of the container 20, and the contact support portion 5A has the contact surface 5b which comes into contact with the other side surface 20b of the container 20. In addition to this configuration, the contact surface 5b extends from the lower portion 20m to the upper portion 20n of the container 20 (refer to FIGS. 5A to 5D).

In this manner, the container 20 can be conveyed by pressing the whole contact surface 4b of the contact support portion 4A against the container 20, and can be conveyed from the container loading position P1 to the container inspection position P2 at a high speed by stably maintaining the posture of the container 20.

Next, a configuration of an article conveying device according to a fifth embodiment of the present invention will be described with reference to FIGS. 17 and 18. The same reference numerals will be assigned to the same configurations as those of the first embodiment, and description thereof will be omitted. In addition, description will be made with reference to FIGS. 15 and 16 of the fourth embodiment.

Figure 17:
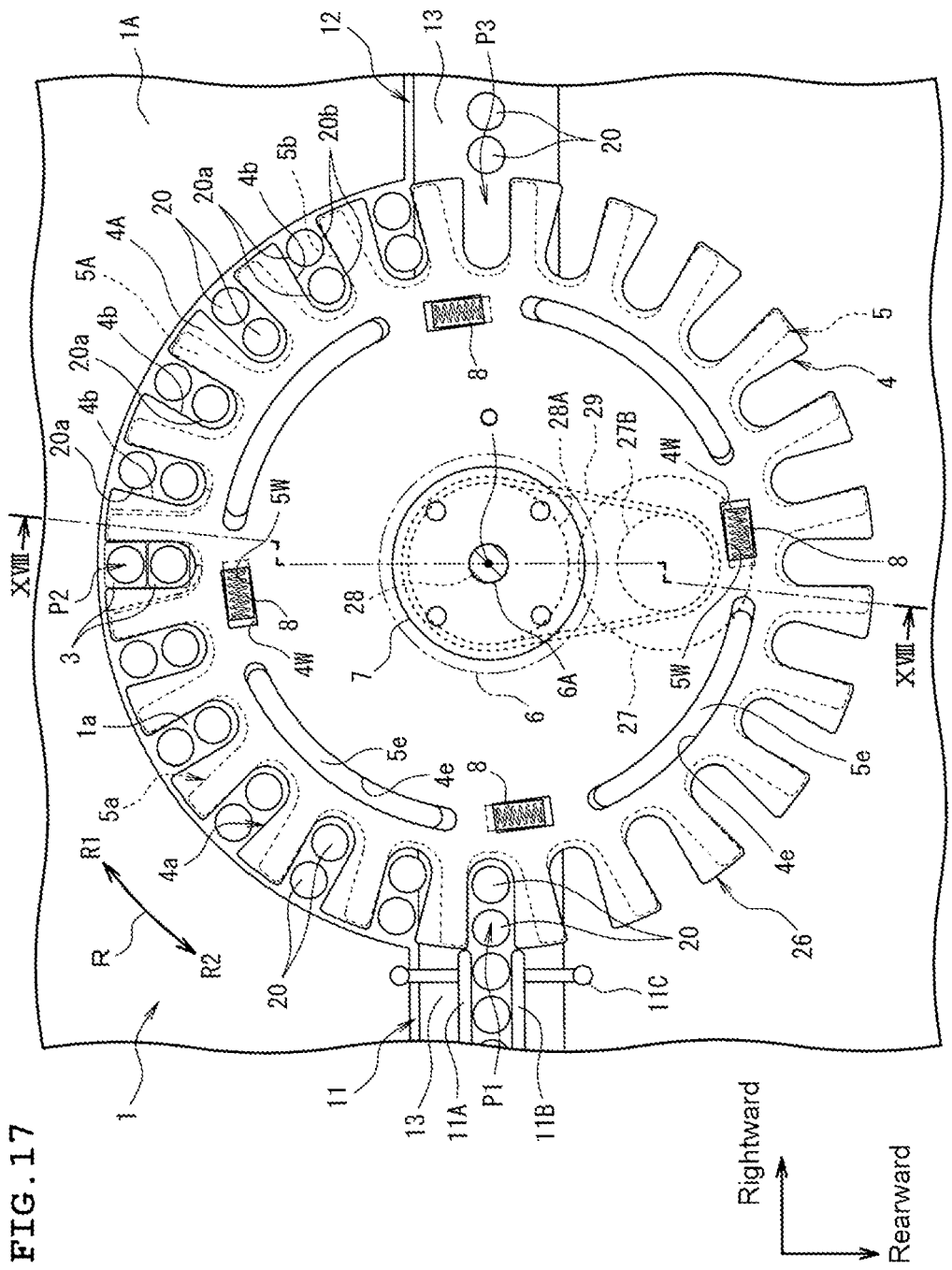
FIG. 17 is a plan view of an article weighing device including an article conveying device according to a fifth embodiment of the present invention, and illustrates a state where a contact support portion is separated from an article.

As illustrated in FIG. 17, the container weighing device 1 includes a container conveying device 26 serving as an article conveying device that conveys the container 20 along a circumferential conveying course, the container weighing unit 3 that weighs the container 20 at the container inspection position P2 in an intermediate portion of the conveying course, the container loading unit 11 that loads the container in the container conveying device 26 at the container loading position P1, and the container unloading unit 12 that unloads the container 20 from the container conveying device 26 at the container unloading position P3.

The container conveying device 26 has the star wheel 4 and the holding wheel 5. The opening portion 5C in the first embodiment is not formed in the holding wheel 5, and the holding wheel 5 has a disc.

Figure 18:
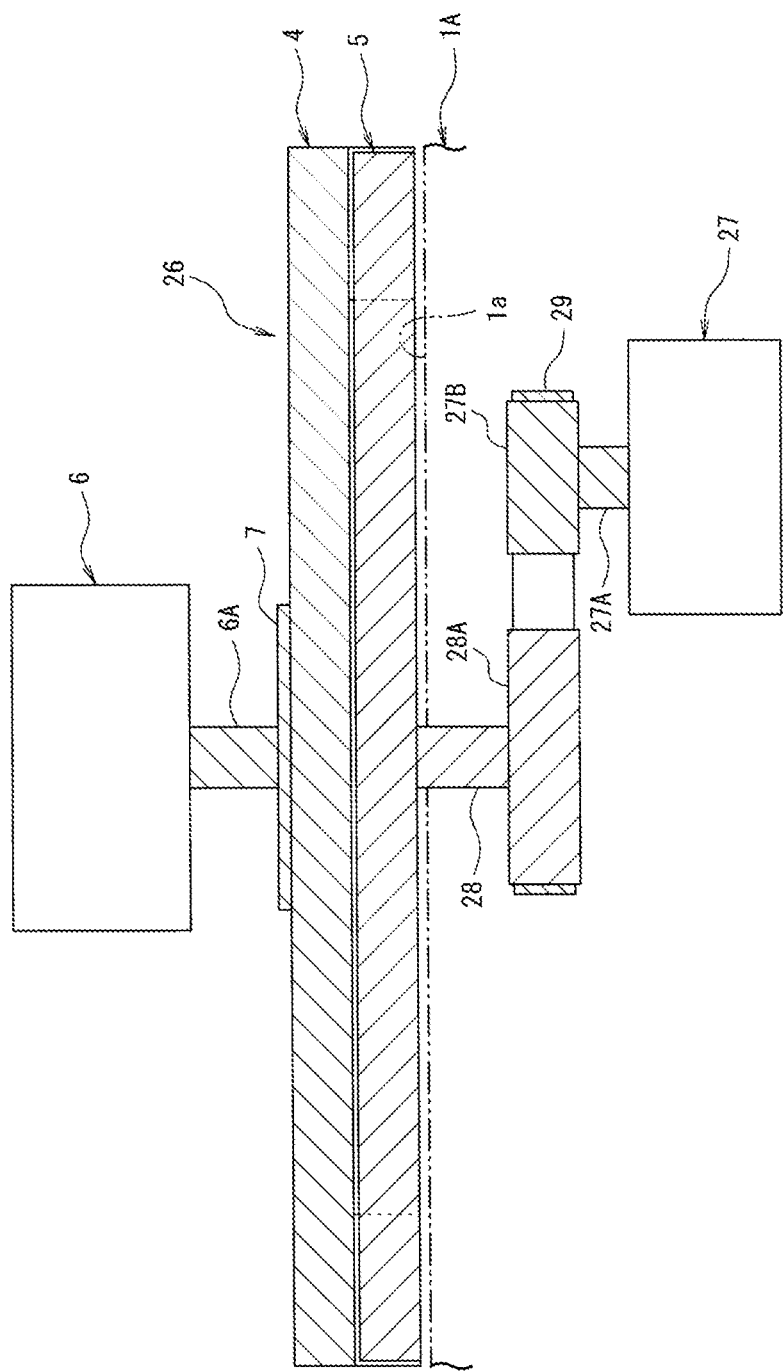
FIG. 18 is a sectional view taken along line XVIII-XVIII in FIG. 17.

As illustrated in FIGS. 17 and 18, the fixed member 7 fixed to the drive shaft 6A of the drive motor 6 is provided in the upper portion of the star wheel 4, and the fixed member 7 is fixed to the upper surface of the star wheel 4. When the drive motor 6 is rotationally driven, the star wheel 4 rotates integrally with the fixed member 7.

The container conveying device 26 includes a drive motor 27 having a stepping motor. The drive motor 27 is installed below the holding wheel 5, and is attached to the main body 1A. A pulley 27B is attached to an upper end portion of the motor shaft 27A of the drive motor 27.

A drive shaft 28 is provided below the holding wheel 5, and the drive shaft 28 is attached to the holding wheel 5.

A pulley 28A is attached to a lower end portion of the drive shaft 28, and a timing belt 29 is wound around the pulleys 27B and 28A.

When the drive motor 27 rotates, the power is transmitted from the pulley 27B to the pulley 28A via the timing belt 29, and the holding wheel 5 is rotationally driven by the drive shaft 28. That is, the drive motor 27 drives the holding wheel 5 via the timing belt 29.

The drive motor 6 of the present embodiment forms a third drive unit, and the drive motor 27, the pulley 27B, the drive shaft 28, the pulley 28A, and the timing belt 29 form a fourth drive unit. In addition, the pulley 27B, the drive shaft 28, the pulley 28A, and the timing belt 29 form a power transmission unit.

Next, an operation of the container conveying device 26 of the present embodiment will be described.

When the container 20 is loaded in the recess portions 4a and 5a at the container loading position P1, the drive motor 6 is stopped at a timing at which the container 20 is loaded in the contact support portion 4A and the contact support portion 5A, and the star wheel 4 and the holding wheel 5 are paused.

Next, the drive motor 27 is driven (excited) to rotate the holding wheel 5 in the clockwise rotation direction R1. At this time, the power of the drive motor 27 is transmitted to the drive shaft 28 via the pulley 27B, the timing belt 29, and the pulley 28A.

In this manner, the holding wheel 5 rotates in the clockwise rotation direction R1 relative to the star wheel 4 so that the contact support portion 5A is separated from the contact support portion 4A, and an interval between the contact support portion 4A and the contact support portion 5A in the rotation direction of the star wheel 4 is widened. Therefore, a sufficient space for accommodating the container 20 is formed between the contact support portion 4A and the contact support portion 5A.

At this time, the container 20 is loaded between the contact support portion 4A and the contact support portion 5A at the container loading position P1 (refer to FIG. 17). When the container 20 is loaded, the sufficient space for accommodating the container 20 is formed between the contact support portion 4A and the contact support portion 5A. Therefore, loading performance of the container 20 can be improved.

When the container 20 is loaded between the contact support portion 4A and the contact support portion 5A at the container loading position P1, the drive motor 27 is brought into a non-excited state so that the holding wheel 5 is in a free state.

At this time, the star wheel 4 and the holding wheel 5 are biased by the coil spring 8, and the coil spring 8 stretches to the maximum so that one end portion 4c of the opening window 4W and one end portion 5c of the opening window 5W overlap in the upward-downward direction, and so that the other end portion 4d of the opening window 4W and the other end portion 5d of the opening window 5W overlap in the upward-downward direction (refer to FIG. 15). In a stretching process of the coil spring 8, the holding wheel rotates relative to the star wheel 4 in the counterclockwise rotation direction R2.

When the coil spring 8 stretches to the maximum, an interval between the contact surface 4b of the contact support portion 4A and the contact surface 5b of the contact support portion 5A in the rotation direction of the star wheel 4 is formed to be an interval slightly larger than the maximum dimensional tolerance of the diameter of the container 20.

When the drive motor 6 is driven in this state to rotate the star wheel 4 in the clockwise rotation direction R1, the power of the star wheel 4 is transmitted to the holding wheel 5 via the coil spring 8.

When the star wheel 4 and the holding wheel 5 rotate, the container 20 is pushed by the contact support portion 4A, and the container 20 is conveyed from the container loading position P1 toward the container inspection position P2.

That is, one side surface 20a of the container 20 comes into contact with the contact surface 4b of the contact support portion 4A of the star wheel 4, and the container 20 is pushed by the contact support portion 4A. In this manner, the container 20 is conveyed to the container inspection position P2. At this time, a slight gap is formed between the other side surface 20b of the container 20 and the contact surface 5b of the contact support portion 5A, and the container 20 is conveyed from the container loading position P1 to the container inspection position P2 while sliding on the conveying surface 1a of the main body 1A (refer to FIG. 5A).

The slight gap is formed between the other side surface 20b of the container 20 and the contact surface 5b of the contact support portion 5A. However, as the container 20 is conveyed, the other side surface 20b of the container 20 may come into contact with the contact surface 5b of the contact support portion 5A. When the container 20 tries to excessively swing, the container 20 comes into contact with the contact support portion 5A, thereby preventing the container 20 from being conveyed in an inclined state.

In addition, a slight gap is formed between the other side surface 20b of the container 20 and the contact surface 5b of the contact support portion 5A. Therefore, the container 20 is not completely held between the contact support portion 4A and the contact support portion 5A.

Therefore, a bottom surface of the container 20 can be slid on the conveying surface 1a of the main body 1A, it is possible to prevent a possibility that the bottom surface of the container 20 may strongly collide with the conveying surface 1a, and the container 20 may receive a strong impact during the conveyance.

When the container 20 accommodated in the recess portions 4a and 5a is conveyed to the container inspection position P2 (refer to FIG. 5B), the drive motor 6 is stopped to pause the star wheel 4 and the holding wheel 5.

The slight gap is formed between the other side surface 20b of the container 20 and the contact surface 5b of the contact support portion 5A when the container 20 is conveyed. Therefore, when the container 20 is located at the container inspection position P2, and the star wheel 4 and the holding wheel 5 are paused, the other side surface 20b of the container 20 comes into contact with the contact support portion 5A due to the inertia of the container 20.

In this manner, the container 20 can be prevented from being excessively located on the downstream side from the container inspection position P2, and the container 20 can be accurately positioned at the container inspection position P2.

When the star wheel 4 and the holding wheel 5 are paused, due to the inertia of the container 20, the other side surface 20b of the container 20 often comes into contact with the contact support portion 5A. However, the container 20 swings to the upstream side or to the downstream side in the conveying direction. Therefore, one side surface 20a of the container 20 may come into contact with the contact support portion 4A, and may not come into contact with the contact support portion 4A and the contact support portion 5A.

Next, the drive motor 27 is driven (excited) to rotate the holding wheel 5 in the clockwise rotation direction R1 via the timing belt 29. In this manner, the contact support portion 5A is separated from the contact support portion 4A, and the contact surface 5b of the contact support portion 5A is separated from the other side surface 20b of the container 20 (refer to FIG. 5C).

At this time, the coil spring 8 is elastically deformed to contract, and the distance between one end portion Sc of the opening window 5W and the other end portion 4d of the opening window 4W is shortened, compared to when the container 20 is held by the contact support portions 4A and the contact support portions 5A.

Next, the drive motor 6 rotates the star wheel 4 in the counterclockwise rotation direction R2, the coil spring 8 is further compressed, and the contact support portion 4A is separated from the contact support portion 5A. In this manner, the contact surface 4b of the contact support portion 4A is separated from one side surface 20a of the container 20 (refer to FIGS. 5D and 16).

In this manner, the container 20 is released from the contact support portion 4A and the contact support portion 5A, and loads of the star wheel 4 and the holding wheel 5 are not applied to the container 20. In this state, the container weighing unit 3 weighs the container 20. At this time, the holding wheel 5 is not rotated by bringing the drive motor 27 into an excited state.

In addition, when the container 20 is conveyed, the slight gap is formed between the other side surface 20b of the container 20 and the contact surface 5b of the contact support portion 5A. Therefore, the container 20 is conveyed to the container inspection position P2 while sliding on the conveying surface 1a in a state where a bottom surface of the container 20 is in contact with the conveying surface 1a.

Therefore, when the contact support portion 4A and the contact support portion 5A are separated from the container 20 during weighing of the container 20, the container 20 can be prevented from swaying due to collision with the conveying surface 1a, and the behavior of the container 20 can be stabilized. Therefore, the container 20 can be accurately positioned at the container inspection position P2 and accurately weighed.

On the other hand, at a timing at which the container 20 is released from the contact support portion 4A and the contact support portion 5A, the container 20 is loaded in the recess portions 4a and 5a from the container loading unit 11 at the container loading position P1, and the container 20 is unloaded to the container unloading unit 12 from the recess portions 4a and 5a at the container unloading position P3.

When the container 20 is conveyed, a slight gap is formed between the other side surface 20b of the container 20 and the contact surface 5b of the contact support portion 5A. Therefore, the container 20 may be loaded and unloaded in advance without waiting for a timing at which the container 20 is released.

When the weighing of the container 20 is completed at the container inspection position P2 by the container weighing unit 3, the drive motor 27 is brought into a non-excited state so that the holding wheel 5 is in a free state.

At this time, the coil spring 8 is elastically deformed to stretch to the maximum. In this manner, the holding wheel 5 and the star wheel 4 rotate relative to each other so that the contact support portion 5A and the contact support portion 4A are closer to each other. The contact surface 4b of the contact support portion 4A comes into contact with one side surface 20a of the container 20, and a slight gap is formed between the other side surface 20b of the container 20 and the contact surface 5b of the contact support portion 5A.

In this manner, when the star wheel 4 is driven to rotate in the clockwise rotation direction R1 by the drive motor 6, the completely weighed container 20 is conveyed from the container inspection position P2 to the container unloading position P3 in a state where the posture is maintained by the contact support portion 4A and the contact support portion 5A, and is unloaded at the container unloading position P3 in the container unloading unit 12.

Next, an advantageous effect of the container conveying device 26 of the present embodiment will be described.

The container conveying device 26 of the present embodiment has the contact support portions 4A and 5A which accommodate the containers 20 to be sequentially loaded from the container loading unit 11, and has the star wheel 4 and the holding wheel 5 which convey the containers 20 accommodated in the contact support portions 4A and 5A to the container inspection position to P2.

The star wheel 4 is provided to be rotatable in the conveying direction of the container 20. The holding wheel 5 is provided to be rotatable in the conveying direction of the container 20, and to be rotatable relative to the star wheel 4.

The contact support portions 4A are provided at an equal interval in the outer peripheral portion of the star wheel 4, and can come into contact with one side surface 20a of the container 20. The contact support portions 5A are provided at an equal interval in the outer peripheral portion of the holding wheel 5, and can come into contact with the other side surface 20b of the container 20.

In addition to this configuration, the container 20 is conveyed while the posture of the container 20 is maintained by bringing the contact support portion 4A into contact with the container 20 when the container 20 is not located at the container inspection position P2. Therefore, the container 20 can be conveyed from the container loading position P1 to the container inspection position P2 at a high speed.

In addition, the contact support portion 4A and the contact support portion 5A are separated from the container 20 when the container 20 is located at the container inspection position P2. Therefore, the container 20 can be prevented from interfering with the contact support portion 4A and the contact support portion 5A at the container inspection position P2.

As a result, the container 20 loaded from the container loading unit 11 can be conveyed to the container inspection position P2 at a high speed, and the container 20 can be accurately positioned at the container inspection position P2. The container 20 can be accurately weighed at the container inspection position P2, and the weighing time of the container 20 can be shortened.

In addition, the container conveying device 26 of the present embodiment has the drive motor 6 which rotates the star wheel 4 in the conveying direction of the container 20, the drive motor 27 which rotates the holding wheel 5 in the conveying direction of the container 20, the pulley 27B, the drive shaft 28, the pulley 28A, and the timing belt 29.

In this manner, the drive motor 6 can move the star wheel 4 in the conveying direction of the container 20, and the drive motor 27 can move the holding wheel 5 by circumferentially moving the timing belt 29. Therefore, the star wheel 4 and the holding wheel 5 can be moved in the conveying direction, and can be moved relative to each other at the container inspection position P2.

In addition, the container conveying device 26 has the coil spring 8 which is installed in the opening window 4W formed in the star wheel 4 and the opening window 5W formed in the holding wheel 5, which can transmit the power from the star wheel 4 to the holding wheel 5, and which is elastically deformable when the star wheel 4 and the holding wheel 5 rotate relative to each other.

The container conveying device 26 transmits the power from the drive motor 27 to the holding wheel 5 via the timing belt 29 so that the coil spring 8 is elastically deformed to move the holding wheel 5 relative to the star wheel 4 and the power is transmitted from the drive motor 6 to the star wheel 4. In this manner, the coil spring 8 is elastically deformed to rotate the star wheel 4 relative to the holding wheel 5.

In this manner, when the coil spring 8 stretches to the maximum, the container 20 can be conveyed to the container inspection position P2 by forming the interval between the contact support portion 4A and the contact support portion 5A to be the interval slightly larger than the maximum dimensional tolerance of the container 20, and by accommodating the container 20 between the contact support portion 4A and the contact support portion 5A.

Therefore, the container 20 can be conveyed from the container loading position P1 to the container inspection position P2 at a high speed, and the inspection time of the container 20 can be more effectively shortened.

In addition, when the star wheel 4 is rotated in the conveying direction of the container 20, the power of the star wheel 4 can be transmitted to the holding wheel 5 via the coil spring 8. Therefore, while the interval between the contact support portion 4A and the contact support portion 5A is maintained to be the interval slightly larger than the maximum dimensional tolerance of the container, the star wheel 4 and the holding wheel 5 can be moved in the conveying direction of the container 20 by the drive motor 6.

In addition, the power is transmitted from the drive motor 27 to the holding wheel 5 so that the coil spring 8 is elastically deformed to rotate the holding wheel 5 relative to the star wheel 4. In this manner, the contact support portion 5A can be separated from the container 20.

In addition to this configuration, the power is transmitted from the drive motor 6 to the star wheel 4. In this manner, the coil spring 8 is elastically deformed to rotate the star wheel 4 relative to the holding wheel 5. In this manner, the contact support portion 4A can be separated from the container 20.

As a result, the container 20 can be conveyed to the container inspection position P2 at a high speed by the container conveying device 26 having a simple configuration, and the container 20 can be accurately positioned at the container inspection position P2. Moreover, the container 20 can be reliably prevented from interfering with the contact support portion 4A and the contact support portion 5A at the container inspection position P2, and the container 20 can be accurately inspected.

In the container conveying device 26 of the present embodiment, the opening windows 4W and 5W are formed in the star wheel 4 and the holding wheel 5, and the coil springs 8 are installed in the opening windows 4W and 5W. However, the opening windows 4W and 5W and the coil spring 8 may not be used.

In this case, when the container 20 is conveyed to the container inspection position P2 by the star wheel 4 and the holding wheel 5, the rotation of the star wheel 4 by the drive motor 6 and the rotation of the holding wheel 5 by the drive motor 27 are synchronized with each other.

Next, when the container 20 is positioned at the container inspection position P2, the drive motor 27 is driven to rotate the holding wheel 5 in the clockwise rotation direction R1 via the timing belt 29, and thereafter, the star wheel 4 is rotated in the counterclockwise rotation direction R2 by the drive motor 6. In this manner, the container 20 is released from the contact support portion 4A and the contact support portion 5A at the container inspection position P2.

Next, when the container 20 is unloaded from the container inspection position P2, the drive motor 27 is driven to rotate the holding wheel 5 in the counterclockwise rotation direction R2 via the timing belt 29, and thereafter, the star wheel 4 is rotated in the clockwise rotation direction R1 by the drive motor 6.

In this manner, the contact support portion 4A and the contact support portion 5A are brought closer to the container 20 at the container inspection position P2, and can bring the container 20 into a conveyable state.

The drive motor 6 and the drive motor 27 may be simultaneously driven to simultaneously separate the contact support portion 4A and the contact support portion 5A from the container 20, or to simultaneously bring the contact support portion 4A and the contact support portion 5A closer to each other.

In this way, the drive motor 6 moves the star wheel 4 in the conveying direction of the container 20, and the drive motor 27 moves the holding wheel 5 in the conveying direction of the container 20 via the timing belt 29. In this manner, when the container 20 is not located at the container inspection position P2, the container 20 can be conveyed to the container inspection position P2 by bringing the contact support portion 4A into contact with the container 20 and by maintaining the posture of the container 20, and the contact support portion 4A and the contact support portion 5A can be separated from the container 20 at the container inspection position P2.

Even in this way, the container 20 loaded from the container loading position P1 can be conveyed to the container inspection position P2 at a high speed, and the container 20 can be accurately positioned at the container inspection position P2. The container 20 can be accurately inspected at the container inspection position P2, and the inspection time of the container 20 can be shortened.

In addition, according to the container conveying device 26 of the present embodiment, the contact support portion 4A has the contact surface 4b which comes into contact with the one side surface 20a of the container 20, and the contact support portion 5A has the contact surface 5b which comes into contact with the other side surface 20b of the container 20. In addition to this configuration, the contact surface 5b extends from the lower portion 20m to the upper portion 20n of the container 20 (refer to FIGS. 5A to 5D).

In this manner, the container 20 can be conveyed by pressing the whole contact surface 4b of the contact support portion 4A against the container 20, and can be conveyed from the container loading position P1 to the container inspection position P2 at a high speed by stably maintaining the posture of the container 20.

The power transmission unit of the present embodiment includes the pulley 27B, the drive shaft 28, the pulley 28A, and the timing belt 29, but the present invention is not limited thereto.

For example, the power transmission unit may include the motor shaft 27A, a gear of the motor shaft 27A, the drive shaft 28, and a gear of the drive shaft 28 by providing the gear in an upper end portion of the motor shaft 27A and by providing a gear meshing with the gear of the motor shaft 27A in a lower end portion of the drive shaft 28.

Next, a configuration of an article conveying device according to a sixth embodiment of the present invention will be described with reference to FIGS. 19 to 24C. The same reference numerals will be assigned to the same configurations as those of the first embodiment, and description thereof will be omitted.

Figure 19:
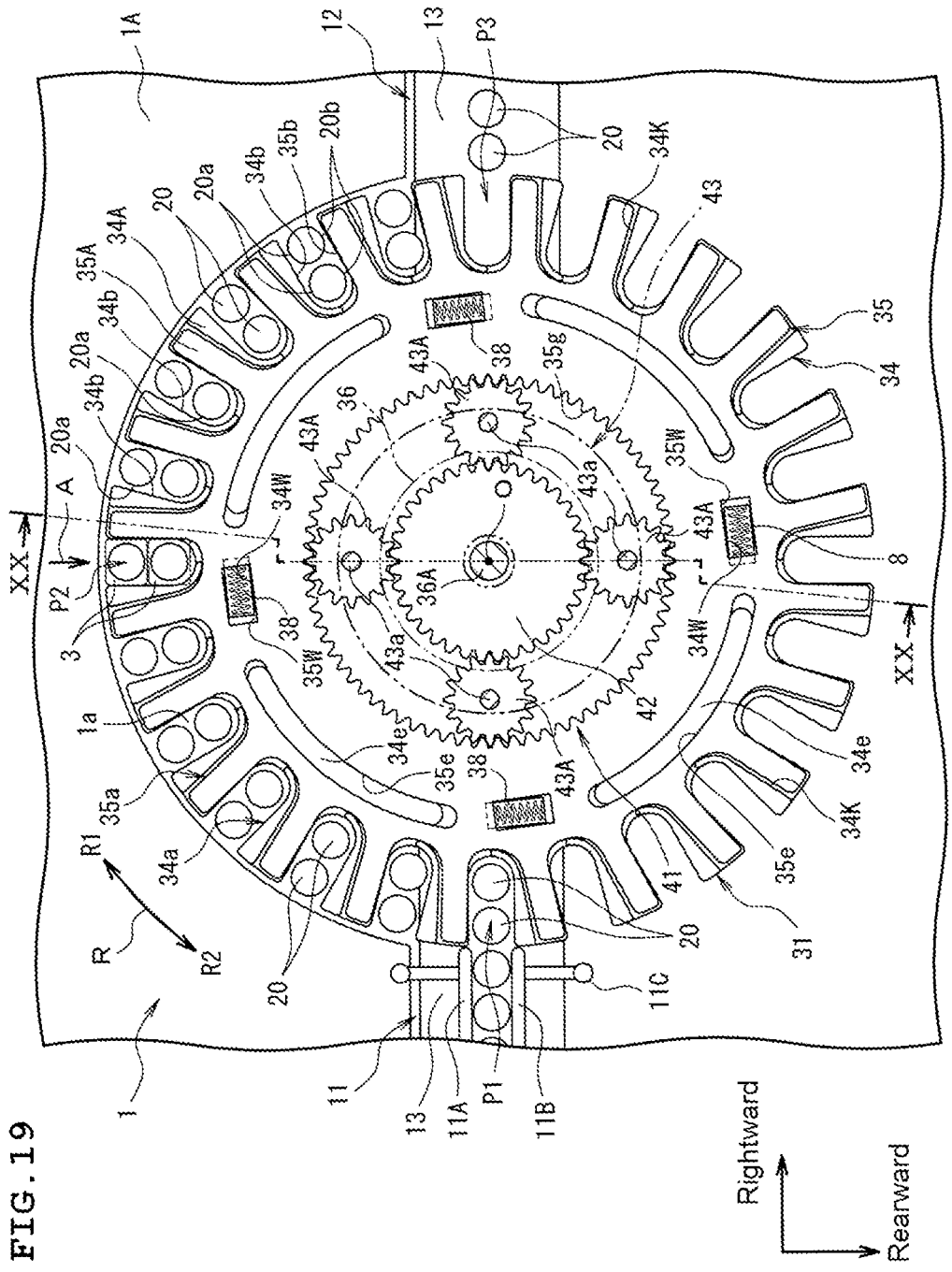
FIG. 19 is a plan view of an article weighing device including an article conveying device according to a sixth embodiment of the present invention, and illustrates a state where a contact support portion is separated from an article (corresponding to a sectional view taken along line XIX-XIX in FIG. 20).
Figure 20:
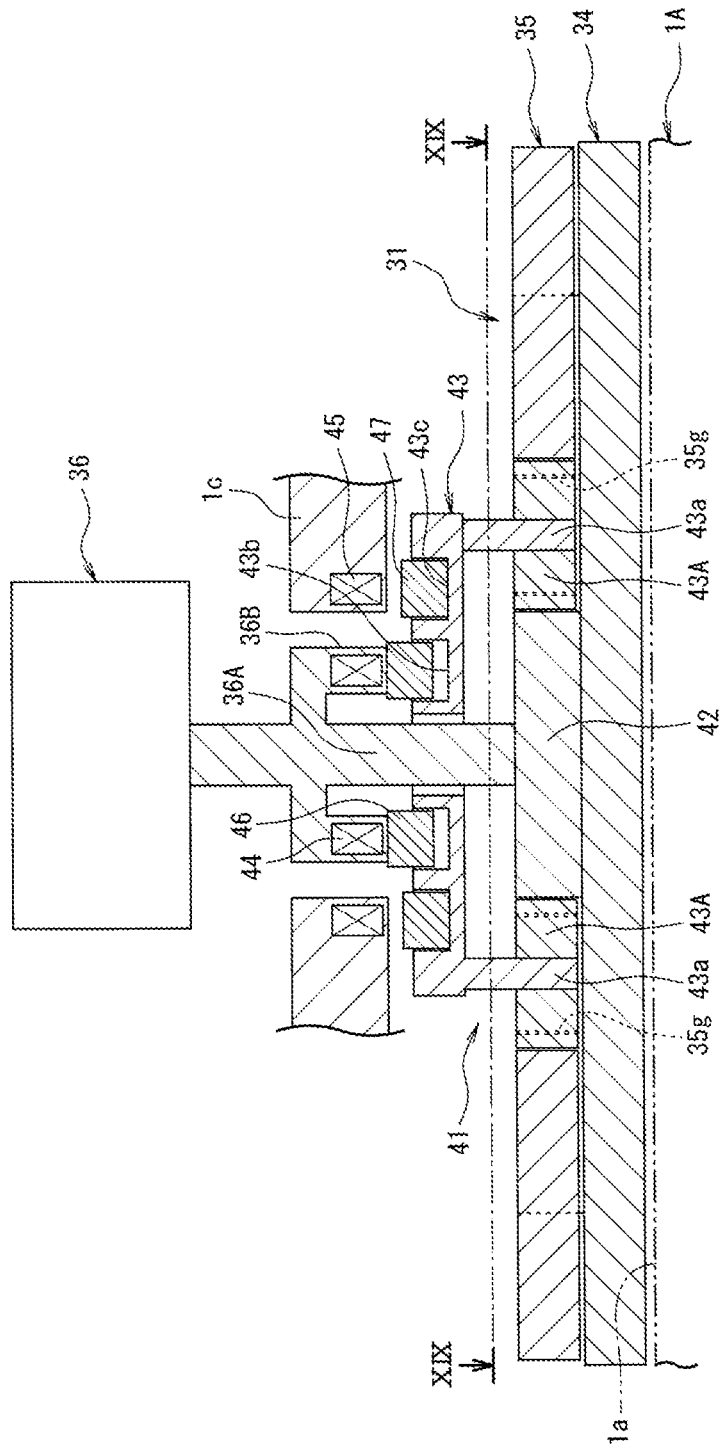
FIG. 20 is a sectional view taken along line XX-XX in FIG. 19, and illustrates a state where a planetary carrier is connected to a drive shaft of a drive motor.

As illustrated in FIGS. 19 and 20, the container weighing device 1 includes a container conveying device 31 serving as an article conveying device that conveys the container 20 along a circumferential conveying course, the container weighing unit 3 that weighs the container 20 at the container inspection position P2 in an intermediate portion of the conveying course, the container loading unit 11 that loads the container in the container conveying device 31 at the container loading position P1, and the container unloading unit 12 that unloads the container from the container conveying device 31 at the container unloading position P3.

The container conveying device 31 includes a star wheel 34 and a holding wheel 35. In the container conveying device 31 of the present embodiment, in the star wheel 34 and the holding wheel 35, the holding wheel 35 is installed on an upper side of the star wheel 34. The star wheel 34 and the holding wheel 35 include rotating members overlapping in the upward-downward direction, of which the rotation direction is the conveying direction.

Recess portions 34a are formed in the outer peripheral portion (end portion) of the star wheel 34, and the recess portions 34a are provided at an equal interval in the rotation direction R of the star wheel 34. The contact support portions 34A are provided in the outer peripheral portion of the star wheel 34, and the contact support portions 34A are provided at an equal interval in the rotation direction R of the star wheel 34.

The recess portion 34a is formed between the contact support portions 34A in the rotation direction R of the star wheel 34. That is, the outer peripheral portion of the star wheel 34 is formed in an uneven shape which is continuous in the rotation direction R.

The star wheel 34 and the holding wheel 35 are installed in the main body 1A of the container weighing device 1 (a part of the main body 1A is illustrated in FIGS. 21, 22, and 24A to 24C). The main body 1A of the container weighing device 1 is provided with a drive motor 36 having a stepping motor (refer to FIGS. 19 and 20).

Two containers 20 are accommodated in each of the recess portions 34a. The length of the contact support portion 34A in the radial direction is formed to be twice or larger than the diameter of the container 20.

Figure 24A:
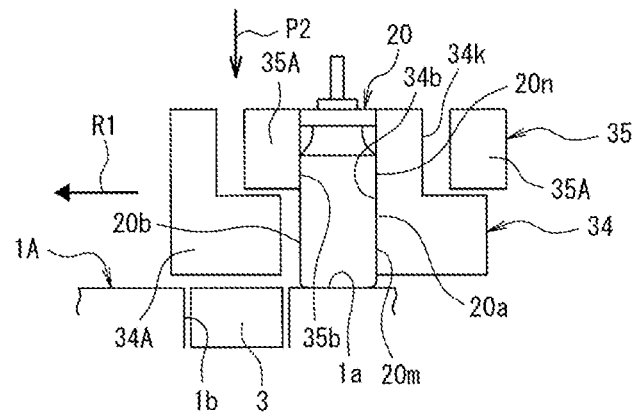
FIGS. 24A to 24C are views illustrating a procedure for conveying the article to an article inspection position and weighing the article by the article conveying device according to the sixth embodiment of the present invention, and are views observed in a direction of an arrow A in FIG. 19.
Figure 24B:
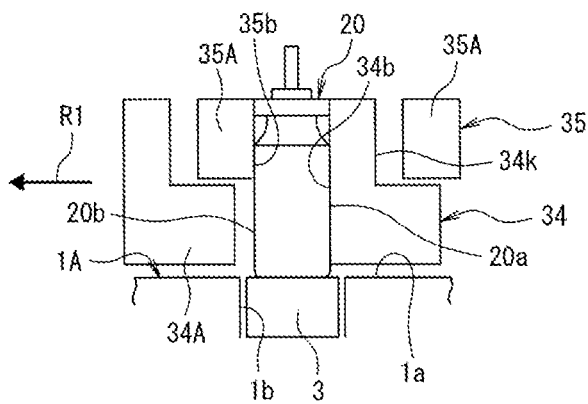
Figure 24C:
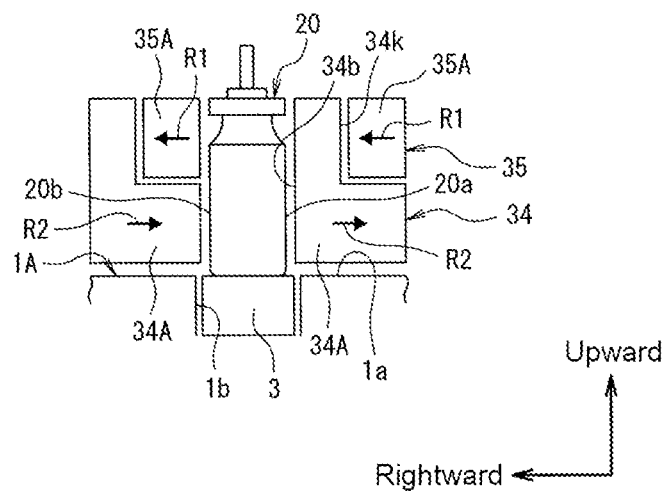

A cutout 34k is formed in the star wheel 34, and a portion of the holding wheel 35 is accommodated in the cutout 34k (refer to FIGS. 24A to 24C).

Recess portions 35a are provided in the outer peripheral portion of the holding wheel 35, and the recess portions 35a are provided at an equal interval in the rotation direction R of the holding wheel 35. A contact support portion 35A is provided on the outer peripheral portion of the holding wheel 35, and the contact support portions 35A are provided at an equal interval in the rotation direction R of the holding wheel 35.

The recess portion 35a is formed between the contact support portions 35A in the rotation direction R of the holding wheel 35. That is, the outer peripheral portion of the holding wheel 35 is formed in an uneven shape which is continuous in the rotation direction R. The recess portions 34a and 35a and the contact support portions 34A and 35A may not be provided at an equal interval in the rotation direction R of the star wheel 34 and the holding wheel 35.

Compared to an outer end of the contact support portion 34A in the radial direction, an outer end of the contact support portion 35A in the radial direction is located inward, and the contact support portion 34A and the contact support portion 35A are aligned in the upward-downward direction.

The two containers 20 are accommodated in the contact support portion 34A and the contact support portion 35A to be respectively located between the contact support portion 34A and the contact support portion 35A. That is, both of these are accommodated in the recess portions 34a and 35a.

Specifically, as illustrated in FIGS. 24A to 24C, a contact surface 34b of the contact support portion 34A in the rotation direction R can come into contact with one side surface (side surface on the upstream side) 20a of the container 20 in the conveying direction, and extends from the lower portion 20m to the upper portion 20n of the container 20.

That is, the contact surface 34b of the contact support portion 34A extends in the upward-downward direction to come into contact with the entire one side surface 20a of the container 20 in the upward-downward direction.

The star wheel 34 of the present embodiment has a portion facing the holding wheel 35 in the upward-downward direction and a portion facing the holding wheel 35 in the horizontal direction.

A contact surface 35b of the contact support portion 35A in the rotation direction R can come into contact with the other side surface (side surface on the downstream side) 20b of the container 20 in the conveying direction. The lower portion 20m of the container 20 forms a lower portion of the article, and the upper portion 20n of the container 20 forms an upper portion of the article.

When the container 20 is conveyed, for example, the interval between the contact surface 34b of the contact support portion 34A and the contact surface 35b of the contact support portion 35A in the rotation direction of the star wheel 34 is formed to be the interval slightly larger than the maximum dimensional tolerance of the diameter of the container 20.

Figure 22:
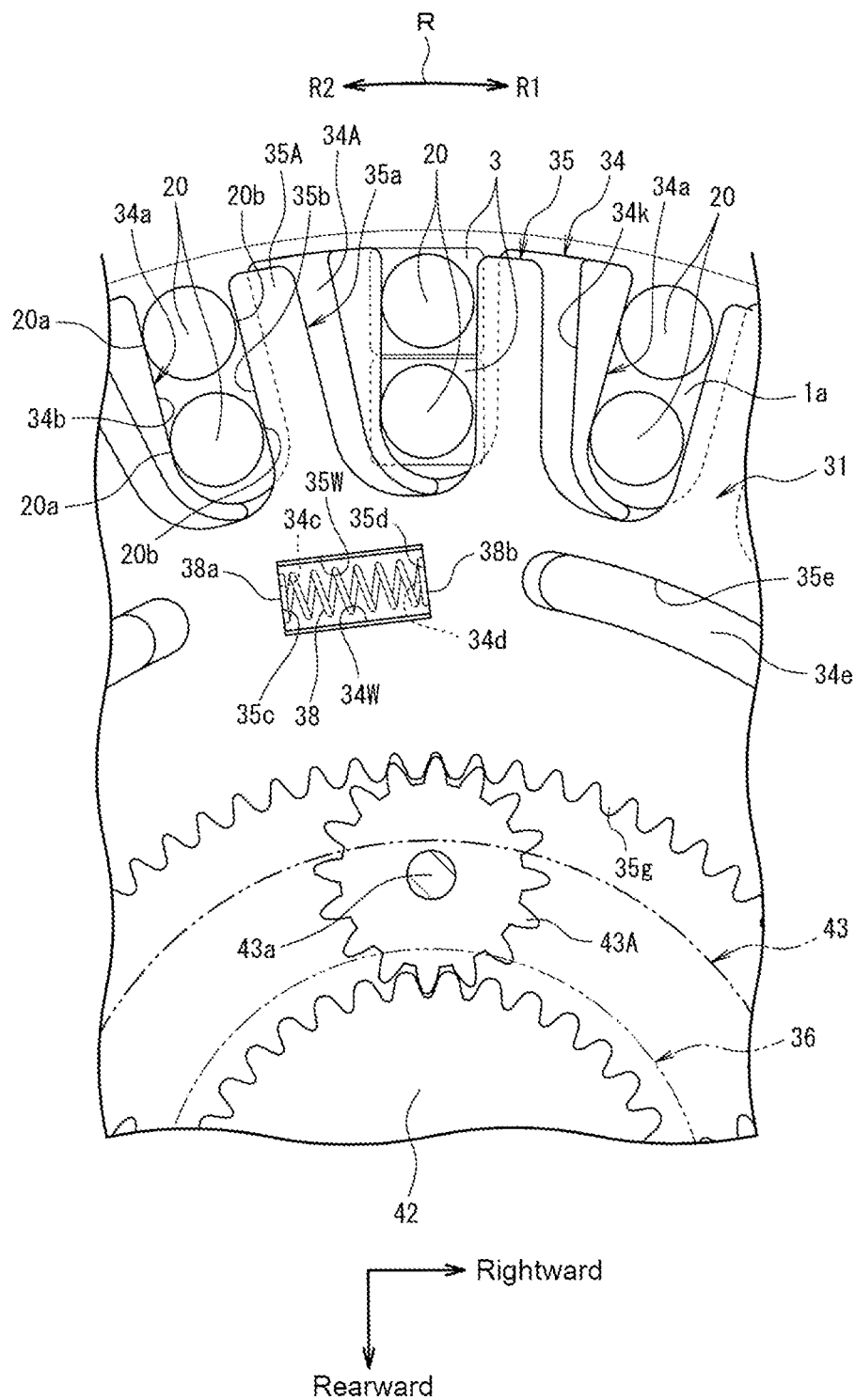
FIG. 22 is an enlarged plan view of the contact support portion of the article conveying device according to the sixth embodiment of the present invention, and illustrates a state where the article is held by the contact support portion.

That is, when the container 20 is conveyed, the contact surface 34b of the contact support portion 34A comes into contact with one side surface 20a of the container 20, and the container 20 is accommodated in the contact support portion 34A and the contact support portion 35A so that a slight gap is formed between the contact surface 35b of the contact support portion 35A and the other side surface 20b of the container 20 (refer to FIG. 22).

This gap is formed to serve as a gap in which the container 20 does not excessively move to the downstream side from the container inspection position P2 when the container 20 is located at the container inspection position P2, and a gap which can prevent the container 20 from being inclined and leaned against the contact support portion 35A when the container 20 is conveyed.

In this manner, during the conveyance, the container 20 accommodated in the contact support portion 34A and the contact support portion 35A is conveyed while being maintained in a posture in which the central axis of the container 20 is parallel to the vertical axis.

The star wheel 34 of the present embodiment forms a conveying member and a first conveying member, and the holding wheel 35 forms a conveying member and a second conveying member. The contact support portion 34A forms an accommodation unit and a first contact support portion, and the contact support portion 35A forms an accommodation unit and a second contact support portion.

The conveying direction of the container 20 is the clockwise rotation direction R1, and the rotation direction R of the star wheel 34 and the holding wheel 35 is the rotation direction of the first conveying member and the second conveying member. In this manner, the container 20 is conveyed in an annular shape.

The contact surface 34b of the contact support portion 34A forms a first contact surface which comes into contact with one side surface of the article, and the contact surface 35b of the contact support portion 5A forms a second contact surface which comes into contact with the other side surface of the article.

Four rectangular opening windows 34W are formed in the star wheel 34, and the longitudinal direction of the opening window 34W extends in the rotation direction R of the star wheel 34. Four rectangular opening windows 35W are formed in the holding wheel 35, and the longitudinal direction of the opening window 35W extends in the rotation direction R of the star wheel 34.

The opening window 34W and the opening window 35W are formed to have the same size, and when the opening window 34W and the opening window 35W face each other in the upward-downward direction, both of these coincide with each other in the upward-downward direction.

Figure 23:
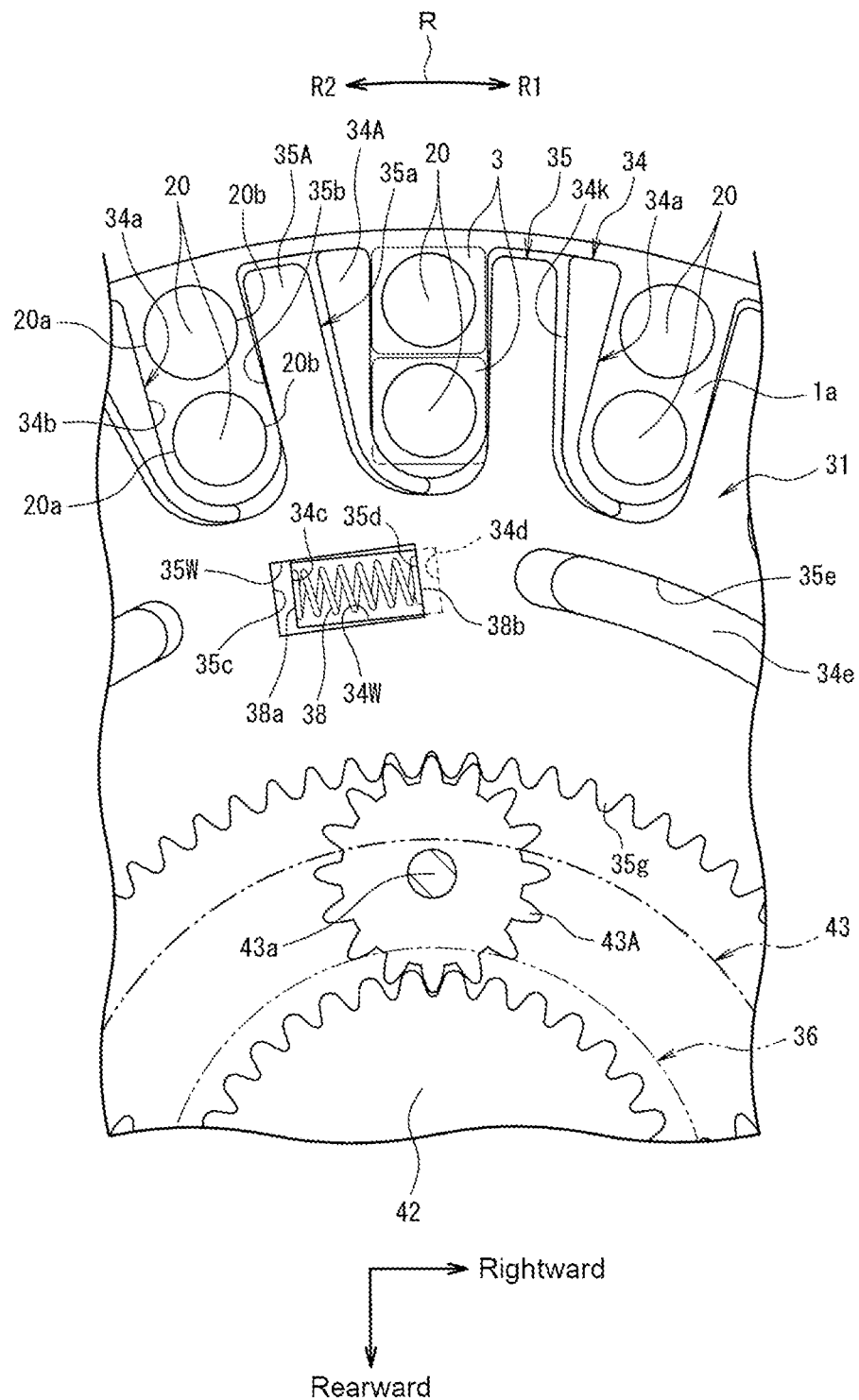
FIG. 23 is an enlarged plan view of the contact support portion of the article conveying device according to the sixth embodiment of the present invention, and illustrates a state where the contact support portion is separated from the article.

As illustrated in FIGS. 22 and 23, coil springs 38 are installed in the opening window 34W and the opening window 35W. In a state where the opening window 34W and the opening window 35W coincide with each other in the upward-downward direction, one end portion 38a of the coil spring 38 comes into contact with both one end portion 34c of the opening window 34W and one end portion 35c of the opening window 35W. The other end portion 38b of the coil spring 38 is in contact with both the other end portion 34d of the opening window 34W and the other end portion 35d of the opening window 35W.

That is, in a state where the coil spring 38 stretches to the maximum, due to a biasing force of the coil spring 38, one end portion 34c of the opening window 34W and one end portion 35c of the opening window 35W face each other in the upward-downward direction, and the other end portion 34d of the opening window 34W and the other end portion 35d of the opening window 35W face each other in the upward-downward direction.

In a state where the coil spring 38 stretches to the maximum, the interval between the contact surface 34b of the contact support portion 34A and the contact surface 35b of the contact support portion 35A in the rotation direction of the star wheel 34 is the interval slightly larger than the maximum dimensional tolerance of the diameter of the container 20. In this state, the container 20 can be accommodated between the contact support portion 34A and the contact support portion 35A.

As illustrated in FIG. 19, the container conveying device 31 is provided with a planetary gear mechanism 41. The planetary gear mechanism 41 has a sun gear 42. The sun gear 42 is fixed to an upper surface of a central portion of the star wheel 34, and rotates integrally with the star wheel 34 (refer to FIGS. 20 and 21).

The holding wheel 35 is open inward of the contact support portions 34A and 35A in the radial direction, and internal teeth 35g are formed in the opening. The internal teeth 35g are formed along the circumferential direction (rotation direction) of the holding wheel 35.

As illustrated in FIG. 20, the sun gear 42 is installed at a height position the same as that of the holding wheel 35, and is installed inward of the internal teeth 35g in the radial direction.

A drive shaft 36A of the drive motor 36 is connected to the sun gear 42, and when the drive motor 36 is rotationally driven, the star wheel 34 rotates integrally with the sun gear 42.

The planetary gear mechanism 41 has a planetary carrier 43. The planetary carrier 43 is provided with four leg portions 43a formed apart at an interval of 90° on the circumferential right side (refer to FIG. 19), and a pinion gear 43A is rotatably supported by each of the leg portions 43a. The pinion gear 43A meshes with the sun gear 42 and the internal teeth 35g.

That is, the planetary gear mechanism 41 has the internal teeth 35g formed in the holding wheel 35, and the holding wheel 35 corresponds to a ring gear of the planetary gear mechanism 41. The sun gear 42 forms a sun gear, and the pinion gear 43A forms a planetary gear.

As illustrated in FIG. 20, the drive shaft 36A of the drive motor 36 is provided with a cylindrical portion 36B, and the cylindrical portion 36B rotates integrally with the drive shaft 36A. An annular electromagnetic coil 44 is incorporated in the cylindrical portion 36B.

The main body 1A is provided with a support portion 1c, and an annular electromagnetic coil 45 is incorporated in the support portion 1c.

A plurality of groove portions 43b are formed in the planetary carrier 43, and the groove portions 43b face the cylindrical portion 36B in the upward-downward direction. The groove portions 43b extend with a constant length on the same circumference of the planetary carrier 43, and are separated from each other on the same circumference of the planetary carrier 43.

A clutch member 46 is accommodated inwardly of the groove portion 43b in the radial direction. The clutch member 46 is formed with the length approximately equal to the length of the groove portion 43b in the circumferential direction, is movable in the upward-downward direction between a state of being accommodated in the groove portion 43b and a state of protruding from the groove portion 43b, and is not movable in the circumferential direction of the groove portion 43b. That is, both end portions of the clutch member 46 in the circumferential direction are in contact with both end portions of the groove portion 43b in the circumferential direction.

A plurality of groove portions 43c are formed in the planetary carrier 43. The groove portion 43c is located inward of the groove portion 43b in the radial direction of the planetary carrier 43, and faces the support portion 1c in the upward-downward direction.

The groove portions 43c extend with a constant length on the same circumference of the planetary carrier 43, and are separated from each other on the same circumference of the planetary carrier 43.

A clutch member 47 is accommodated in the groove portion 43c. The clutch member 47 is formed with the length approximately equal to the length of the groove portion 43c in the circumferential direction, is movable in the upward-downward direction between a state of being accommodated in the groove portion 43c and a state of protruding from the groove portion 43c, and is not movable in the circumferential direction of the groove portion 43c. That is, both end portions of the clutch member 47 in the circumferential direction are in contact with both end portions of the groove portion 43c in the circumferential direction.

In the container conveying device 31, when the electromagnetic coil 44 is excited, the clutch member 46 protrudes upward from the groove portion 43b, and the clutch member 46 is attracted to the electromagnetic coil 44. In this manner, the planetary carrier 43 is connected to the drive shaft 36A of the drive motor 36, and the planetary carrier 43 rotates integrally with the drive shaft 36A.

When the sun gear 42 is rotationally driven by the drive motor 36 in a state where the planetary carrier 43 is connected to the drive shaft 36A of the drive motor 36, the star wheel 34 rotates integrally with the sun gear 42.

At this time, the planetary carrier 43 rotates integrally with the sun gear 42, and the leg portion 43a circumferentially moves around the rotation center axis O of the star wheel 34. Therefore, the pinion gear 43A revolves without rotating around the rotation center axis O of the star wheel 34.

In this manner, the holding wheel 35 with which the pinion gear 43A and the internal teeth 35g mesh rotates integrally with the star wheel 34 at a constant speed.

In this state, the container 20 accommodated in the contact support portion 34A and the contact support portion 35A is pushed by coming into contact with the contact support portion 34A due to the rotation of the star wheel 34, and is conveyed while a slight gap is maintained between the contact support portion 35A and the contact support portion 34A.

In this manner, without being completely gripped by the contact support portion 34A and the contact support portion 35A, the container 20 is conveyed from the container loading position P1 to the container unloading position P3 via the container inspection position P2 while sliding on the conveying surface 1a of the main body 1A.

On the other hand, when the electromagnetic coil 45 is excited, the clutch member 47 protrudes upward from the groove portion 43c, and the clutch member 47 is attracted to the electromagnetic coil 45. In this manner, the planetary carrier 43 is fixed to the main body 1A, and is not rotatable.

When the drive motor 36 is driven in a state where the planetary carrier 43 is fixed to the main body 1A, the leg portion 43a is brought into a stopped state without circumferentially moving around the rotation center axis O of the star wheel 34, and the sun gear 42 is rotated by the drive motor 36.

In this manner, the pinion gear 43A rotates without revolving around the rotation center axis O of the star wheel 34, and the holding wheel 35 rotates relative to the star wheel 34 due to the rotation of the pinion gear 43A.

The clutch members 46 and 47 of the present embodiment may be any member as long as both of these are attracted to the electromagnetic coils 44 and 45 when the electromagnetic coils 44 and 45 are excited, and are separated from the electromagnetic coils 44 and 45 when the electromagnetic coils 44 and 45 are brought into a non-excited state.

In the present embodiment, for example, the clutch members 46 and 47 are made of lightweight metal. The electromagnetic coil 44 and the clutch member 46 of the present embodiment, and the electromagnetic coil 45 and the clutch member 47 form an electromagnetic clutch.

In the container conveying device 31 of the present embodiment as well, the container 20 is conveyed while the posture is maintained by bringing the contact support portion 34A into contact with the container 20 when the container 20 is not located at the container inspection position P2. When the container 20 is located at the container inspection position P2, the contact support portion 34A and the contact support portion 35A are separated from the container 20. After the weighing of the container 20 is completed, the container 20 is conveyed to the container unloading position P3 by bringing the contact support portion 34A into contact with the container 20.

As illustrated in FIG. 19, four protruding portions 34e are formed in the star wheel 34, and the protruding portion 34e extends along the rotation direction R of the star wheel 34.

The holding wheel 35 is provided with four cutouts 35e. The cutout 35e extends in the rotation direction R of the holding wheel 35, and the protruding portion 34e is fitted into the cutout 35e.

In this manner, when the star wheel 34 and the holding wheel 35 rotate relative to each other, the cutout 35e moves along the protruding portion 34e. In this manner, the star wheel 34 and the holding wheel 35 can be prevented from being displaced in the radial direction, and the star wheel 34 and the holding wheel 35 can smoothly rotate relative to each other.

The length of the cutout 35e in the rotation direction R of the star wheel 34 is formed to be longer than the length of the protruding portion 34e in the rotation direction R of the star wheel 34. When the holding wheel 35 excessively rotates relative to the star wheel 34 for some reasons, an end portion of the protruding portion 34e in the rotation direction R of the star wheel 34 comes into contact with an end portion of the cutout 35e in the rotation direction R of the star wheel 34.

In this manner, the coil spring 38 can be prevented from being excessively compressed, and the coil spring 38 can be protected. Therefore, durability of the coil spring 38 can be improved.

Next, an operation of the container conveying device 31 of the present embodiment will be described.

When the container 20 is loaded in the recess portions 34a and 35a at the container loading position P1, at a timing at which the container 20 is loaded in the contact support portion 34A and the contact support portion 35A, the drive motor 36 is stopped, and the star wheel 34 and the holding wheel 35 are paused.

Next, the electromagnetic coil 45 is excited so that the clutch member 47 is attracted to the electromagnetic coil 45. In this manner, the planetary carrier 43 is connected to the main body 1A (refer to FIG. 21). At this time, the electromagnetic coil 44 is in a non-excited state, and the drive shaft 36A of the drive motor 36 and the planetary carrier 43 are in a non-connected state. Thereafter, the drive motor 36 is driven (excited) to rotate the sun gear 42 in the counterclockwise rotation direction R2.

When the sun gear 42 rotates in the counterclockwise rotation direction R2, the star wheel 34 rotates in the counterclockwise rotation direction R2, the pinion gear 43A rotates in the clockwise rotation direction R1, and the holding wheel 35 rotates in the clockwise rotation direction R1.

Here, both end portions of the clutch member 47 in the circumferential direction are in contact with both end portions of the groove portion 43c in the circumferential direction. Therefore, the planetary carrier 43 does not rotate with respect to the main body 1A. The pinion gear 43A rotates at the same position without circumferentially moving around the sun gear 42.

In this manner, the contact support portion 34A and the contact support portion 35A are separated from each other, the interval between the contact support portion 34A and the contact support portion 35A in the rotation direction R of the star wheel 34 is widened, and the contact support portion 34A and the contact support portion 35A are widened, and a sufficient space for accommodating the container 20 is formed between the contact support portion 34A and the contact support portion 35A.

At this time, the container 20 is loaded between the contact support portion 34A and the contact support portion 35A at the container loading position P1 (refer to FIG. 19). When the container 20 is loaded, the sufficient space for accommodating the container 20 is formed between the contact support portion 34A and the contact support portion 35A. Therefore, loading performance of the container 20 can be improved.

When the container 20 is loaded between the contact support portion 34A and the contact support portion 35A at the container loading position P1, the drive motor 36 is brought into a non-excited state so that the sun gear 42 is rotatable.

At this time, the star wheel 34 and the holding wheel 35 are biased by the coil spring 38, and the coil spring 38 stretches to the maximum so that one end portion 34c of the opening window 34W and one end portion 35c of the opening window 35W overlap in the upward-downward direction, and so that the other end portion 34d of the opening window 34W and the other end portion 35d of the opening window 35W overlap in the upward-downward direction (refer to FIG. 22).

In a stretching process of the coil spring 38, the sun gear 42 rotates in the clockwise rotation direction R1, the pinion gear 43A rotates in the counterclockwise rotation direction R2, and the holding wheel 35 rotates in the counterclockwise rotation direction R2.

When the coil spring 38 stretches to the maximum, the interval between the contact surface 34b of the contact support portion 34A and the contact surface 35b of the contact support portion 35A in the rotation direction of the star wheel 34 is formed to be the interval slightly larger than the maximum dimensional tolerance of the diameter of the container 20.

Next, the electromagnetic coil 45 is brought into a non-excited state to bring the planetary carrier 43 and the main body 1A into a non-connected state, and the electromagnetic coil 44 is excited so that the clutch member 46 is attracted to the electromagnetic coil 44. In this manner, the planetary carrier 43 is connected to the drive shaft 36A of the drive motor 36 (refer to FIG. 20). Thereafter, the drive motor 36 is driven to rotate the sun gear 42 in the clockwise rotation direction R1.

When the sun gear 42 rotates in the clockwise rotation direction R1, the star wheel 34 rotates integrally with the sun gear 42 in the clockwise rotation direction R1. In addition to this configuration, the planetary carrier 43 circumferentially moves in the clockwise rotation direction R1, and the pinion gear 43A revolves without rotating around the rotation center axis O of the star wheel 34.

In this manner, the holding wheel 35 rotates together with the star wheel 34 in the clockwise rotation direction R1 while maintaining a constant distance between the contact surface 34b of the contact support portion 34A and the contact surface 35b of the contact support portion 35A.

Here, both end portions of the clutch member 46 in the circumferential direction are in contact with both end portions of the groove portion 43b in the circumferential direction. Therefore, the cylindrical portion 36B of the planetary carrier 43 and the planetary carrier 43 do not rotate relative to each other in the circumferential direction, and the planetary carrier 43 rotates integrally with the drive shaft 36A.

At this time, the container 20 is pushed by the contact support portion 34A, and the container 20 is conveyed from the container loading position P1 toward the container inspection position P2.

That is, one side surface 20a of the container 20 comes into contact with the contact surface 34b of the contact support portion 34A of the star wheel 34, and is pushed by the contact support portion 34A. In this manner, the container 20 is conveyed to the container inspection position P2.

At this time, a slight gap is formed between the other side surface 20b of the container 20 and the contact surface 35b of the contact support portion 35A, and the container 20 is conveyed from the container loading position P1 to the container inspection position P2 while sliding on the conveying surface 1a of the main body 1A (refer to FIG. 24A).

A slight gap is formed between the other side surface 20b of the container 20 and the contact surface 35b of the contact support portion 35A. However, as the container 20 is conveyed, the other side surface 20b of the container 20 may come into contact with the contact surface 35b of the contact support portion 35A. When the container 20 tries to excessively swing, the container 20 comes into contact with the contact support portion 35A, thereby preventing the container 20 from being conveyed in an inclined state.

In addition, the slight gap is formed between the other side surface 20b of the container 20 and the contact surface 35b of the contact support portion 35A. Therefore, the container 20 is not completely held between the contact support portion 34A and the contact support portion 35A.

Therefore, a bottom surface of the container 20 can be slid on the conveying surface 1a of the main body 1A, it is possible to prevent a possibility that the bottom surface of the container 20 may strongly collide with the conveying surface 1a, and the container 20 may receive a strong impact during the conveyance.

When the container 20 accommodated in the recess portions 34a and 35a is conveyed to the container inspection position P2 (refer to FIG. 24B), the drive motor 36 is stopped, and the star wheel 34 and the holding wheel 35 are paused.

When the container 20 is conveyed, the slight gap is formed between the other side surface 20b of the container 20 and the contact surface 35b of the contact support portion 35A. Therefore, when the container 20 is located at the container inspection position P2 to pause the star wheel 34 and the holding wheel 35, due to the inertia of the container 20, the other side surface 20b of the container 20 comes into contact with the contact support portion 35A.

In this manner, the container 20 can be prevented from being excessively located on the downstream side from the container inspection position P2, and the container 20 can be accurately positioned at the container inspection position P2.

When the star wheel 34 and the holding wheel 35 are paused, due to the inertia of the container 20, the other side surface 20b of the container 20 often comes into contact with the contact support portion 35A. However, the container 20 swings to the upstream side or to the downstream side in the conveying direction. Therefore, one side surface 20a of the container 20 may come into contact with the contact support portion 34A, and may not come into contact with the contact support portion 34A and the contact support portion 35A.

Next, the electromagnetic coil 44 is brought into a non-excited state to bring the drive shaft 36A of the drive motor 36 and the planetary carrier 43 into a non-connected state, and the electromagnetic coil 45 is excited so that the clutch member 47 is attracted to the electromagnetic coil 45.

Figure 21:
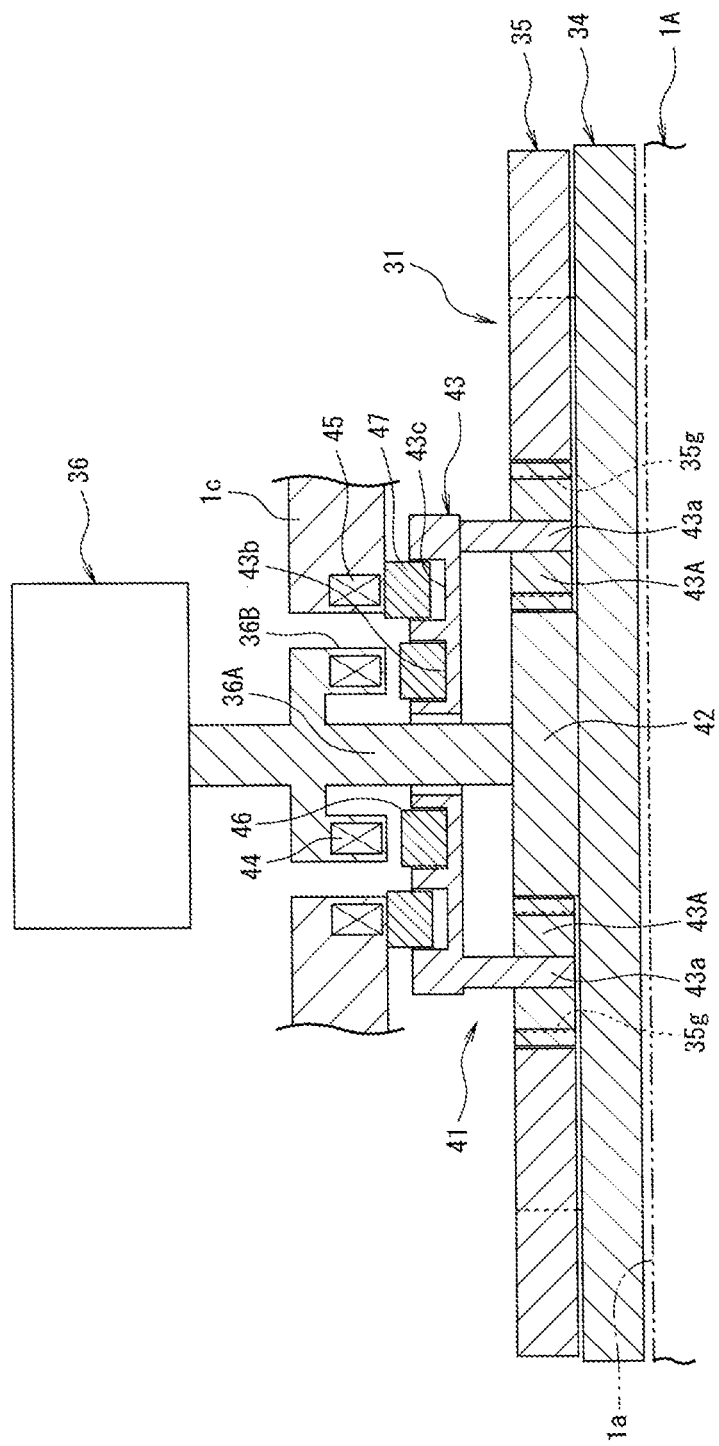
FIG. 21 corresponds to the sectional view taken along line XX-XX in FIG. 19, and illustrates a state where the planetary carrier is connected to a main body.

In this manner, the planetary carrier 43 is connected to the main body 1A (refer to FIG. 21). Thereafter, the drive motor 36 is driven to rotate the sun gear 42 in the counterclockwise rotation direction R2.

When the sun gear 42 rotates in the counterclockwise rotation direction R2, the star wheel 34 rotates in the counterclockwise rotation direction R2, the pinion gear 43A rotates in the clockwise rotation direction R1, and the holding wheel 35 rotates in the clockwise rotation direction R1.

In this manner, the contact support portion 35A and the contact support portion 34A are separated from each other, and the interval between the contact support portion 34A and the contact support portion 35A in the rotation direction of the star wheel 34 is widened (refer to FIG. 24C).

At this time, the coil spring 38 is elastically deformed to contract, and the distance between one end portion 35c of the opening window 35W and the other end portion 34d of the opening window 34W is shortened, compared to when the container 20 is held by the contact support portions 34A and the contact support portions 35A.

On the other hand, at a timing at which the container 20 is released from the contact support portion 34A and the contact support portion 35A, the container 20 is loaded in the recess portions 34a and 35a from the container loading unit 11 at the container loading position P1, and the container 20 is unloaded to the container unloading unit 12 from the recess portions 34a and 35a at the container unloading position P3.

When the container 20 is conveyed, a slight gap is formed between the other side surface 20b of the container 20 and the contact surface 5b of the contact support portion 5A. Therefore, the container 20 may be loaded and unloaded in advance without waiting for a timing at which the container 20 is released.

When the weighing of the container 20 is completed at the container inspection position P2 by the container weighing unit 3, the drive motor 36 is brought into a non-excited state so that the sun gear 42 and the pinion gear 43A are rotatable.

At this time, the coil spring 38 is elastically deformed to stretch to the maximum. In this manner, the holding wheel 35 rotates relative to the star wheel 34 so that the contact support portion 35A is closer to the contact support portion 34A. The contact surface 34b of the contact support portion 34A comes into contact with one side surface 20a of the container 20, and a slight gap is formed between the other side surface 20b of the container 20 and the contact surface 35b of the contact support portion 35A.

In this manner, after the clutch member 46 is attracted to the electromagnetic coil 44, when the star wheel 34 is rotationally driven in the clockwise rotation direction R1 by the drive motor 36, the completely weighed container 20 is conveyed from the container inspection position P2 to the container unloading position P3 in a state where the posture is maintained by the contact support portion 34A and the contact support portion 35A, and is unloaded at the container unloading position P3 in the container unloading unit 12.

Next, an advantageous effect of the container conveying device 31 of the present embodiment will be described.

The container conveying device 31 of the present embodiment has contact support portions 34A and 35A which accommodate the containers 20 to be sequentially loaded from the container loading unit 11, and has the star wheel 34 and the holding wheel 35 which convey the containers 20 accommodated in the contact support portions 34A and 35A to the container inspection position to P2.

The star wheel 34 is provided to be rotatable in the conveying direction of the container 20. The holding wheel 35 is provided to be rotatable in the conveying direction of the container 20, and to be rotatable relative to the star wheel 34.

The contact support portions 34A are provided at an equal interval in the outer peripheral portion of the star wheel 34, and can come into contact with one side surface 20a of the container 20. The contact support portions 35A are provided at an equal interval in the outer peripheral portion of the holding wheel 35, and can come into contact with the other side surface 20b of the container 20.

In addition to this configuration, the container 20 is conveyed while the posture of the container 20 is maintained by bringing the contact support portion 34A into contact with the container 20 when the container 20 is not located at the container inspection position P2. Therefore, the container 20 can be conveyed from the container loading position P1 to the container inspection position P2 at a high speed.

In addition, the contact support portion 34A and the contact support portion 35A are separated from the container 20 when the container 20 is located at the container inspection position P2. Therefore, the container 20 can be prevented from interfering with the contact support portion 34A and the contact support portion 35A at the container inspection position P2.

As a result, the container 20 loaded from the container loading unit 11 can be conveyed to the container inspection position P2 at a high speed, and the container 20 can be accurately positioned at the container inspection position P2. The container 20 can be accurately weighed at the container inspection position P2, and the weighing time of the container 20 can be shortened.

In addition, the container conveying device 31 of the present embodiment has the drive motor 36 and the planetary gear mechanism 41 which rotationally drive the star wheel 34 and the holding wheel 35. The planetary gear mechanism 41 includes the sun gear 42 attached to the star wheel 34 and driven by the drive motor 36, the internal teeth 35g formed in the holding wheel 35, and the planetary carrier 43 which rotatably supports the pinion gear 43A meshing with the sun gear 42 and the internal tooth 35g, and which is rotationally driven by the drive motor 36.

According to this configuration, the container 20 to be loaded from the container loading unit 11 is accommodated between the contact support portion 34A and the contact support portion 35A. When the container 20 is not located at the container inspection position P2, the planetary carrier 43 is rotatable, and the sun gear 42 is rotated. In this manner, the sun gear 42 meshing with the pinion gear 43A and the internal teeth 35g are integrally rotated by circumferentially moving the pinion gear 43A.

In this manner, the posture of the container can be maintained by bringing the contact support portion 34A into contact with the container 20, and the holding wheel 35 can be moved by forming a gap between the contact support portion 35A and the container 20. The container 20 can be conveyed to the container inspection position P2 at a high speed.

As a result, the container 20 loaded from the container loading unit 11 can be conveyed to the container inspection position P2 at a high speed, and the container 20 can be accurately positioned at the container inspection position P.

In addition, when the container 20 is located at the container inspection position P2, the container conveying device 31 of the present embodiment separates the planetary carrier 43 from the drive motor 36 so that the planetary carrier 43 does not rotate, causes the drive motor 36 to rotate the sun gear 42, and rotates the pinion gear 43A. In this manner, the star wheel 34 and the holding wheel 35 are relatively rotated to separate the contact support portion 35A from the other side surface 20b of the container 20, and to separate the contact support portion 34A from one side surface 20a of the container 20.

In this manner, the container 20 can be prevented from interfering with the contact support portion 34A and the contact support portion 35A at the container inspection position P2, and the container 20 can be accurately inspected at the container inspection position P2. As a result, the inspection time of the container 20 can be shortened.

In addition, the container conveying device 31 of the present embodiment the coil spring 38 which is installed in the opening window 34W formed in the star wheel 34 and the opening window 35W formed in the holding wheel 35, which can transmit the power from the star wheel 34 to the holding wheel 35, and which is elastically deformable when the star wheel 34 and the holding wheel 35 rotate relative to each other.

In this manner, when the coil spring 38 stretches to the maximum extent, the container 20 can be conveyed to the container inspection position P2 by forming the interval between the contact support portion 34A and the contact support portion 35A to be the interval slightly larger than the maximum dimensional tolerance of the container 20, and by accommodating the container 20 between the contact support portion 34A and the contact support portion 35A.

Therefore, the container 20 can be conveyed from the container loading position P1 to the container inspection position P2 at a high speed, and the inspection time of the container 20 can be more effectively shortened.

In addition, according to the container conveying device 31 of the present embodiment, the contact support portion 34A has the contact surface 34b which comes into contact with one side surface 20a of the container 20, and the contact support portion 35A has the contact surface 35b which comes into contact with the other side surface 20b of the container 20. In addition to this configuration, the contact surface 35b extends from the lower portion 20m to the upper portion 20n of the container 20.

In this manner, the container 20 can be conveyed by pressing the whole contact surface 34b of the contact support portion 34A against the container 20, and can be conveyed from the container loading position P1 to the container inspection position P2 at a high speed by stably maintaining the posture of the container 20.

In addition, according to the container conveying device 2 of the present embodiment, the star wheel 34 is a rotating member in which the conveying direction of the container 20 is the rotation direction, and the holding wheel is a rotating member which is rotatable in a normal/reverse direction of the rotation direction of the star wheel 34.

In this manner, an installation area of the container conveying device 2 can be reduced, compared to a case where the containers 20 are linearly conveyed.

In the container conveying device 31 of the present embodiment, the opening windows 34W and 35W are formed in the star wheel 34 and the holding wheel 35, and the coil springs 38 are installed in the opening windows 34W and 35W. However, the opening windows 34W and 35W and the coil spring 38 may not be used.

In this case, when the weighing of the container 20 is completed at the container inspection position P2, the drive motor 36 is rotated in the clockwise rotation direction R1 in a state where the clutch member 47 is attracted by the electromagnetic coil 45, and the pinion gear 43A is rotated in the counterclockwise rotation direction R2. In this manner, the contact support portion 34A and the contact support portion 35A may be brought closer to the container 20.

Although the embodiments of the present invention have been disclosed, it is apparent that those skilled in the art could have made changes without departing from the scope of the present invention. It is intended that all of these modifications and equivalents are included in the appended claims.

DESCRIPTION OF REFERENCE NUMERALS AND SIGNS 2, 21, 24, 26, 31 container conveying device (article conveying device)
4 star wheel (conveying member, first conveying member, first rotating member)
4A, 34A contact support portion (accommodation unit, first contact support portion)
4b, 34b contact surface (first contact surface)
4h bent portion (adjustment unit)
4W opening window (first opening window)

5 holding wheel (conveying member, second conveying member, second rotating member)
5A, 35A contact support portion (accommodation unit, second contact support portion)
5b, 35b contact surface (second contact surface)
5f internal teeth (power transmission unit)
5i bolt support portion (adjustment unit)
5t inclined groove
5W opening window (second opening window)
6 drive motor (second drive unit, third drive unit)
8, 15 coil spring (elastic member)
9 actuator (first drive unit)
9C roller portion (moving portion)
11 container loading unit (article loading unit)
14 bolt (adjustment unit)
20 container (article)
20a one side surface (one side surface of article)
20b other side surface (other side surface of article)
20m lower portion (lower portion of article)
20n upper portion (upper portion of article)
22, 25, 27 drive motor (fourth drive unit)
23 gear (fourth drive unit, power transmission unit)
27B pulley (fourth drive unit, power transmission unit)
28 drive shaft (fourth drive unit, power transmission unit)
28A pulley (fourth drive unit, power transmission unit)
29 timing belt (fourth drive unit, power transmission unit)
34 star wheel (conveying member, first conveying member, rotating member)
35 holding wheel (conveying member, second conveying member, rotating member)
35g internal teeth
41 planetary gear mechanism
42 sun gear (sun gear)
43 planetary carrier (carrier)
43A pinion gear (planetary gear)
P2 container inspection position (article inspection position)

What is claimed is:

1. An article conveying device comprising:
a plurality of accommodation units that accommodate an article to be sequentially loaded at a predetermined position,
wherein the article conveying device conveys the article accommodated in the accommodation units to an article inspection position,
the accommodation unit includes
a first contact support portion provided in a first conveying member provided to be movable in a conveying direction of the article, and configured to come into contact with one side surface of the article located on an upstream side in the conveying direction, and
a second contact support portion provided in a second conveying member provided to be movable in the conveying direction of the article and to be relatively movable in the conveying direction of the article with respect to the first conveying member, and configured to come into contact with the other side surface of the article located on a downstream side in the conveying direction, and
when the article is not located at the article inspection position, the article is conveyed while a posture of the article is maintained by bringing at least the first contact support portion into contact with the article, and when the article is located at the article inspection position, the first contact support portion and the second contact support portion are separated from the article.

2. The article conveying device according to claim 1, further comprising:
an elastic member installed in a first opening window formed in the first conveying member and a second opening window formed in the second conveying member, configured to transmit power to the second conveying member from the first conveying member, and elastically deformable when the first conveying member and the second conveying member move relative to each other;
a first drive unit that elastically deforms the elastic member to move the second conveying member relative to the first conveying member; and
a second drive unit that elastically deforms the elastic member to move the first conveying member relative to the second conveying member.

3. The article conveying device according to claim 1, further comprising:
an elastic member installed between the first conveying member and the second conveying member, configured to transmit power to the second conveying member from the first conveying member, and elastically deformable when the first conveying member and the second conveying member move relative to each other;
an adjustment unit that elastically deforms the elastic member to adjust an interval between the first contact support portion and the second contact support portion, and positions the first contact support portion and the second contact support portion to have a constant interval;
a first drive unit that elastically deforms the elastic member to move the second conveying member relative to the first conveying member; and
a second drive unit that elastically deforms the elastic member to move the first conveying member relative to the second conveying member.

4. The article conveying device according to claim 1, further comprising:
a third drive unit that moves the first conveying member in the conveying direction of the article; and
a fourth drive unit that moves the second conveying member in the conveying direction of the article.

5. The article conveying device according to claim 4,
wherein the fourth drive unit has a drive motor, and directly moves the second conveying member by the drive motor, or moves the second conveying member by transmitting power of the drive motor to the second conveying member via a power transmission unit.

6. The article conveying device according to claim 5, further comprising:
an elastic member installed in a first opening window formed in the first conveying member and a second opening window formed in the second conveying member, configured to transmit power to the second conveying member from the first conveying member, and elastically deformable when the first conveying member and the second conveying member move relative to each other,
wherein the fourth drive unit directly transmits the power of the drive motor to the second conveying member so that the elastic member is elastically deformed to move the second conveying member relative to the first conveying member, or transmits the power of the drive motor to the second conveying member via the power transmission unit so that the elastic member is elastically deformed to move the second conveying member relative to the first conveying member, and the third drive unit elastically deforms the elastic member to move the first conveying member relative to the second conveying member.

7. The article conveying device according to claim 1, wherein the first conveying member and the second conveying member include rotating members overlapping in an upward-downward direction, of which a rotation direction is the conveying direction of the article, the article conveying device further comprises a drive motor and a planetary gear mechanism which rotationally drive the first conveying member and the second conveying member, and the planetary gear mechanism includes
a sun gear attached to the first conveying member and driven by the drive motor,
internal teeth formed in the second conveying member, and
a carrier rotatably supporting a planetary gear meshing with the sun gear and the internal teeth and rotationally driven by the drive motor.

8. The article conveying device according to claim 2, wherein when the article is located at the article inspection position, the first drive unit moves the second conveying member relative to the first conveying member to separate the second contact support portion from the other side surface of the article, and the second drive unit moves the first conveying member in a direction opposite to a moving direction of the second conveying member to separate the first contact support portion from one side surface of the article.

9. The article conveying device according to claim 3, wherein when the article is located at the article inspection position, the first drive unit moves the second conveying member relative to the first conveying member to separate the second contact support portion from the other side surface of the article, and the second drive unit moves the first conveying member in a direction opposite to a moving direction of the second conveying member to separate the first contact support portion from the one side surface of the article.

10. The article conveying device according to claim 5, wherein when the article is located at the article inspection position, the fourth drive unit directly transmits the power of the drive motor to the second conveying member so that the second conveying member is moved relative to the first conveying member to separate the second contact support portion from the other side surface of the article, or transmits the power of the drive motor to the second conveying member via the power transmission unit so that the second conveying member is moved relative to the first conveying member to separate the second contact support portion from the other side surface of the article, and the third drive unit moves the first conveying member in a direction opposite to a moving direction of the second conveying member to separate the first contact support portion from the one side surface of the article.

11. The article conveying device according to claim 6, wherein when the article is located at the article inspection position, the fourth drive unit directly transmits the power of the drive motor to the second conveying member so that the second conveying member is moved relative to the first conveying member to separate the second contact support portion from the other side surface of the article, or transmits the power of the drive motor to the second conveying member via the power transmission unit so that the second conveying member is moved relative to the first conveying member to separate the second contact support portion from the other side surface of the article, and the third drive unit moves the first conveying member in a direction opposite to a moving direction of the second conveying member to separate the first contact support portion from the one side surface of the article.

12. The article conveying device according to claim 2, further comprising:

an inclined groove formed along a moving direction of the second conveying member, wherein the first drive unit includes
an actuator having a moving portion moving along the inclined groove while coming into contact with the inclined groove, and moving the second conveying member relative to the first conveying member, and
the inclined groove is inclined with respect to a moving direction of the moving portion.

13. The article conveying device according to claim 1, wherein the first contact support portion has a first contact surface which comes into contact with the one side surface of the article, the second contact support portion has a second contact surface which comes into contact with the other side surface of the article, and at least the first contact surface extends from a lower portion to an upper portion of the article.

14. The article conveying device according to claim 2, wherein the first contact support portion has a first contact surface which comes into contact with the one side surface of the article, the second contact support portion has a second contact surface which comes into contact with the other side surface of the article, and at least the first contact surface extends from a lower portion to an upper portion of the article.

15. The article conveying device according to claim 5, wherein the first contact support portion has a first contact surface which comes into contact with the one side surface of the article, the second contact support portion has a second contact surface which comes into contact with the other side surface of the article, and at least the first contact surface extends from a lower portion to an upper portion of the article.

16. The article conveying device according to claim 10, wherein the first contact support portion has a first contact surface which comes into contact with the one side surface of the article, the second contact support portion has a second contact surface which comes into contact with the other side surface of the article, and at least the first contact surface extends from a lower portion to an upper portion of the article.

17. The article conveying device according to claim 1, wherein the first conveying member is a first rotating member in which the conveying direction of the article is a rotation direction, and the second conveying member is a second rotating member rotatable in a normal/reverse direction of the rotation direction of the first rotating member.

18. The article conveying device according to claim 2,
wherein the first conveying member is a first rotating member in which the conveying direction of the article is a rotation direction, and
the second conveying member is a second rotating member rotatable in a normal/reverse direction of the rotation direction of the first rotating member.

19. The article conveying device according to claim 5,
wherein the first conveying member is a first rotating member in which the conveying direction of the article is a rotation direction, and
the second conveying member is a second rotating member rotatable in a normal/reverse direction of the rotation direction of the first rotating member.

20. The article conveying device according to claim 6,
wherein the first conveying member is a first rotating member in which the conveying direction of the article is a rotation direction, and
the second conveying member is a second rotating member rotatable in a normal/reverse direction of the rotation direction of the first rotating member.

\* \* \* \* \*